United States Patent [19]

Ninnis et al.

[11] Patent Number: 5,052,777
[45] Date of Patent: Oct. 1, 1991

[54] GRAPHICS DISPLAY USING BIMORPHS

[75] Inventors: Ronald M. Ninnis, Vancouver; Allen Miller, Langley; Ralph Dyck, Vancouver; Volker Bodegom, Fort Langley, all of Canada

[73] Assignee: Sportsoft Systems, Inc., Burnaby, Canada

[21] Appl. No.: 266,458

[22] Filed: Nov. 2, 1988

Related U.S. Application Data

[63] Continuation-in-part of Ser. No. 188,153, Apr. 27, 1988, Pat. No. 4,844,577, which is a continuation of Ser. No. 944,695, Dec. 19, 1986, abandoned.

[51] Int. Cl.$^5$ .............................................. G02B 6/24
[52] U.S. Cl. ...................................... 385/19; 359/230
[58] Field of Search ................. 350/96.29, 96.14, 96.20

[56] References Cited

U.S. PATENT DOCUMENTS

| | | | |
|---|---|---|---|
| 4,119,979 | 10/1978 | Frank et al. ............................ | 354/50 |
| 4,198,140 | 4/1980 | Frank et al. ............................ | 354/59 |
| 4,385,798 | 5/1983 | Yevick ................................... | 350/96.14 |
| 4,415,228 | 11/1983 | Stanley ................................... | 350/96.20 |
| 4,844,577 | 7/1989 | Ninnis et al. ........................... | 350/96.14 |
| 4,867,516 | 9/1989 | Baken ................................... | 350/96.14 |

OTHER PUBLICATIONS

Toda, "Design of Piezoelectric Polymer Motional Devices with Various Structures", *Transactions of the IECE of Japan*, vol. E61, No. 7, Jul. 1978.
Toda and Osaka, "Application of PVF$_2$ Biomorph Cantilever Elements to Display Devices", *Proceedings of the S.I.D.*, vol. 19/2, Second Quarter 1978.
Toda and Osaka, "Large Area Electronically Controllable Shutter Array Using PVF$_2$ Biomorph Vanes", *Ferroelectrics*, 1980, vol. 23, pp. 121–134.
Frank and Lee, "Piezoelectric Camera Shutter", Research Disclosure, 7 Sep. 1978.
Frank and Lee, "Piezoelectric Shutter Control for Camera", Research Disclosure, Jun. 1978.
Toda, "Voltage Induced Large Amplitude Bending Device/PVF$_2$ Biomorph—Its Properties and Applications", *Ferroelectrics*, 1981, vol. 32, pp. 127–133.
Stephany and Gates, "Biomorph Optical Beam", *Applied Optics*, Feb. 1976, Bol 15, No. 2, pp. 307–308.
Keuning, "A Mixed Boundary Value Problem for an Infinite, Piezoceramic Bimorph", *Acta Mechanica*, 14, 199–217 (1972).
Toda and Osaka, "Electromotional Device Using PVF$_2$ Multilayer Biomorph", *Transactions of the IECE of Japan*, vol. E61, No. 7, Jul. 1978.

(List continued on next page.)

*Primary Examiner*—John D. Lee
*Assistant Examiner*—Phan T. Heartney
*Attorney, Agent, or Firm*—Ronald C. Fish

[57] ABSTRACT

A bimorph using ultraviolet setting glue to laminate a piezoelectric film structure, having etched-back metalization patterns on the surfaces of the piezoelectric film. The bimorph is used in a bimorph light modulator including a substrate on which fiber optic input and output light guides are mounted. A gap between the light guides serve as an optical coupling. A bimorph is affixed to the substrate with a shutter attached to one end thereof and positioned within the gap for blocking the light coupling when the bimorph is in the unenergized state. When the bimorph is energized, it pulls the shutter out of the gap, thereby allowing light coupling. Top and bottom stops are used to limit the bimorph movement to damp resonant vibrations and improve on and off times. Viscous air damping is used to eliminate or minimize bounce of the top and bottom stops and to help damp resonant vibration. An array of the bimorphs may be utilized for providing a video or other display, with electrode connections being made to the bimorphs by means of conductors which contact the bimorph electrodes at small surface areas, with the conductors being attached to circuit boards carrying signals for operating the bimorph array. The optical fibers may be coupled to different light sources and filters to provide color images, and groups of optical fibers may be arranged to form pixels for providing a broad range of intensities.

37 Claims, 30 Drawing Sheets

OTHER PUBLICATIONS

Toda, Osaka, and Johnson, "A New Electromotional Device", *RCA Engineer*, 25-1, Jun./Jul. 1979, pp. 24-27.

Chatigny, "Piezo Film Yields Novel Transducers", *Electronics Week*, Aug. 6, 1984, pp. 74-77.

Toda, Osaka, Tosima, "Large Area Display Element Using $PVF_2$ Biomorph with Double Support Structure", *Ferroelectrics*, 1980, vol. 23, pp. 115-120.

Carome and Koo, "$PVF_2$ Phase Shifters and Modulators for Fiber Optic Sensor Systems", 1980, IEEE Triplesonics Symposium, pp. 710-712.

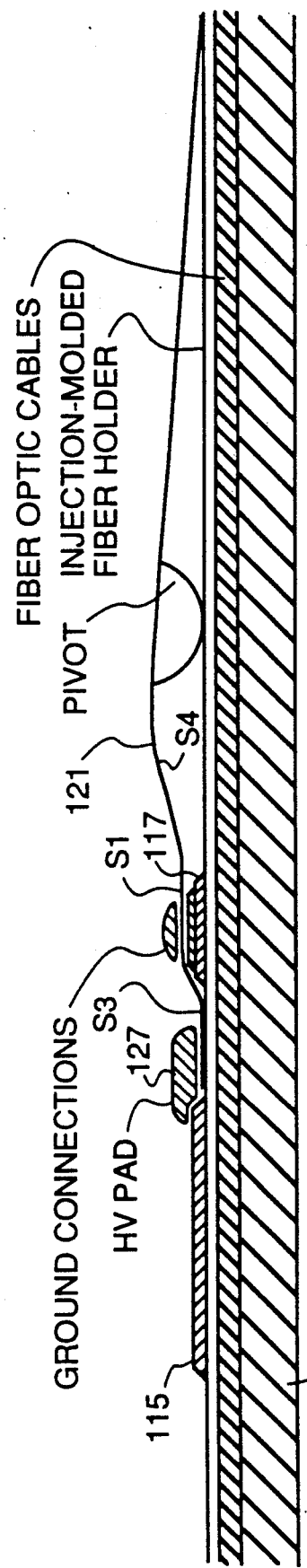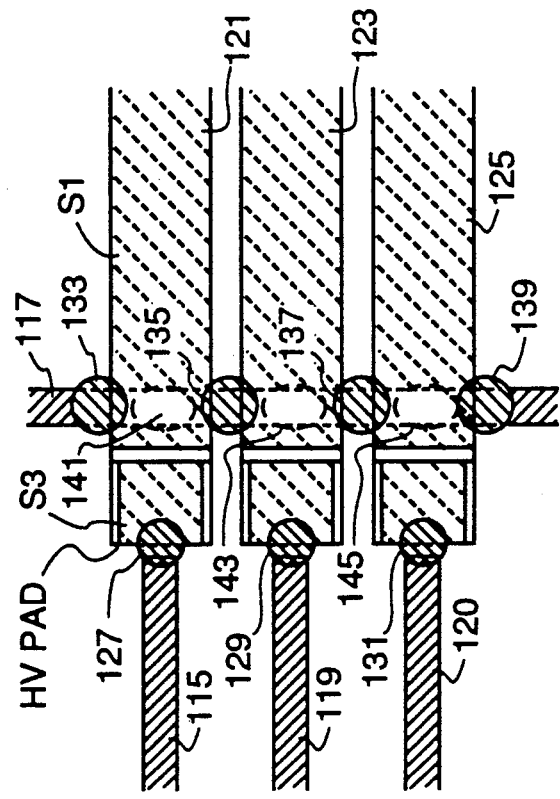

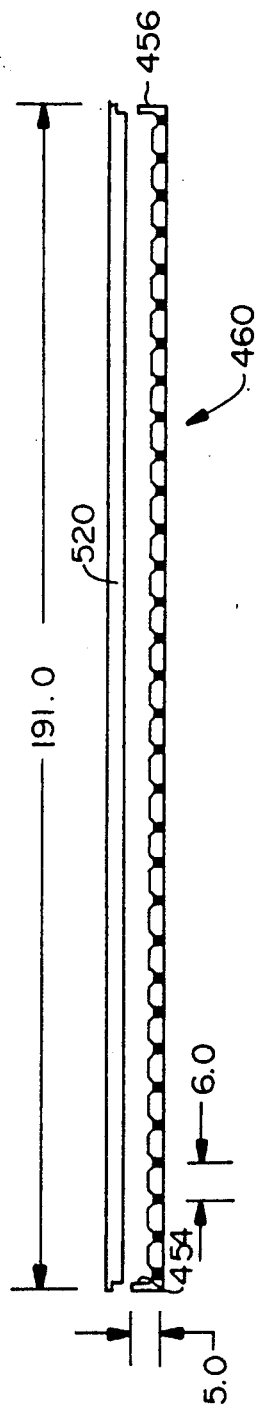
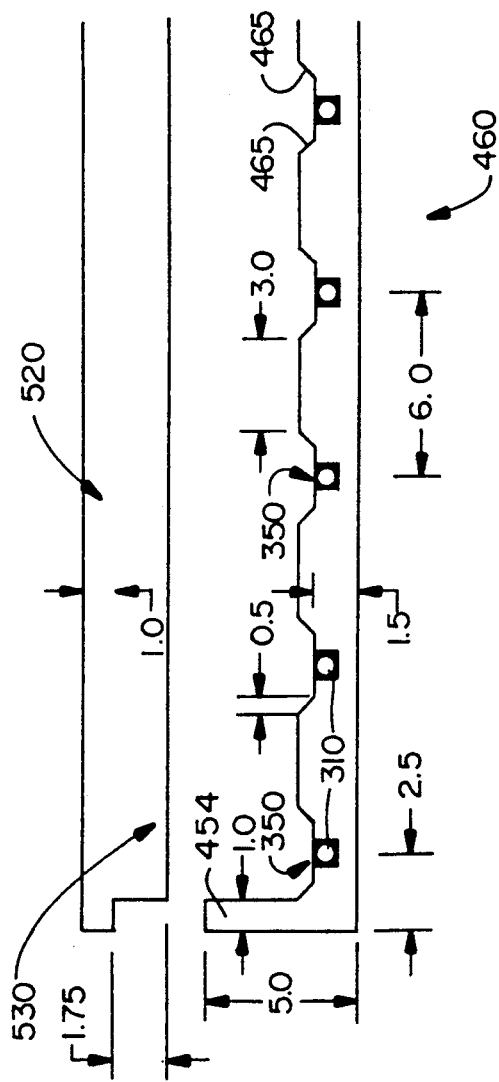

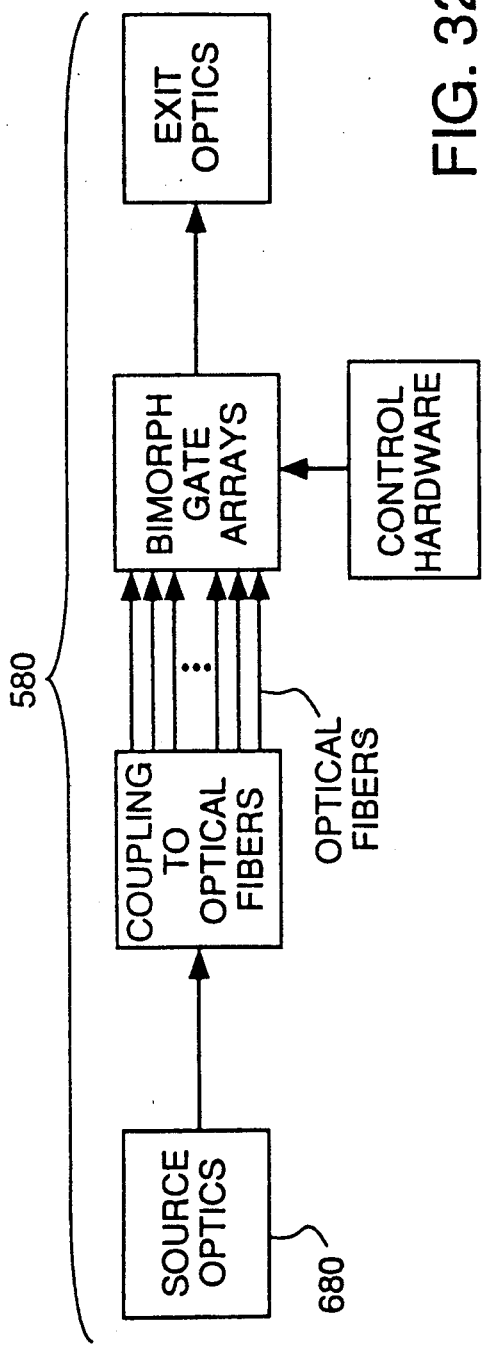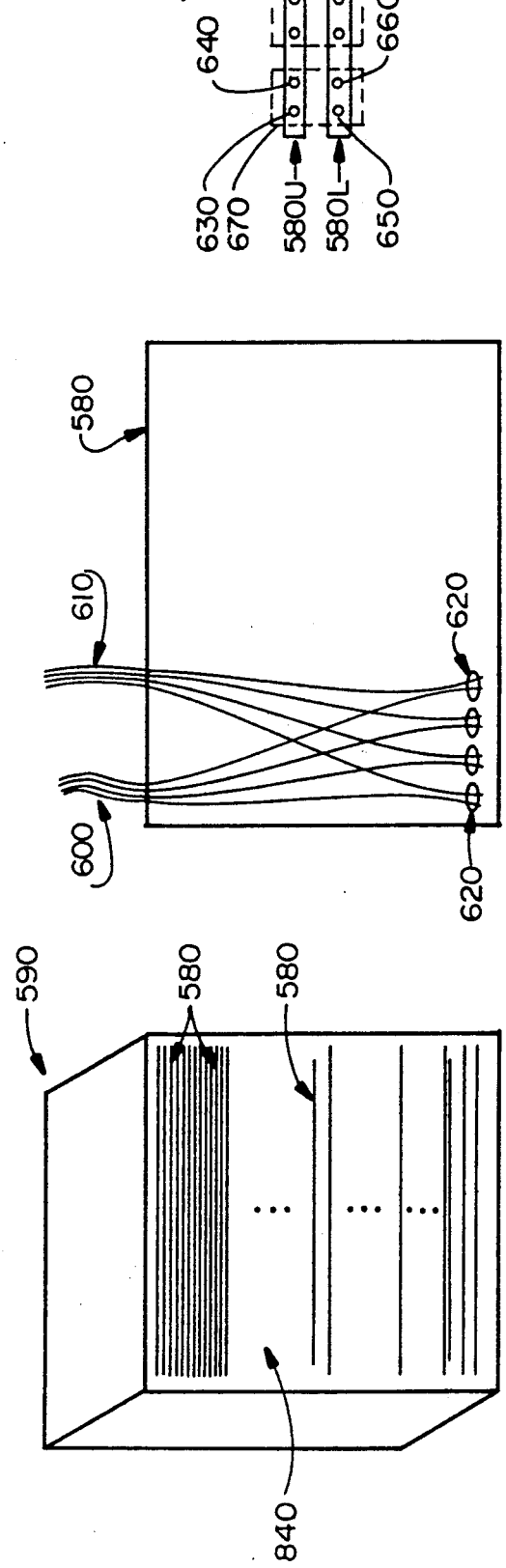
FIG. 32
FIG. 35
FIG. 34
FIG. 33

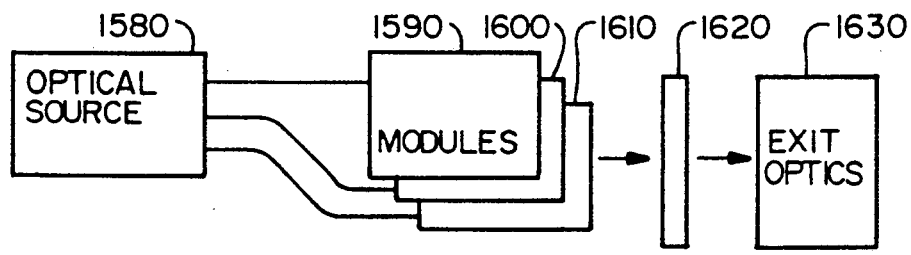
FIG. 45
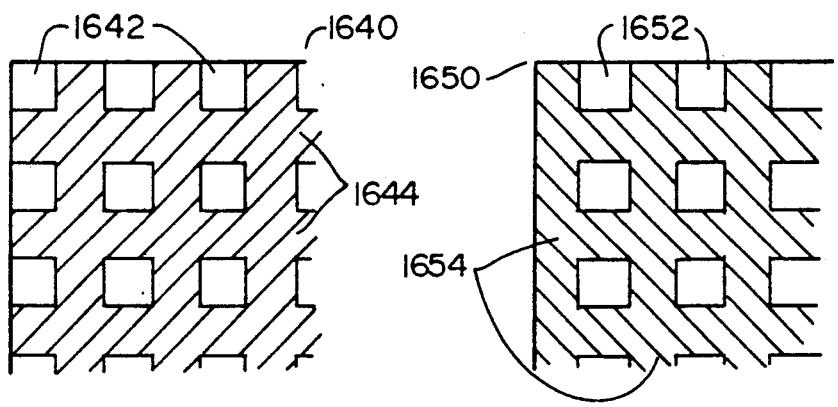
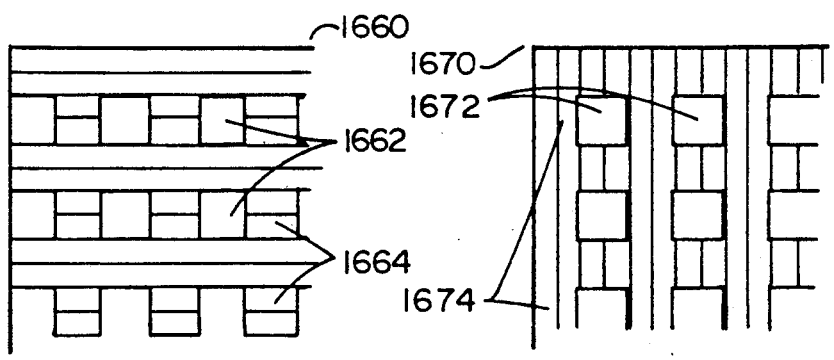
FIG. 46

GRAPHICS DISPLAY USING BIMORPHS

CROSS-REFERENCE TO RELATED APPLICATIONS

This is a continuation-in-part of U.S. patent application Ser. No. 188,153, filed Apr. 27, 1988 (now U.S. Pat. No. 4,844,577, issued July 4, 1989) which is a File Wrapper Continuation of U.S. patent application Ser. No. 944,695 filed on date Dec. 19, 1986 (now abandoned).

BACKGROUND OF THE INVENTION

The invention pertains to the field of bimorphs in general, and more particularly, to the field of bimorph based light modulators.

Bimorphs are not new devices. Basically, a bimorph is a device manufactured with two strips of piezoelectric film which are fastened together and which have electrodes allowing electrical fields of the proper polarity to be applied through the film to cause an electrostrictive effect to occur. This electrostrictive effect changes the dimensions of the film of the two different strips in such a way that the bimorph bends.

Bimorphs have been used in the prior art to modulate light by using the bimorph to bend into and out of the path of a light beam. The physical occlusion of the light path by the bimorph interrupts the light beam and therefore modulates the light in accordance with the timing and intensity of the electrical fields applied to the bimorph. Bimorphs have also been used in the prior art to interrupt the light path at the focal point between two lenses, and have been used to trip the shutter mechanisms of cameras when a sufficient amount of light for proper exposure has been received. It is known in the prior art to attach a right angle shutter to a bimorph and to allow the bimorph to bend into and out of the path of light through an aperture in a mask plate. It is also known to use bimorphs in display elements such as seven segment displays where instead of using light-emitting diodes for each of the segments in the display, a bimorph painted with a distinctive color is used to activate each display segment. It is also known in the prior art to doubly support the bimorph with a fixed fulcrum somewhere in the middle of the length of the bimorph and a movable fulcrum on one end thereby leaving one end of the bimorph free to move in response to the applied electric fields.

It is also known in the prior art to use piezo film for its piezoelectric property in order to manufacture transducers. That it, when piezo film is subjected to mechanical stress, a voltage can be generated which can be sensed to signal the occurrence of an event causing the mechanical stress.

It is also known in the prior art to use bimorphs in conjunction with a Mach-Zehnder optical interferometer to implement an optical phase shifter in fiber optic sensor systems.

Other workers in the art have used bimorph light beam deflectors wherein a mirror is placed at the end of a bimorph and a laser beam is directed onto the mirror such that the angle of reflection is altered by the bending of the bimorph. Still other workers in the art have used bimorphs to implement a mechanical multiplexer for fiber optic switching of light from one input fiber to either of several output fibers.

There are certain problems which arise from the use of bimorph cantilevered beams for the interrupting of light paths. For one, the cantilevered beam has its own mechanical resonant frequency. When such a beam is excited by a narrow pulse or a step function, the beam bends and mechanical resonance or vibration often occurs, causing the free end of the beam to vibrate. If the vibration causes any portion of the bimorph or the shutter to move into and out of a light path, errors in the desired average light flux will occur. Further, when driving such a bimorph at high frequencies, the acceleration of the beam and its velocity is high. If a mechanical stop is used to limit the travel of the beam, the bimorph can hit the mechanical stop and bounce. Such bouncing action is called chatter and also causes errors in the average light flux passing the bimorph since the light flux is calculated under ideal conditions where no bounce occurs.

It is useful to use bimorph light modulators in large area displays where each bimorph modulates the average light flux emerging from a particular pixel location or from one color component of a pixel in a three-primary-color pixel. Such displays have advantages over conventional secondary emission displays in that a light source of any desired intensity may be used to supply the input light which may then be modulated using the individual bimorphs in accordance with scene information to control the gray scale light intensity of each pixel. The advantage of such an arrangement is that high contrast and good visibility during high ambient light conditions can be achieved. That is, the light emerging from the face of such a display can be made much more intense than the light emerging from secondary emission displays such as cathode ray tubes (CRTs) and television type screens since phosphor light emission is limited in intensity. In contrast, a display using bimorphs is not limited in the intensity of the light at each pixel location by the physical nature of any secondary emission type material such as phosphor. Further, such a display can be made very large since the light from the source can be directed to very large numbers of pixels by optical channels such as fiber optic light guides, and there is no need for deflecting an electron beam to raster scan the entire display.

Use of bimorphs to control the pixel light intensities in a large scale display requires very accurate correspondence between the electronic signal which encodes the desired amount of light at each pixel location and the actual average light flux which is gated through to that location by the bimorph. Further, video displays require vast quantities of data to be handled in very short times if the display is to be compatible with NTSC and PAL television signals. Thus, each bimorph must be able to operate at a fairly high frequency and accurately control the average light flux passing through the light channel controlled by that bimorph.

The bimorph structures taught in the prior art could not be used for application to such a large scale display. For one thing, the structures taught in the prior art suffer from resonance and chatter problems which would degrade the accuracy and repeatability in controlling the average light flux passing through the light channel controlled by each bimorph. Further, the bimorph structures taught in the prior art would suffer from electrostatic pinning problems which would degrade the ability of the bimorph to operate at high frequencies necessary to handle NTSC and PAL television signals. The bimorph structures taught in the prior art would also be unreliable since no means is taught for preventing the electrostrictive dimensional changes of the bimorph film from occurring at the locations of electrical contacts. Thus, the electrical contacts can be rendered intermittent or be caused to fail altogether by the mechanical stresses induced when the film changes dimensions under the contact locations.

Further, the bimorphs of the prior art are generally glued together with glues which render the assembly of the bimorph difficult. It is important to be able to glue the two film strips together without bubbles, wrinkles or other stress in the film which could cause curl in the final structure. With the types of glue taught in the prior art, only a limited amount of time is available before the glue sets to adjust the two films and eliminate wrinkles, curls and stresses. This would make assembly and registration of the two films and removal of wrinkles, bubbles and other stress-producing artifacts more difficult.

Further, the prior art does not teach a method of registering the bimorph and shutter with a light path to insure that complete occlusion of the light path will occur when the bimorph is in the "off" position. Since bimorph film is extremely thin and is made of polymer film, there is often curl in the final bimorph product which varies from one bimorph to another. It is important to be able to register all the bimorph shutter controlling elements at the outset to insure that when all the bimorphs are in the "off" position, the shutters for each bimorph completely occlude all light paths, and none are in a prestressed state which is different from the prestressed state of the others. If this is not the case, each bimorph will act differently in response to the same signal.

Accordingly, a need has arisen for a bimorph light modulator for use in implementing large scale displays which can operate at high enough frequency to be compatible with television signals and which can control very high intensity light such that the display is usable in high ambient light conditions with good contrast and visibility. Further, such bimorphs must be relatively easy to assemble, and must be reliable and accurate in terms of the repeatability of the light intensity modulation which may be achieved.

SUMMARY OF THE INVENTION

According to the teachings of the invention there is disclosed a bimorph which is easier to manufacture than bimorphs taught in the prior art. There is also disclosed a bimorph light modulator having an improved design in that resonance and chatter effects are minimized, and light modulation response is accurate and repeatable. The bimorph light modulator of the preferred embodiment uses fiber optic light guides so a single very bright source may be used for input light and very large, bright, high contrast displays may be manufactured. In alternative embodiments, other types of input and/or output light guides may also be used. Further, the device may be used in the ultraviolet or infrared spectrums, so suitable radiation guides for light at these wavelengths may also be used.

The bimorph is comprised of two piezoelectric films which are laminated together with ultraviolet-setting glue. The film strips have a predetermined set of metalization patterns on the various surfaces thereof. These metalization patterns are registered with each other and have unmetalized areas to eliminate dimensional changes of the film under the electrical contact. The metalized patterns are also formed away from the edges of the film to eliminate the possibilities of shorts and to minimize electrostatic pinning due to edge electrostatic fields. The purpose of the metalization patterns is to allow electric fields of the appropriate polarity be applied across the piezo film to cause the desired electrostrictive bending for use in modulating light. In alternative embodiments, electrostatic pinning may be avoided by other configurations of the bimorph, the substrate and the metalization patterns. To eliminate electrostatic pinning, it is essential that the substrate be conductive and that the top and bottom electrodes be conductive and connected to be at the same potential. The substrate (and therefore the bottom metalization pattern) and the top metalization pattern could then be at ground with the center metalization pattern at high voltage as in the preferred embodiment. An alternative embodiment could be used where the center electrode is kept at ground potential and the substrate and the top electrode driven to high voltage when bending is desired. The high voltage electrode must be etched back in whatever embodiment is used to eliminate the edge fields that cause electrostatic pinning.

The light modulator according to the teachings of the invention is constructed using an input light guide and an output light guide. In alternative embodiments, no output light guide is necessary. In the preferred embodiment, both the input and the output light guides are fiber optic light guides. The output light guide has a diameter three times as large as the diameter of the input light guide. There is a gap between the output of the input light guide and the input of the output light guide. This gap is the path of coupling for light emerging from the input light guide and entering the output light guide. The light guides are mounted on a substrate and the bimorph is mounted on the substrate also in a predetermined position so that it may used to modulate the light passing through the gap. The bimorph has an aluminum film attached to one end thereof to act as a shutter. The bimorph is mounted on the substrate so as to register the shutter in the gap between the input light guide and the output light guide. The shutter registration position is selected to completely occlude coupling of light between the light guides when the bimorph is in its uncurved state. The side of the shutter facing the input light guide is coated with a black, light absorbing coating to eliminate light reflections back into the input light guide. When voltage is applied to the bimorph, the bimorph curves and the shutter is removed from the gap to allow light coupling between the light guides.

The larger diameter of the output light guide maximizes the efficiency of the light coupling and renders the size of the gap noncritical within a certain range.

By varying the duty cycle of the applied voltage, the duty cycle of the presence and absence of the shutter in the gap can be varied. This controls the average light flux coupled between the light guides, and after averaging by the human eye, the perceived effect is a modulated average light intensity.

In the preferred embodiment, a bimorph of sufficient width to cause viscous air damping is used. Also, a three point mechanical mounting is used with a fulcrum in the midsection of the bimorph. This causes the bimorph to form a shallow angle with the substrate to prevent hydrostatic sticking. The three point mechanical mounting is important in obtaining high registration tolerance of the shutter with respect to the input light guide since perfectly flat bimorphs cannot be manufactured. Top and bottom stops are used to limit the range of movement of the bimorph to improve turn-on and turn-off time and to damp resonant vibrations.

Also disclosed is a process for making the bimorph and a process for mounting the bimorph to eliminate stresses in the bimorph and to achieve accurate registration.

A particular feature of a preferred embodiment of the invention is the utilization of electrical connecting means for the bimorphs and printed circuit board electrodes which have small areas of contact, so that the contacts are subjected to relatively high pressure for a given force binding an array of bimorphs together. This ensures reliable electrical contacts, and in addition seals the contacts from the intrusion of gases, liquids, or other corrosive or detrimental materials. The reduced-area contacts may be made by means of electrically conduction strips (either homogeneous strips or zebra strips) laid transversely to the respective electrodes, or may be made by means of electrically conduction rubber buttons mounted on printed circuit boards carrying means for energizing the bimorphs.

An array of the bimorphs may be utilized for providing a video or other display, and the optical fibers may be coupled to different light sources and filters to provide color images. Groups of optical fibers may be arranged to form pixels for providing a broad range of intensities.

BRIEF DESCRIPTION OF THE DRAWINGS

FIG. 10 is a side view of the electrical connections of the bimorph according to one embodiment.

FIG. 11 is a top view of an embodiment of the electrical connections using conductive epoxy.

FIG. 24 is a front elevation of a bimorph gate array of the invention.

FIG. 25 is an enlarged view of the lower left corner of FIG. 24.

FIG. 32 is a block diagram showing the entire system of the invention. entire system of the invention.

FIG. 33 is a representation of an array of shelves utilizing the bimorph gates of the invention.

FIG. 34 is a partial schematic view of the optical fiber connections of the invention.

FIG. 35 is a partial elevation of two bimorph gate shelves of the invention.

FIG. 45 is a block diagram of an alternative embodiment of the invention.

FIG. 46 shows photographic masks for use in connection with making the embodiment of FIG. 45.

DETAILED DESCRIPTION OF THE PREFERRED EMBODIMENT

Figure 1:
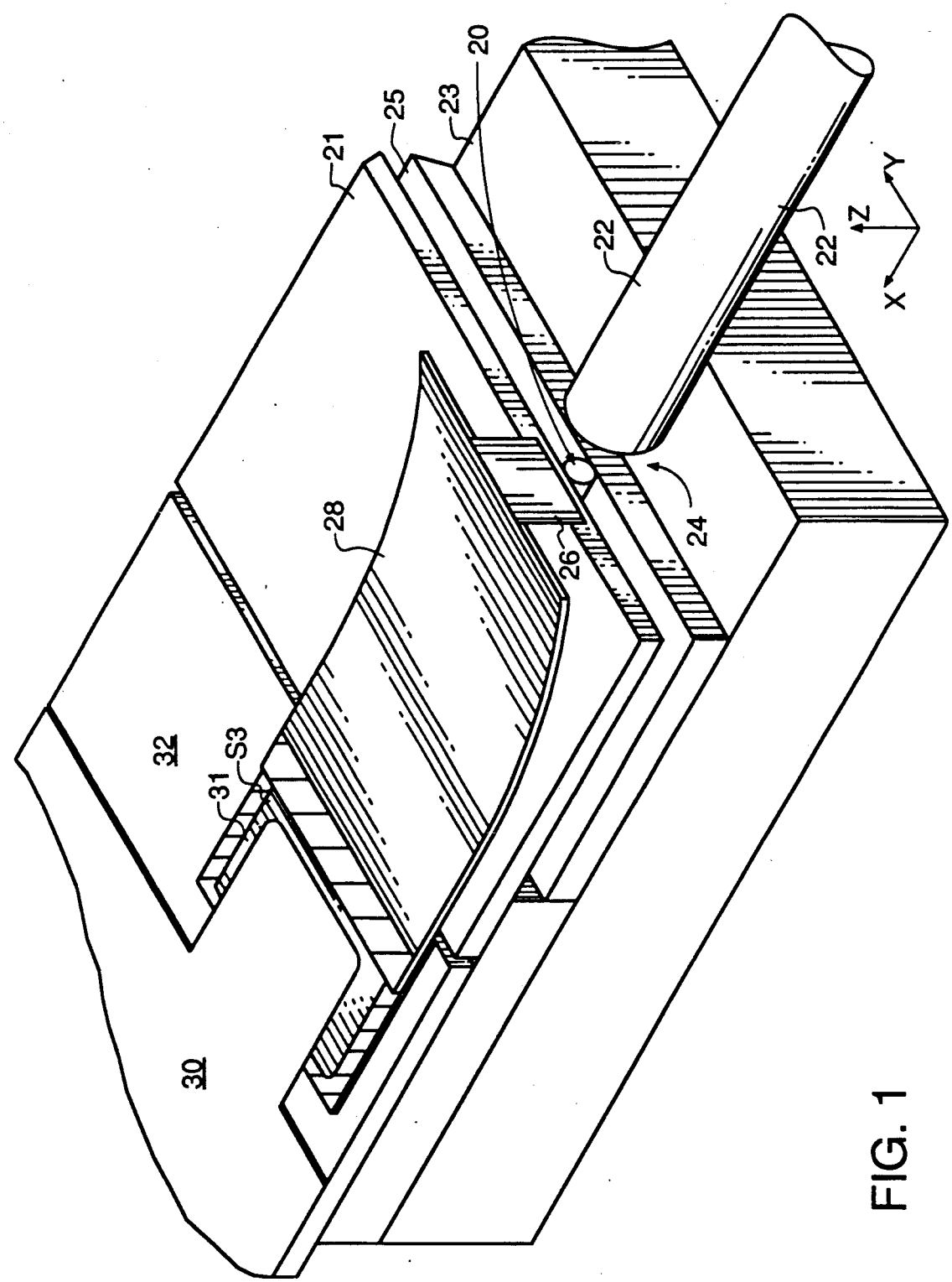
FIG. 1 is a perspective view of one embodiment of a bimorph light modulator using fiber optic light guides.

Referring to FIG. 1, there is shown a perspective view of one embodiment of a bimorph light modulator according to the teachings of the invention. An input fiber optic light guide 20 is glued to the underside of an input fiber holder 21. In the preferred embodiment, the fiber holder 21 is 2-mil brass shimstock, and the input optical fiber 20 is glued thereto using an epoxy glue. In the preferred embodiment, the input fiber optic light guide 20 is 250 microns in diameter. An output light guide 22 is registered center line to center line with the input light guide 20. In the preferred embodiment, the output light guide 22 can be optical fiber or a bundle of optical fibers having a diameter of 750 microns. The output light guide 22 may be fastened to a substrate 23 in any known manner. The input light guide 20 rests on an extension of the substrate 23. The substrate 23 can be 1-2 millimeter (mm) brass plate or 2-3 mm plastic. In general, it is preferred to keep all dimensions of thickness as small as possible so that the maximum number of pixels may be obtained in the Z direction. The gap between the input fiber holder 21 and the substrate extension 25 may be left filled with air, or it may be filled with a pliable insulating material such as rubber or potting compound to provide an additional degree of mechanical support.

The input light guide 20 and the output light guide 22 are separated by a gap indicated generally at 24. A shutter 26 is placed in the gap 24 and is mechanically affixed to a bimorph 28. The bimorph 28 flexes in accordance with the intensity and duty cycle of electrical fields applied via a high voltage conductor 30, a high voltage center electrode 31 and ground connections (not shown). When a high voltage of a proper polarity is applied, the bimorph 28 bends upward, i.e., in the positive Z position, thereby removing the shutter 26 from the gap 24. This permits light in the input light guide to be captured by the output light guide 22 and guided to the pixel location controlled by this particular bimorph light modulator.

In the preferred embodiment, pulse width modulation is used for the high voltage control signal on the electrode 31, thereby causing the shutter 26 to move into and out of the gap 24 with a duty cycle controlled by the pulse width parameter. The duty cycle controls how much of the time the shutter 26 is in gap 24 and completely occluding light transfer from the input light guide 20 to the output light guide 22. The higher the percentage of time that the shutter 26 is in the gap 24 and occluding light flow, the lower is the average light flux transferred from the input light guide 20 to the output light guide 22. This lower average light flux will be perceived by the human eye by virtue of the eye's natural averaging process as a lower light intensity emerging from the pixel controlled by the bimorph light modulator of FIG. 1.

The electrical fields needed to operate the bimorph 28 require both a high voltage source and a ground plane as well as metalized or conducting surfaces on the bimorph structure to cause the electrical field to pass through the piezo film. As will become clear from the discussion below, the ground plane must be connected to the metalized films on two surfaces of the bimorph on opposite sides of the metalized film used for the high voltage. The manner in which this is done will be made clear in the discussion below. The ground plane in the embodiment of FIG. 1 is the conductive plate 32. The high voltage electrical lead 30 is insulated from the conductive plate 32 by a layer of insulating material (not shown) so as to prevent a short between these two conductors of differing potential. One ground connection is to a metalized film on the underside of the bimorph 28. Another ground connection is to a metalized film on the top of the bimorph 28 (not shown). The exact manner of one embodiment of electrical connections is shown in FIG. 11.

Obviously, the color of the light conducted into the bimorph light modulator by the input light guide 20 is not important so long as the input guide light 20 is capable of guiding that frequency of light. Thus the bimorph light modulator of FIG. 1 can be used for implementing color displays by grouping three bimorph light modulators and three input light guides together as a single pixel where each light modulator controls the intensity of one of the three primary colors. Because fiber optic light guides are used in the preferred embodiment, distributed pixels are also possible. In such an arrangement the output fiber or output fiber bundle 22 is distributed in a pattern over a local matrix of red, green and blue pixel positions. In such an embodiment, the pixel positions may overlap each other in the matrix to provide a smoother appearing display.

Figure 2:
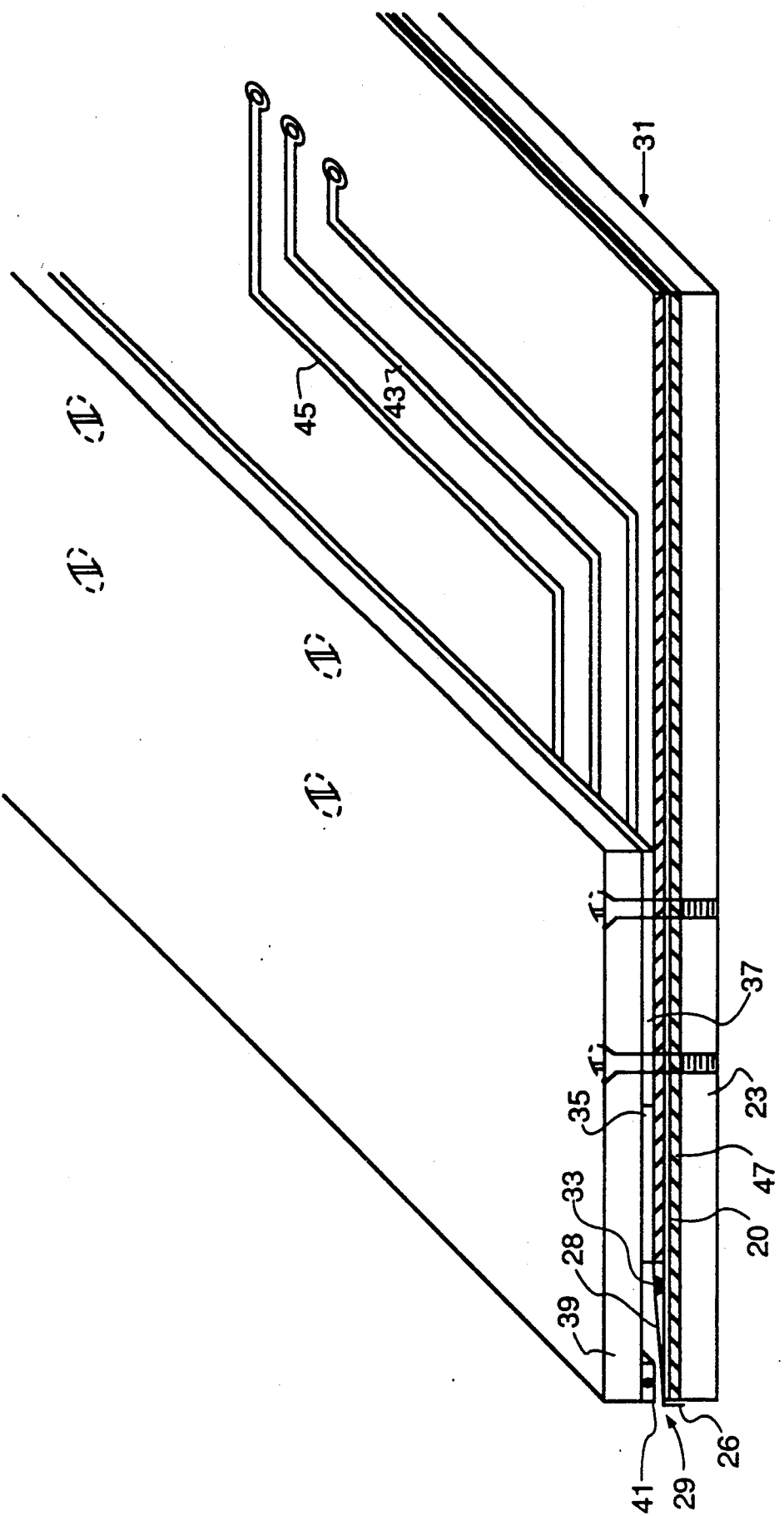
FIG. 2 is a perspective view of a bimorph light modulator according to the preferred embodiment of the invention.

Referring to FIG. 2 there is shown the preferred embodiment of a bimorph light modulator according to the teachings of the invention. The light modulator is built on a substrate comprised of either 1-2 mm brass or 2-3 mm plastic. The substrate 23 provides mechanical rigidity for the superstructure built thereon. The input light guide 20 rests on the top surface of the substrate 23 but is mechanically affixed to a brass shim plate 21 which is 0.002 inches thick (2 mil) in the preferred embodiment. The input light guide 20 extends from the rear edge of the board 31 to the front edge 29 of the board. As with the embodiment of FIG. 1, the input light guide 20 is optical fiber of a diameter of 250 microns, and is glued to the brass plate 21, but other forms of affixation will also work.

The next layer up from the brass plate 21 is a printed circuit board 27. This printed circuit board does not extend all the way to the front edge 29 of the bimorph light modulator. Instead, the printed circuit board 27 extends from the rear edge 31A to a position along the X axis just short of the bimorph fulcrum 33. The portion of the printed circuit board 27 closest to the fulcrum is used to make the electrical ground plane connection to the bimorph 28. That is, standard copper traces may be formed on the surface of the printed circuit board 27 facing the underside of the bimorph 28 such that the bimorph may be glued to these electrical traces using conductive epoxy to both form an electrical connection and a mechanical mount. The details of the electrical connection scheme will be clarified in connection with the discussion of FIG. 11. The mechanical attachment of the bimorph is by way of the electrical connections to the printed circuit board 27. The electrical connections are covered by a pliable insulating layer such as rubber or potting compound 35.

The advantage of using the printed circuit board 27 is that the connections to the bimorphs may be made by standard copper conductive leads etched onto the surface of the printed circuit board. Further, integrated circuit sockets and conductive traces leading up to each pin connection point may be formed in the printed circuit board such that the driver circuitry for whatever modulation scheme which is chosen by the user may be built on the printed circuit board.

A brass spacer 37 rests on top of the printed circuit board 27 to provide mechanical support and spacing for a top plate 39. The purpose for the top plate 39 is to shelter the bimorph 28 and to provide mechanical support for a top stop 41. The purpose of the top stop 41 is to limit the upward movement of the bimorph shutter end and to damp any resonant vibrations of the bimorph cantilevered beam. The damping is to limit the movement of the bimorph to a range which is adequate to cause the shutter 26 to be completely removed from all possible light paths from the input light guide 20 to the output light guide 22 (not shown). The bimorph vibrations, if not damped, could cause the shutter 26 to oscillate up and down in the Z direction each time the bimorph 28 is relaxed to place the shutter 26 in front of the input light guide 20, i.e., in the off position. These vibrations could cause the shutter 26 to move in and out of the light path when it is supposed to be solidly in the light path and completely occluding light transfer from input to output. Such vibrations are a cause of error in controlling the intensity of light by a cantilevered beam bimorph and destroy the repeatability of the result.

The top and bottom stops could be knife edge stops. In such an alternative embodiment, the voltage driving signal can be reversed just before contact of said bimorph with either stop to decelerate the bimorph and eliminate the bounce which would otherwise occur when the bimorph hits the stop, where no viscous damping is present because of the narrow nature of the top and bottom stops.

To improve the speed with which the bimorph opens and closes, the bimorph is "overdriven" in the sense that the amount of voltage applied is much greater than the amount of voltage needed to move the bimorph between the top and bottom stops. This reduces the rise and fall times of the operation of the gate in moving from an open to closed position, and vice versa, as would be seen if shutter position as a function of time were plotted at the voltages used in the invention versus lower voltage driving signals.

Conductive traces 43 and 45 shown in FIG. 2 represent high voltage signal lines to adjacent bimorphs. The structure shown in FIG. 2 is typically built with 16 bimorphs side by side, such that 16 pixels in black and white displays may be controlled with the structure of FIG. 2. When these structures are stacked, a twodimensional array may be formed.

Figure 3:
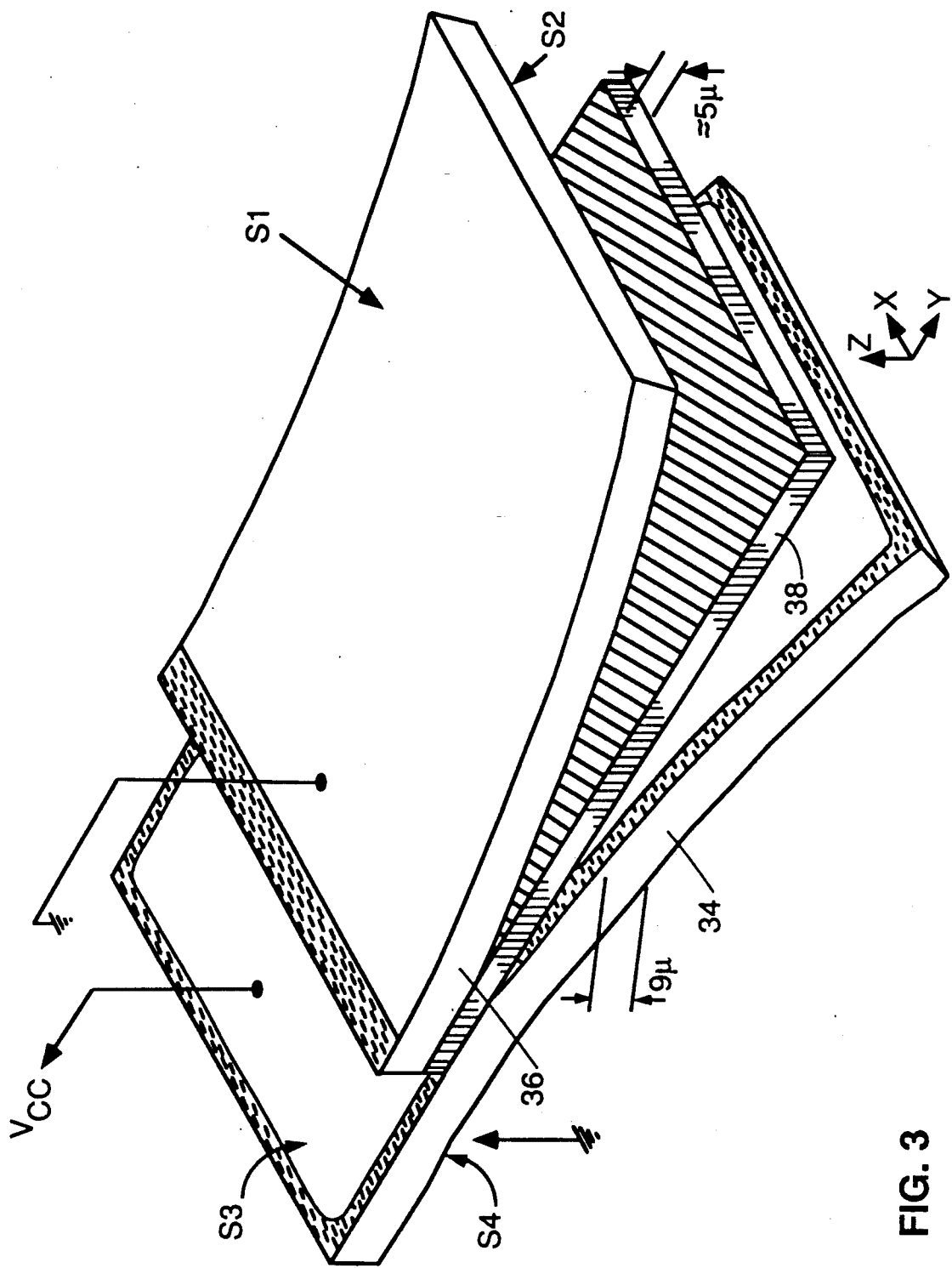
FIG. 3 is a perspective exploded view of a bimorph construction according to the teachings of the invention.

Referring to FIG. 3, there is shown a perspective, exploded view of a typical bimorph construction. A bimorph is a laminated structure using a class of polymers that exhibits piezoelectric properties. The most common polymer of this class of materials is poly(-vinylidene fluoride)$_2$, sometimes referred to as PVF$_2$ or PVDF. This class of polymers can be manufactured in such a way that the molecular structure is aligned. Then the structure is poled in an intense electric field to effect separation of charges resulting in an electric material which exhibits piezoelectric properties and electrostrictive properties. Piezoelectricity is the property that when a material is subjected to mechanical stress, it generates a voltage. Electrostrictive effect is the opposite; when the material is subjected to an electric field, the material changes dimensions. The manufacture of such films is a well known process, and it is commercially available under the trademark Kynar TM from Pennwalt Corporation in Philadelphia, Pa. Such films come with metalization coatings on the surfaces which can be used to apply the electric fields by applying voltages to these metalization films. A strip of PVF$_2$ will lengthen (or shorten) by a fractional amount that increases with voltage and decreases with film thickness.

Bimorphs are constructed by fastening two such films together in such a way that the electric field across each is arranged to contract one layer and elongate the other. This bimorph construction will be sometimes referred to herein as a bimorph beam or a beam. With one end of the beam held fixed and a voltage applied, the free tip of the beam will undergo an excursion or tip deflection. With a shutter such as the shutter 26 in FIG. 1 attached to the free end of the beam, this tip deflection allows a bimorph gate to open or close a light path, thereby allowing light coupling and decoupling between an input light guide and an output light guide.

Although bimorph beams are not new, the structure of the light modulator described herein is new in that the bimorph is constructed using very thin films with the resonance and chatter problems reported by earlier investigators eliminated and with a very accurate registration of the position of the shutter end of the bimorph to the light path in a way to eliminate any unintended stresses in the beam so that all bimorphs act similarly to the same signal. Further, the bimorph is easier to construct, more reliable and less susceptible to shorting. The bimorph light modulator uses fiber optic light guides so certain advantages are achieved. First, the fibers can be grouped into bundles so a single light source may be used to supply input light to all bimorphs. This light can be guided to pixel positions in a very large display since the fibers are flexible. This eliminates the complexities of trying to do the same thing with discrete, classical optics. Only one input fiber is needed for each gate, but multiple output fibers can be used for each gate.

The construction details of the bimorph cantilevered beam are as follows. The bimorph is made of two strips 34 and 36 of piezoelectric film. In the preferred embodiment, these film strips are 9 microns in thickness along the Z axis. The two films 34 and 36 are laminated together by a glue layer 38 to form a laminated beam construction. In the preferred embodiment, the thickness of the glue layer is approximately one half the film thickness or less than 5 microns. The four surfaces of the two piezoelectric film strips are labeled S1, S2, S3 and S4 in FIG. 3. These same surface numbers are used in FIG. 4, which shows the metalization patterns which are formed on each surface. The glue layer 38 extends from the edge of surface S2 to the end of the bimorph having the most positive Y axis coordinate. This most positive Y axis coordinate end of the beam will become the end on which the shutter is attached later in the process of manufacturing the light modulator. The glue layer 38 covers all of surface S2 and the portion of surface S3 which is covered by the surface S2 in the final construction. The particular glue used should have approximately the same stiffness or Young's modulus when set as the piezo film itself. Further, the glue should set in ultraviolet light in the preferred embodiment.

Although it is possible to use epoxy glue or other glues, such glues are not preferred since they give a limited amount of time to work with the films after the glue is applied and before the glue sets. It is desirable to be able to slide one film on top of the other so as to precisely register the two film strips with relation to each other before the glue sets. Further, it is desirable to not have any wrinkles, bubbles, or other discontinuities in the surface after the glue has set. Therefore, it is convenient to have a glue which sets in ultraviolet light so that the construction of the bimorph may proceed in an unhurried fashion and so that wrinkles and bubbles may be eliminated from the laminate before the glue sets. With ultraviolet setting glue, all steps of the construction process may be carried out at leisure, and when completed, the glue may be set by exposing the structure to ultraviolet light.

It is important to get a uniform thickness for the glue layer, and it is important to be able to control the thickness of the glue layer so that the glue layer is as thin as possible. Thick glue layers cause the bimorph beam to be overly stiff. This excessive stiffness will limit the range of deflection of the shutter when voltage is applied. It is necessary that the bimorph be flexible and mobile enough to completely remove the shutter from the light path. In the preferred embodiment, the glue used is NOA-81 manufactured by Norland Optical Products.

A key factor in determining the glue thickness is how much force is applied during the step of setting the glue. The process of gluing the two film strips 34 and 36 together is as follows. This process will be described with reference to FIG. 5, which is a flow chart of the steps in the process. The first step is symbolized by block 51, which represents the process of laying out a sheet of the piezoelectric film which will become, after dicing, a plurality of the bottom strips 34. This sheet has the metalization patterns for surfaces S3 and S4 formed on it—as shown in side-by-side relationship in FIG. 4—with the surface S3 patterns on the top side of the film, and the surface S4 patterns formed on the underside of the film in registration with the S3 surface patterns.

The long dimension of the metalization patterns is formed coincident with the access of highest electrostrictive sensitivity. That is, in the process in which the film is manufactured, the piezoelectric properties are introduced into the sheets of film by a process known as poling. In this process a strong electric field is applied across the thickness of the film at 110° C. to align the polymers into polarized chains. This produces polarized film with a positive and a negative side. The extrusion process also introduces an asymmetry into the film. This means that the polymer chains, in addition to being polarized through the thickness of the piezo film, are stretched in the direction of extrusion, and this direction becomes the direction of the highest piezoelectric or electrostrictive sensitivity. This direction is also the direction chosen for the longitudinal axis of the metalization patterns.

As indicated by step 51, the bottom sheet of piezo film is laid upon a glue resistant surface. In the preferred embodiment, as it is presently known, the bottom sheet is laid upon a heavy glass plate with a film of Saran wrap or other glue resistant film interposed between the piezo film and the glass surface. In other embodiments, the glue resistant surface may be Teflon or some sprayed material. The purpose of the glue resistant surface is to prevent the bimorph from becoming glued to the glass plate during the process of setting the glue. Ultimately the bimorph laminated construction is to be squeezed between two glass plates so as to make the glue layer 38 as thin as possible. This squeezing process squeezes the glue out from between the two piezo film sheets. This excess glue can glue the bimorphs to the glass if the glass surfaces are not made glue resistant.

The next step is to eliminate wrinkles in the bottom film as symbolized by step 53. Because the piezo films are so thin, they exhibit a natural curl resulting from the process by which they are made and are somewhat difficult to work with. Steps must be taken to eliminate this curl. One of these steps is annealing the film after metalization by temperature cycling it between 20° C. and 70° C. several times. Any remaining curl after this annealing process should be eliminated prior to laminating the two films together so as to produce as straight a bimorph as possible. Thus some step must be taken when laying the bottom sheet on the glass plate to eliminate any curl which would cause the film to not lie flat on the glass surface. One way of doing this is to spray the glass surface with a wetting agent which evaporates such as Windex and then to lay the piezo film on the glass in contact with the wetting agent. The wetting agent tends to make the thin film stick to the flat glass surface and lie flat upon it. The film can then be freely slid across the surface to register it with registration marks. These registration marks insure that the film is in the proper location for lamination with the top film. This registration is necessary because the top film will be brought into contact with the bottom layer of film using a jig having guide means for a top plate to which the top film is attached by wetting agent or some other means. Typically, the glass plate upon which the bottom film is placed is registered in a fixed position by a jig or other alignment means. The registering of the bottom film to registration marks on the bottom glass plate is only necessary for automated manufacturing processes where a machine will lower the top film onto the bottom film. If hand placement is being used, this registration may be omitted since the operator may visually align the top film with the bottom film to achieve the alignment shown in FIG. 3. Note that the top film 36 is shorter than the bottom film 34 in FIG. 3 and that the top film is aligned with the bottom film such that the shutter ends coincide. This leaves the opposite end of the top film 36 short by the difference in film lengths from aligning with the end of the film strip 34 opposite the shutter. This allows space for an electrical connection to the metalization pattern on surface S3.

Alternative ways of eliminating wrinkles would be electrostatic charging of a conductive pattern on the bottom glass plate with opposite charging of the metalization pattern on the bottom film so as to cause the two surfaces to cling together electrostatically. Another way of eliminating wrinkles would be to use a suction plate having tiny openings in the surface thereof instead of the glass plate. The tiny openings in the flat surface of the suction plate would be coupled to a vacuum manifold such that the bottom film could be maintained in flat relationship to the suction plate by application of vacuum to the vacuum manifold.

If the Windex or wetting agent method is used, the wrinkles may be eliminated by rolling the film onto the flat surface using a roller. This process eliminates wrinkles and does not induce stresses in the film which could be produced by stretching the film to eliminate the wrinkles. It is important not to induce stresses in the films because such stresses will result in curled or twisted bimorphs after cutting.

The next step is to apply the glue to the surface S3 of the bottom film 34. Preferably, this glue application process will be by some method which does not induce stresses in the bottom film 34. Preferably, the glue is sprayed on, but it may also be dabbed on gently. Alternatively, the glue may be applied to the top film 36 on the surface that will face the bottom film 34.

Next, the top piezo film 36 is placed on glue resistant surface number 2 as symbolized by block 57. Typically, this glue resistant surface is a glass plate with plastic film or some other glue resistant coating between the piezo film and the glass. This process is the same as the process described with reference to step 51. Next, step 59 is performed to eliminate the wrinkles and register the top sheet with alignment marks on the glue resistant surface number 2. The process of step 59 is the same as the process of step 53.

An alternative method to steps 57 and 59 is to hand register the top sheet with the bottom sheet of piezo film. Since, in the preferred embodiment, the glue is UV setting, this hand registration process can be formed at a leisurely pace to insure that the registration is proper and that no wrinkles exist in the final laminated structure prior to the application of ultraviolet light. The preferred method of construction of the bimorph beam, however, is automated.

Figure 4:
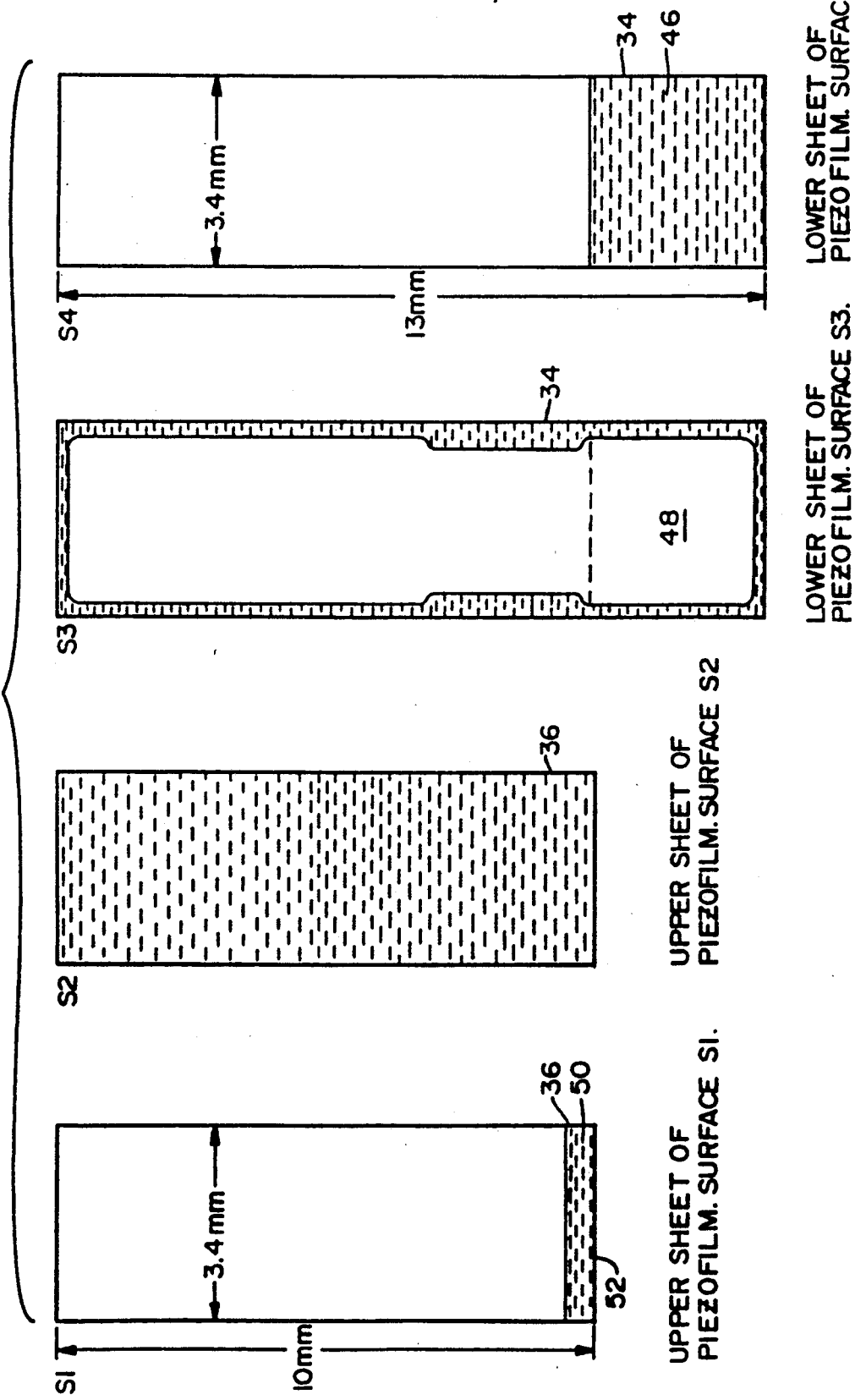
FIG. 4 is a drawing showing the metalization patterns for the four surfaces of one embodiment of a bimorph constructed in accordance with the teachings of the invention.

The next step in this process of automated construction of the bimorph beam is to bring the glue resistant surface number 2 straight down onto glue resistant surface number 1 in aligned relationship to mate the metalized patterns as shown in FIGS. 3 and 4. In the preferred embodiment, this is done with a machine. However, it may also be done by hand in a jig where the top and bottom glue resistant surfaces are glass plates having glue resistant coatings thereon. These two glass plates are of the same size and may be registered with corner registration guides such that the top glass plate may be lowered gently down upon the bottom glass plate in registered alignment with the corner alignment guides. The ultimate goal is to achieve the alignment shown in FIG. 3, and any method of achieving this alignment will suffice for purposes of practicing the invention.

Figure 5:
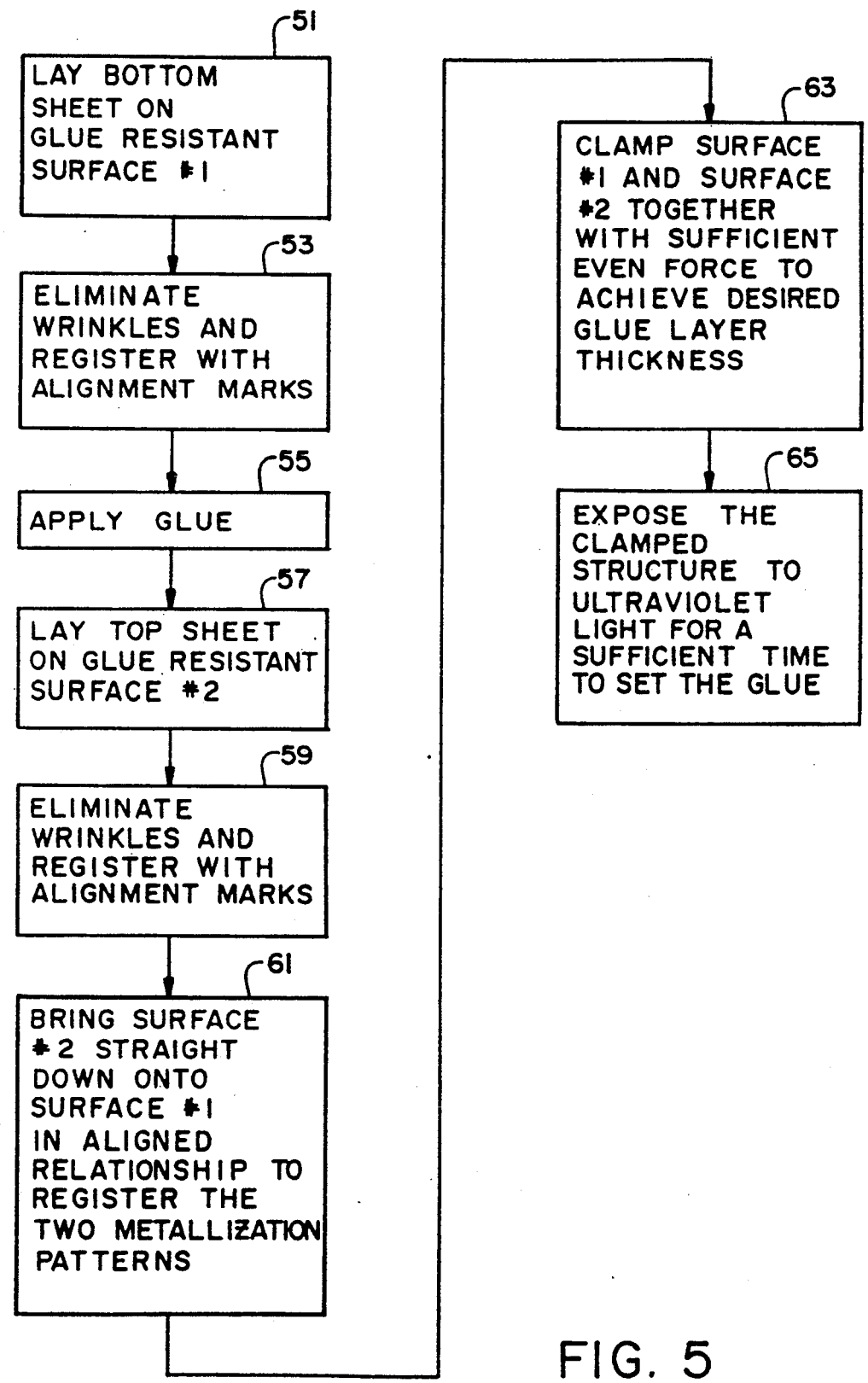
FIG. 5 is a flow chart of the process of manufacturing a bimorph according to the teachings of the invention.

Next, clamping to get the proper glue thickness must be performed as symbolized by step 63 in FIG. 5. There, surface 1 and surface 2 of the top and bottom pressure plates are clamped together with sufficient force, evenly applied over the surfaces, to squeeze the piezo films together sufficiently to achieve the desired glue layer thickness for layer 38 in FIG. 3. The glue layer thickness is a function of the amount of force applied. This amount of force will have to be experimentally determined by the user. Step 63 is the last step if the glue used is a nonultraviolet setting glue.

If the glue used is an ultraviolet setting glue, then the final step in the process is step 65 where the clamped structure is exposed to ultraviolet light for a sufficient time to set the glue. In the preferred embodiment, the time needed is approximately two hours using a standard 15 watt black light. The relative long time to set the glue is caused by the existence of the metalization film on the surfaces S1 and S4. This metalization filters out large amounts of the ultraviolet light thereby slowing the process of setting of the glue layer 38 between these two surfaces. Further, if ultraviolet setting glue is used, the glass pressure plates and glue resistant films used should be of materials which do not block the particular ultraviolet light wavelengths needed to set the glue. Further, the clamps used should not be placed in a location which would block the passage of ultraviolet light to the glue layer 38.

Referring to FIG. 4, more detail on the metalization patterns is shown. The four rectangular figures in FIG. 4 represent the four surfaces S1 through S4 shown for the bimorph laminate of FIG. 3. The metalization patterns in the preferred embodiment are sputtered gold with a thickness of 350 angstroms. Other metalization materials may be used, such as copper, provided that the metalization material will form a good bond with the particular type of electrical connection material chosen. In the preferred embodiment, this electrical connection material is conductive epoxy, but in alternative embodiments, a low temperature eutectic such as a mixture of bismuth and indium is used to sweat small copper pads approximately two millimeters on a side to the metalization pattern. Prior to soldering the copper pads onto the metalization patterns, fine wires are soldered to the copper pads using high temperature solder. The bimorph beams are extremely sensitive to high temperatures, and can be destroyed by being subjected to temperatures greater than 70°–80° C. either during the construction process or during operation. Further, the bimorphs exhibit undesirable thermal curl which causes them to distort at high temperatures unless the thermal curl can be completely eliminated by the annealing process described above.

In FIG. 4, the metalization pattern is shown as an unhatched area, and the unmetalized film is shown as a hatched area. For example, on surface S4, an unmetalized area 46 is shown which corresponds generally to the size and location of the high voltage connection pad 48 on surface S3. The purpose of the unmetalized portion 46 on surface S4 is to eliminate the electrostrictive action of the film in this region by eliminating the ground plane contact in this region. The metalization pattern in S3 is the high voltage electrode whereas the metalization pattern on surface S4 is the ground electrode. Electrostrictive behavior of the bottom film strip 34 is induced by charging the metalization pattern on surface S3 to a high voltage of approximately 200 volts. The surface S4 is connected to ground potential so that a high strength electric field passes through the bottom piezo film 34. Because there is no ground plane contact lying under the high voltage contact pad area 48, no electrostrictive behavior occurs in this region. The purpose of eliminating electrostrictive behavior in the vicinity of the high voltage contact pad 48 is to improve the lifetime, reliability and mechanical integrity in general of the high voltage contact in the area 48. If the dimensions of the surface of the area 48 were changing under the electrical contact, the integrity of that contact would be compromised, and the contact could eventually fail.

The unmetalized region around the edges of surface S3 is present to improve the electrical integrity of the high voltage contact in preventing shorts between the high voltage metalization pattern on surface S3 and the ground plane connected to the metalization pattern on the surface S4. Since the piezo film 34 is only 9 microns thick, if the etched-back region on surface S3 were not present, only 9 microns of polymer film would exist between the high voltage contact and the ground plane. This could cause shorts between the high voltage contact and the ground plane if dirt, glue or other contaminating materials caused a bridge between the ground plane and the high voltage electrode. The unmetalized region around the edges of the surface S3 minimizes this possibility. Further, this unmetalized region also reduces the possibility of electrostatic pinning caused by edge fields. If the metalization pattern on surface S3 were to extend all the way to the edges, an electrical field between the high voltage electrode and the ground plane 9 microns away would exist in the edge space around the edges of the bottom piezo film 34. Because opposite charges attract by electrostatic force, and the ground plane could be considered an opposite charge, there would be an electrostatic attraction caused by the edge field. The force exerted by this edge field attraction could make it more difficult for the bimorph to lift itself up and away from the ground plane when the shutter is to be withdrawn from the light path.

The surface S2 is unmetalized in the preferred embodiment since it is only necessary to generate an electric field through the top piezo film 36. This is accomplished by the presence of the metalization pattern on the surface S3 and the ground plane metalization pattern on the surface S1 of the top sheet 36. In alternative embodiments, the surface S2 could be metalized in a similar fashion to the surface S3 if an electrical connection for high voltage could be made to this surface. This could be a preferable construction because it would cause the intensity of the electric field through the piezo film 36 to be the same as the intensity of the electric field through the piezo film 34. As the bimorph is presently constructed, the electric field through the piezo film 36 is somewhat attenuated by the presence of an additional 5 microns of spacing between the high voltage electrode and the S1 surface ground plane electrode caused by the presence of the glue layer 38. However, the inconvenience of making an electrical contact to a metalization pattern on the surface S2 is judged to far outweigh the advantage of having the electric field intensities identical in the films 34 and 36. One way of making this electrical connection is to use conductive epoxy to bond the two piezo films together to form the bimorph.

The unmetalized region 50 on the surface S1 is intended to prevent shorts between the ground plane electrode on the surface S1 and the high voltage electrode on the surface S3. The edge 52 of the top strip 36 will coincide with the dotted line of the high voltage pad boundary shown on the surface S3. This is because only 9 microns of piezo film would otherwise separate the high voltage electrode from the top ground plane electrode, and shorts could easily occur if dust, glue or other contaminating materials happen to simultaneously contact the two electrodes.

In the preferred embodiment, the metalization pattern shown in FIG. 4 is formed by sputtering gold onto the piezo film. However, the sputtering process for gold causes high temperature due to the energy needed to sputter the heavy gold atoms off the target. Thus, in alternative embodiments, other metalization patterns may be used—such as copper, since lower energies can be used to sputter copper. Aluminum will not work, however, since it is too difficult to bond to aluminum through the aluminum oxide unless some steps are taken to eliminate the oxide.

There is a very high current density at the locations of the electrical connections. If the electrical connection is not of a low resistivity, failure can occur caused by heating in the area of the contacts, arcing or other such phenomena. It is important, however, that the metalization pattern have low resistance and be free of pinholes, stretches and other defects which could raise the resistance at the area of the defect. The reason for this is that high current densities will exist in the metalization films during changes of voltage levels during normal operation. The gold films separated by insulating material together comprise a capacitor. This capacitor is being driven by fast rise time, square-wave high voltage signals to get rapid turn-on and turn-off times. Each time the high voltage changes voltage level, a high current density results as the capacitor charges or discharges. If a localized defect raises the resistance in a particular area, arcing can occur in that area. This arcing can eventually cause the defect to become an open circuit thereby destroying the utility of the bimorph.

The unmetalized portions of the surfaces S1 through S4 can be achieved either by etching or by masking during the metalization process. An alternative embodiment is to blow the gold off the bimorph edges in the areas to be unmetalized using a ultraviolet light laser. Because the process of etching the gold film using standard photolithographic techniques is messy, somewhat inaccurate and slow, and because it creates waste disposal problems for the used etchants, it is preferred to use masking techniques during the metalization process. In such a process, the unmetalized areas are masked off using standard photolithographic and masking techniques prior to the sputtering of the metal coating. When the masking material is removed, the desired metalized and unmetalized areas for each bimorph surface will be defined. The etching process works perfectly well, however, and the accuracy of the etching need not be very high. An RMS variation of edge straightness on the order of 25 microns is acceptable.

Figure 6:
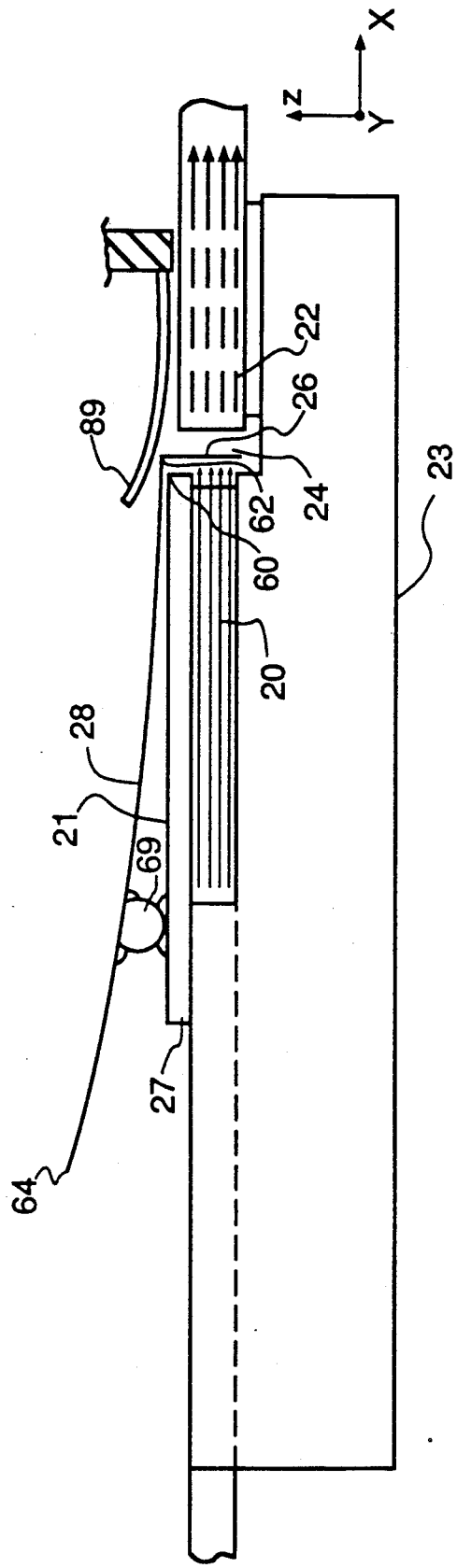
FIG. 6 is a side view of one embodiment of the bimorph light modulator at a point in the construction when the bimorph has been shutter registered, and is ready to be fastened down for purposes of making electrical connections.

Referring to FIG. 6, there is shown the bimorph light modulator in a side view at a point in the process of constructing the light modulator after registration has been completed. The mounting and registration process is important, because it eliminates prestresses in the bimorph cantilevered beam and insures that the off state of the bimorph will be in a position such that the shutter 26 completely blocks all light paths from the input light guide 20 to the output light guide 22.

There are four requirements for the mounting and registration process. First, the attachment must be secure and long-lived. Second, the shutter end of the bimorph should be registered such that the lowest tip of the shutter, i.e., the point on the shutter having the lowest Z axis coordinate, should be registered to within 25 microns of the point on the perimeter of the input fiber 20 having the lowest Z coordinate. Further, the shutter 26 should be registered to within 25 microns along the X axis from the output end of the input light guide 20. The bottom edge of the shutter must be below the lowest edge of the input fiber with a minimum overhang of 50 microns. The third requirement of the registration and mounting process is that the bimorph should make a small angle with the substrate surface 21 in order to beneficially use the viscous damping effect of the air advantageously to damp resonance and chatter while simultaneously avoiding or lessening the effect of hydrostatic sticking of the bimorph to the surface 21 of the substrate. This hydrostatic sticking would occur if the bimorph were allowed to come into contact with the surface 21 along the whole length of the bimorph. A further requirement of the mounting process is that when the bimorph is registered, no stresses should exist in the bimorph other than those intended to be there, and all bimorphs should have the same level of prestress.

Figure 7:
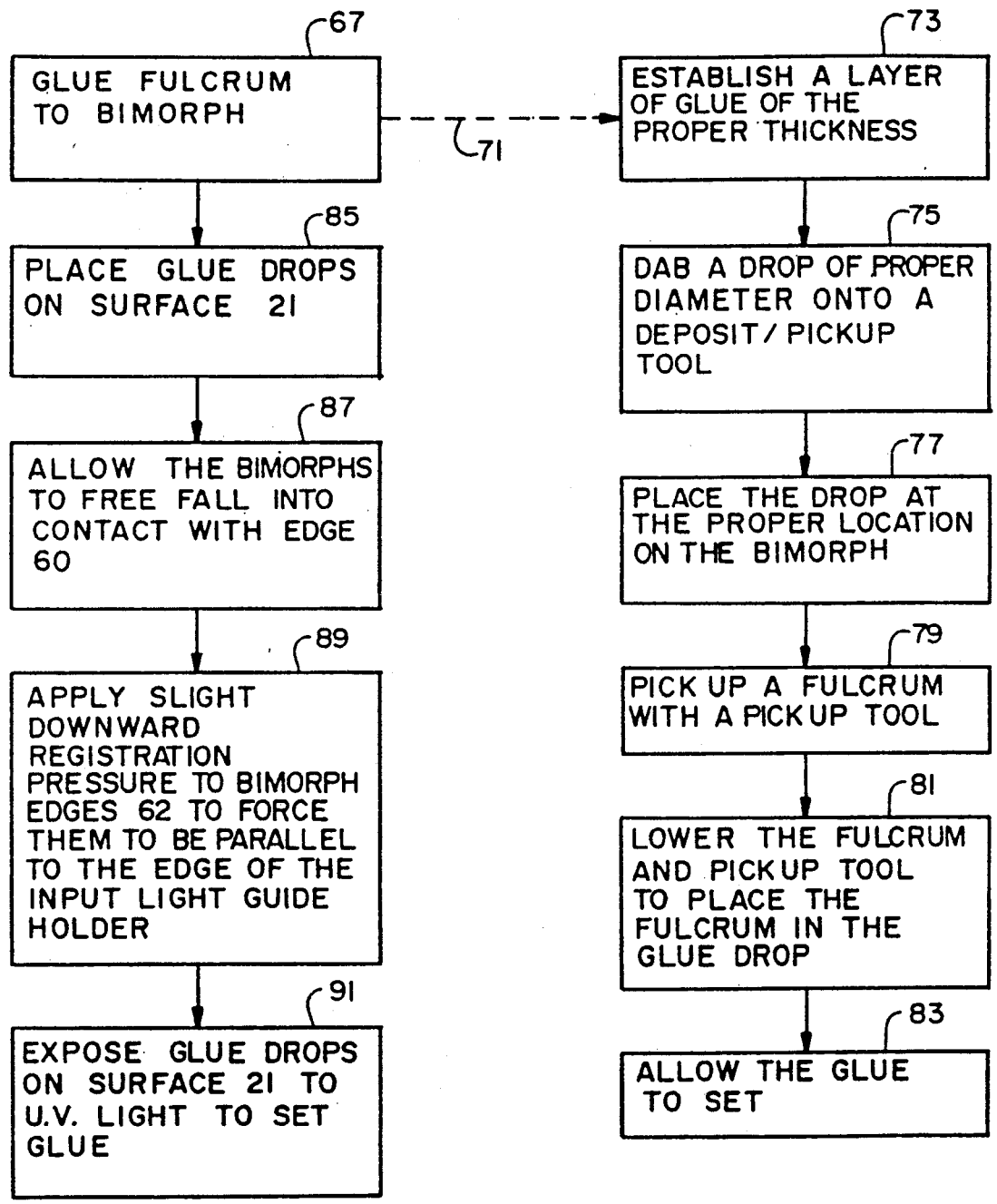
FIG. 7 is a flow chart of the bimorph mounting process according to the teachings of the invention.

FIG. 7 is a flow diagram of the process of mounting and registering the bimorph which achieves the above-stated objectives. With concurrent reference to FIGS. 7 and 6, this process will now be explained. The first step is represented by block 67 where a hemispherical fulcrum 69 is glued to the bimorph. The size of the fulcrum and the location where it is attached to the bimorph are selected so that the bimorph makes a shallow angle with the top surface 21 of the input light guide holder 47, which may be brass shim stock. Typically this shallow angle is about 5°, but other angles will work. The purpose of this shallow angle is to allow the air to be used for cushioning or viscous damping of the landing of the bimorph on the edge 60 of the input light guide holder 47 when the shutter 26 is lowered into the gap 24. Because the bimorph 28 is approximately 3-4 mm wide, and is very light, the air between the bimorph 28 and the surface 21 tends to cushion the landing of the bimorph on the edge 60 as the air "mushes" out of the way when the bimorph 28 is landing. This damping effect tends to reduce the bounce of the bimorph 28 up and away from the edge 60 in the positive Z direction which would occur if the bimorph 28 were to land on the edge 60 in a vacuum. Further, the damping effect of the air tends to minimize resonance vibration which will occur if the natural mechanical resonance of the cantilevered beam is excited by the driving signal. Such bounce and resonant vibration will destroy the reproducibility of the bimorph response to a given driving signal since the chatter and resonance tends to alter the amount of light flux coupled between the input light guide 20 and the output light guide 22 and because the bounce and resonant vibration may not be the same each time the same input signal is applied.

The shallow angle also minimizes the hydrostatic "pinning" effect which would otherwise occur if the bimorph 28 were allowed to lie flat on the surface 21. The reader can visualize this hydrostatic sticking effect by trying to pick up a piece of paper by its edge which is lying flat on a glass surface. This hydrostatic effect is caused by the evacuation of much of the air between the bimorph 28 and the surface 21 when the bimorph 28 is allowed to settle flat onto the surface 21. When an attempt is made to raise the bimorph away from the surface 21, a temporarily lower air pressure would exist in the space between the bimorph and the surface 21 until air can rush in from the sides to equalize the pressure. During the time when the air is rushing in from the side before the air pressure on the top and bottom of the bimorph is equalized, there exists a pressure differential. This differential exists because there is higher air pressure on top of the bimorph than underneath it. This pressure differential tends to resist movement of the bimorph 28 up and away from the surface 21. By establishing the fulcrum 69 so that the shallow angle is formed between the bimorph 28 and the surface 21, evacuation of air from the space therebetween is eliminated so that the hydrostatic pinning effect cannot occur. The proper shallow angle is achieved by using a hemispherical fulcrum which has a diameter of 1.5 mm and which is located at the proper point on the bimorph to establish the angle.

The point of attachment of the fulcrum to the bimorph is also selected to be left of the center of gravity of the bimorph such that the shutter end to the right of the fulcrum 69 in FIG. 6 is heavier than the portion of the bimorph to the left of the fulcrum. This imbalance aids in the registration process as will become clear from the discussion below.

These substeps in gluing the fulcrum to the bimorph symbolized by step 67 in FIG. 7 are shown to the right of the block 67 in FIG. 7 as indicated by the dashed leader line 71. The first substep is step 73 wherein a layer of glue of the proper thickness is established. The proper thickness may be experimentally determined with the criterion being that the amount of glue used to glue the fulcrum to the bimorph should not be so excessive that it becomes enough to cover the fulcrum and should not be so little as to render the attachment of the fulcrum not mechanically secure. A good way of establishing the proper thickness for the glue layer is to fasten two metal shims or strips of the desired glue layer thickness to a glass substrate and then fill the slot between the two shims with glue. A squeegee or other straight edge may then be dragged over the top of the two strips leaving a layer of glue of the desired thickness between the two strips.

The next substep is step 75, wherein a dab of the glue from the glue layer made in substep 73 is picked up using a pickup tool. The desired thickness of the glue drop so picked up will be established by the thickness of the layer of glue established in substep 73 while the diameter of the drop will be established by the diameter of the tip of the pickup tool. Typically, the pickup tool is a small truncated cone with the truncation at the tip of the cone at the point of the desired diameter for the glue drop. The pickup tool is simply lowered into the glue layer and picked up, thereby leaving a drop of glue at the tip of the pickup tool by the adhesion of the glue to the pickup tool tip.

The next step, symbolized by block 77, is to place the drop of glue at the proper location on the bimorph. In the preferred embodiment, this is accomplished by a jig. The bimorph is placed on a flat surface of the jig and registered with registration marks. Vertical guide assemblies are provided at locations relative to these registration marks such that the pickup tool may be slid down these vertical guides in such a manner that the tip of the pickup tool will land on the bimorph at the precise location where the fulcrum is to be attached. The drop of glue on the tip of the pickup tool will then be deposited at the proper location on the bimorph.

Next, a fulcrum is picked up by a fulcrum placement tool. In the preferred embodiment, the fulcrum is picked up by a vacuum tool which has a tip which mates with the curved surface of the fulcrum. The tip has a vacuum channel in it connected to a vacuum pump such that the fulcrum may be retained on the tip by suction through application of vacuum to the vacuum channel. Alternative methods of picking up the fulcrum could include magnetic attraction or electrostatic attraction.

Next the fulcrum and the pickup tool are lowered so as to place the fulcrum in the glue drop at the proper point on the bimorph. This step is accomplished in the preferred embodiment using the same jig as was used to register the drop of glue at the proper location. That is, the pickup tool is lowered down the vertical registration guides such that the tip of the pickup tool automatically arrives over the location of the glue drop. The fulcrum is then lowered into the glue drop and the vacuum to the pickup tool is cut off so that the pickup tool may be removed and the fulcrum will stay in the glue drop. The final step is to allow the glue to set as symbolized by block 83.

The next step in mounting the bimorph and registering it is to place the ultraviolet setting glue drops on the surface 21. This step is symbolized by the block 85 in FIG. 7. These glue drops will securely mechanically attach the fulcrums 69 to the surface 21 for the bimorphs on each particular shelf such as that shown in FIG. 2. The glue drops are ultraviolet setting in the preferred embodiment and are sized such that they will form a secure mechanical attachment while not being so large as to cause difficulties in other steps of the process. The size of the glue drops can be controlled in a similar fashion as was done in substeps 73 and 75 previously discussed. The location of the glue drops on the surface 21 can be accomplished in a similar fashion as discussed above with reference to step 77. A different jig may be used in which the structure of FIG. 6 is registered such that the vertical guides will correctly position the glue drops on the surface 21. It is also possible to use the same jig as was used to glue the fulcrums to the bimorphs and to use the same vertical registration guides.

The process of attaching the shutter is to glue a strip of foil to the shutter end of the bimorph. The length of the shutter is then cut by registering the bimorph in a jig and using a cutting tool registered to guides on the jig to register the cutting position of the blade on the foil. A slight force is then applied to the cutting tool to cut through the foil. The bimorphs are then clamped down by another tool such as a plastic block which is registered on the jig to clamp all or part of the bimorph on the film side of the shutter holding edge down to a flat surface while exposing the film. The clamping tool has a surface aligned with the shutter edge which is perpendicular to the surface of the bimorph and defines a plane in which the line defined by the edge of the bimorph lies. A sponge is then used to lift the foil up and bend it at the edge of the bimorph so as to bend the foil to lie on the perpendicular surface defined next above. This bends the shutter to the proper angle. This process is done before the fulcrums are lowered into their respective glue drops.

The next step is to allow the bimorphs to free fall into contact with the edge 60 such that the shutter 26 is in the gap 24. This may be done by hand placement or in automated fashion. In either process, after the fulcrums are placed in their respective glue drops, the bimorphs are released from a position with their shutter ends held above the bottom stop surface 60 such that the shutter ends fall down into contact with the edge 60. A vacuum, electrostatic or other type of tool may be used to retain the bimorphs 28 in the position above the bottom stop until the free fall is triggered at which time the force holding the bimorph above the bottom stop is released so that gravity takes the bimorph down to the bottom stop.

In the preferred embodiment, a registration tool having vacuum ports is used to maintain the bimorphs 28 in a raised position by suction forces prior to the free fall. This same tool is used to hold the bimorphs in the proper position to allow the fulcrums to be lowered into the corresponding glue drops. The bimorphs and the tool are then lowered down vertical registration guides until the fulcrums 69 are located in the glue drops on the surface 21. The shutter ends 62 of the bimorphs will be in a raised position such that the shutter 26 is not in the gap 24 at the point when the fulcrums 69 contact the glue drops on the surface 21.

The free fall portion of the registration process is then performed. To accomplish this in the preferred embodiment, the vacuum is released such that the bimorphs fall into their positions in contact with the edge 60. Because the fulcrums 69 are hemispherical in shape and because the rounded surfaces face the surface 21, during the free fall into registered position, any cant of the shutter edge 62 at an angle to the Y axis may be eliminated during the fall. To ensure that the shutter edge 62 is parallel to the Y axis prior to setting of the glue drops on the surface 21, an alignment tool having flexible projecting fingers 89 is used. This tool is brought close enough to the edges 62 of the bimorph such that one finger 89 comes into contact with each bimorph shutter edge 62. The flexible fingers 89 are elastic but somewhat malleable so that each finger may be aligned with the center line of the bimorph to which it corresponds. Each finger is elastic enough to apply a slight downward pressure in the direction of the negative Z axis to the edge 62. Because the edge 60 is parallel to the Y axis, the slight downward pressure will force the edge 62 to register itself parallel to edge 60 and to the Y axis. The resultant structure is then exposed to ultraviolet light to set the glue drops on the surface 21, thereby mechanically securing the fulcrum 69 in registered position. These latter two steps of applying slight downward pressure and then exposing the glue drops to ultraviolet light are symbolized by blocks 89 and 91 in FIG. 7.

Note that the process of free fall registration allows each bimorph to settle to a registered position without imposing stresses on the bimorph film in the registration process itself. If such prestresses were fixed into the bimorphs during the registration process and the glue drops on the surface 21 were then set with each bimorph having different prestress loads, each bimorph would respond differently to the same input signal, i.e., each bimorph would begin to open at a slightly different voltage. This would cause undesirable variation from one pixel to another for a uniform input signal. The registration process is important, as is the elimination of as much unintended prestress as possible in the bimorph structure so as to insure that all the bimorphs begin to open at approximately the same voltage. That is, all the bimorphs in a particular application should start their upward movement to withdraw the shutter 26 from the gap 24 at approximately the same voltage.

Some mechanical prestressing of the bimorphs is desirable, because bimorphs exhibit a phenomenon known as elastic lag. The effect of this property is to distort the response of the bimorph when driven by a pulse-width modulated electrical signal. This distortion takes the form of a D.C. bias which is introduced into the optical response of the bimorph gate. In order to avoid this problem and to insure repeatability in the response, mechanical prestressing of the bimorphs is necessary.

The elastic lag which causes this problem is the result of the properties of the bimorph film. When the bimorph is subjected to a voltage to cause it to bend upward, the shutter 26 will be removed from the gap 24. When this voltage is released, the bimorph straightens out and simultaneously, the shutter end 62 begins to fall so as to lower the shutter 26 back into the gap 24. However, as the bimorph straightens out, it does not return in a continuous fashion to the registered state shown in FIG. 6. Instead, the bimorph straightens out to a point somewhere above the registered position, i.e., some point in the positive Z direction above edge 60. From that point, the rate of descent of the bimorph changes to a much slower rate due to the effect of elastic lag. Since this adversely affects the amount of time needed to "close" the bimorph such that the shutter completely occludes the light path, the elastic lag shows up as a D.C. bias in the optical response of the bimorph gate.

The mechanical prestressing solution to this problem is to place shims underneath the input light guide 20 and the output light guide 22 so as to raise both light guides and the edge 60 of the bottom stop to a higher point on the Z axis. Alternatively, the position of the bottom stop registration edge 60 may be raised and the light guides left where they are if a longer shutter is used so that the light path is completely occluded when the bimorph is resting on the edge 60. This new point for the edge 60 is selected to be the point where the elastic lag effect starts. Thus the movement of the bimorph downward is stopped by the edge 60 at the point where the elastic lag would normally take effect. In some embodiments where the driving frequency of the bimorph gate is not high enough to make the elastic lag a problem, these shims may be omitted.

Figure 8:
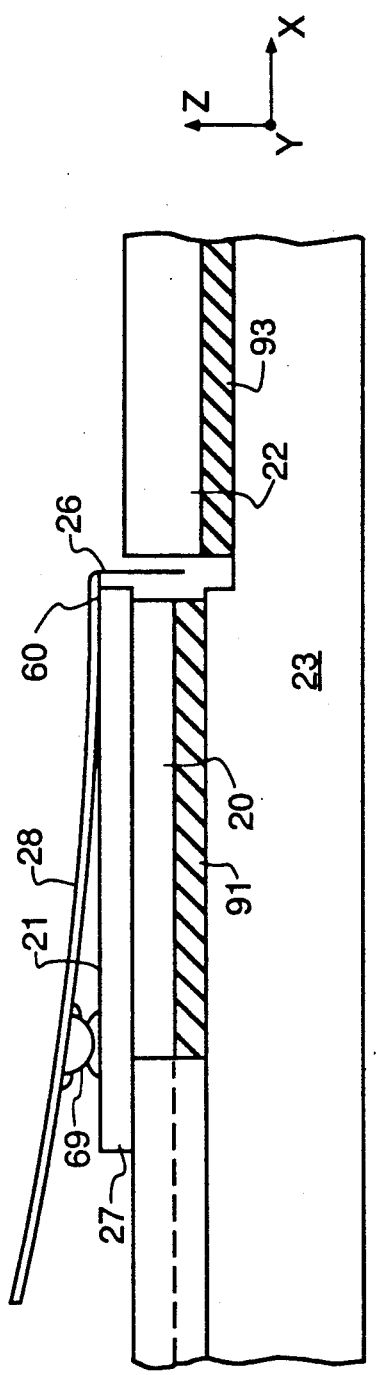
FIG. 8 is a side elevation view of the registered position of the bimorph in a prestressed embodiment to eliminate the effects of elastic lag.

The shimmed structure is shown in FIG. 8 with shims 91 and 93 raising the input light guide 20 and the output light guide 22 by an amount equal to the distance covered by the elastic lag. Thus the top edge of the bottom stop, i.e., edge 60 is at the point where the elastic lag starts in the downward movement of the bimorph 28 in the negative Z direction.

Figure 9:
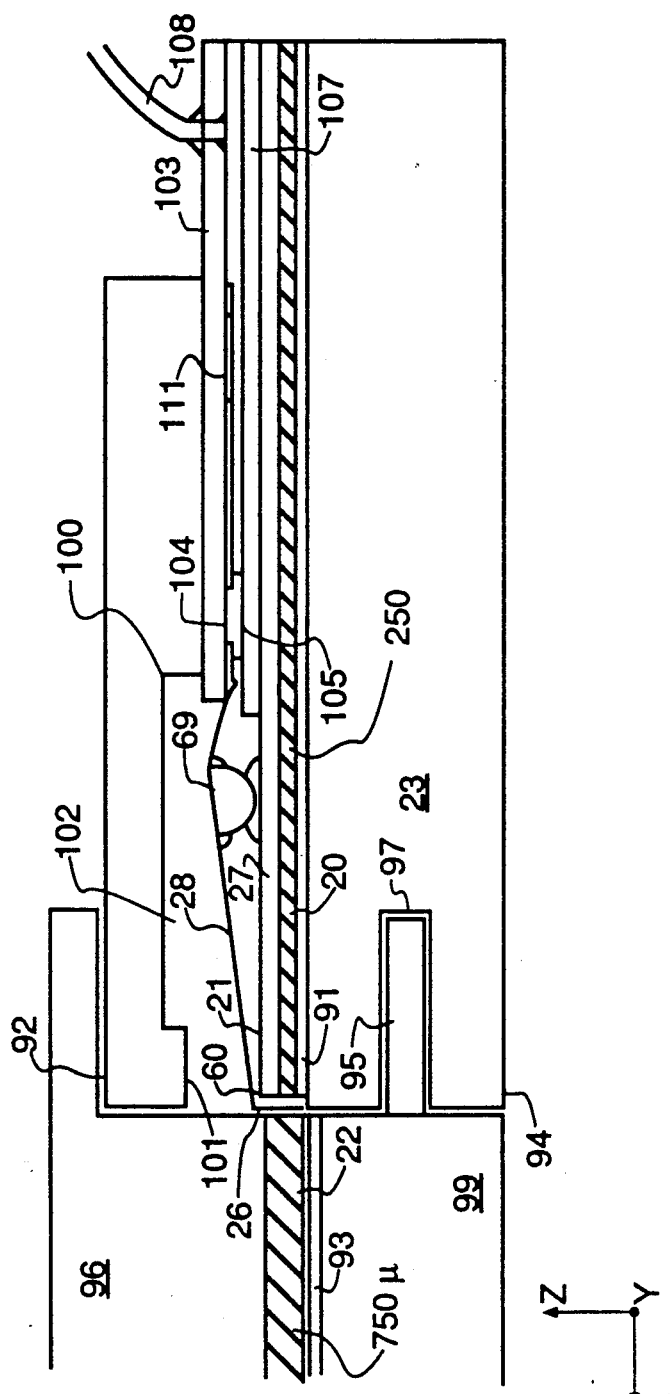
FIG. 9 is a side elevation view of another embodiment of the light modulator of the invention having output optics which may be attached readily by plugging the output optics module onto the bimorph light modulator shelf.

Referring to FIG. 9, there is shown a side view of the bimorph construction using a top stop. In the structure of FIG. 9, the brass shim stock 47 in FIG. 6 is augmented by a five mil layer of double sided foam tape 91. Prebiasing in FIG. 9 is obtained by inserting additional shims between the fiber 20 and the tape 91 after mounting of the bimorph is done. Additional shims 93 are then placed under the output light guide to maintain the alignment of the light paths of the two light guides. FIG. 9 also shows an alignment pin and hole combination 95 and 97, respectively, which are used to align the substrate 23 supporting the bimorph to an adjoining substrate 99, which supports the output light guide 22. This alignment pin and hole combination insures that the center lines of the two light guides 20 and 22 are coincident. In an alternative embodiment, the pin/hole combination 95 and 97 are replaced with a pair of grooves in the top surface 92 and bottom surface 94, respectively, of the substrate 23. These grooves (not shown) are engaged by projections (not shown) on the substrate 99 and the top piece 96 coupled to the substrate 99. These projecting portions engage the grooves so that the "exit optics", i.e., the substrate 99 and accompanying structures, may be plugged or unplugged easily. After the grooves are engaged by the exit optics, the substrate 99 may be slid along the Y axis until the centerlines of the light guides are aligned.

FIG. 9 also shows a top stop 101. The top stop 101 is a projecting portion of a cover piece which is mechanically affixed to a top-printed circuit board 103. The cover 100 serves to protect the bimorph 28 from any physical intrusions by gusts of air or physical objects. This top stop 101 is placed in the path of movement of the bimorph 28 to limit the maximum amount of upward movement that the bimorph 28 may make. The top stop 101 is placed at a position on the Z axis such that the shutter end of the bimorph 28 may move upward in the positive Z direction only enough to remove the shutter 26 from the gap 24, far enough to clear all light paths from the input light guide to the output light guide. When the bimorph 28 nears the top stop 101, any resonant ringing in the cantilevered beam is also eliminated by viscous damping. The positioning and size of the fulcrum 69 in FIG. 9 are as described earlier with reference to FIG. 6, and the width of the bimorph 28 is such as to cause viscous air damping to occur to minimize bounce or chatter when the bimorph 28 lands on the bottom stop 60. The same viscous air damping occurs when the bimorph comes into contact with the top stop if the top stop is at least one third the length of the bimorph from the shutter end to the fulcrum position. The cavity 102 is useful in that it allows clearance for any curves in the bimorph when the bimorph is raised to a position to be in contact with the top stop.

The printed circuit board 103 lies above the bimorph 28 on the Z axis, and is one of a pair of printed circuit boards used in the embodiment of FIG. 9. The other printed circuit board 107 lies beneath the bimorph. The purpose of these two printed circuit boards is to allow electrical connections to be made to the two metalized surfaces which act as ground planes for the bimorph and to the single metalized surface which acts as the high voltage electrode of the bimorph. The ground connections to surfaces S1 and S4 of the bimorph are shown at 104 and 105, respectively. The ground connection 104 between the top surface S1 of the bimorph and a metalized conductive pattern on the printed circuit board 103 may be made by a low temperature eutectic solder or, preferably, by a conductive epoxy. The ground connection 105 couples the metalized pattern on the surface S4 of the bimorph to a metalized conductive layer on the top surface of the printed circuit board 107. The metalized conductive pattern electrically connected to the electrical contact 104 makes contact with a ground wire in a ribbon cable 109 which has multiple wires connected to various conductive patterns on printed circuit boards 103 and 107. The conductive pattern on printed circuit board 107, which is electrically connected to the ground connection 105, also leads to a ground wire in the ribbon cable 109 and is electrically connected thereto.

The high voltage connection to the bimorph is shown at 111. This high voltage connection is either a low temperature eutectic solder, such as indium/bismuth, or a dab of conductive epoxy coupling the metalized area 48 on the surface S3 of the bimorph to a conductive pattern formed on the underside of the printed circuit board 103. This conductive pattern leads to and is electrically connected to a high voltage wire in the ribbon cable 109. The ribbon cable 109 can go to a remotely located bimorph driver circuit in the embodiment shown in FIG. 9.

A better understanding of the manner in which the electrical connections are made may be gained by referring to FIGS. 10 and 11. FIG. 10 shows a side view on a larger scale of the bimorph high voltage and ground connections, while FIG. 11 shows a top view of the high voltage and ground connections. The particular embodiment shown in FIGS. 10 and 11 uses a single printed circuit board 113 as the substrate. A high voltage conductor 115 is formed on the surface of the printed circuit board 113 as a metalized trace. A ground conductor 117 is also formed on the surface of the printed circuit board 113 as a metalized trace. In FIG. 11 three individual high voltage traces 115, 119, and 120 are shown so that the individual bimorphs 121, 123, and 125 may be individually driven with signals indicating the light intensity to be emitted from the pixels controlled by those particular bimorphs. A single shared ground trace 117 is also shown. Each of the bimorphs in FIG. 11 is both mechanically affixed to the substrate 113 and electrically connected to the corresponding high voltage trace by a dab of conductive epoxy, shown as glue drops 127, 129, and 131 in FIG. 11. The metalized patterns on the surfaces S1 of the three bimorphs in FIG. 11 are shown connected to the ground trace 117 by individual glue drops of conductive epoxy 133, 135, 137, and 139. The surfaces S4 on the underside of the bimorphs shown in FIG. 11 are coupled by conductive epoxy drops 141, 143, and 145 to the shared ground trace 117. These latter glue drops are shown in phantom in FIG. 11. The epoxy glue drops shown in FIG. 11 serve not only to make the electrical connections but also serve as the mechanical mounting of the nonshutter end of the bimorph to the substrate 113.

Figure 12:
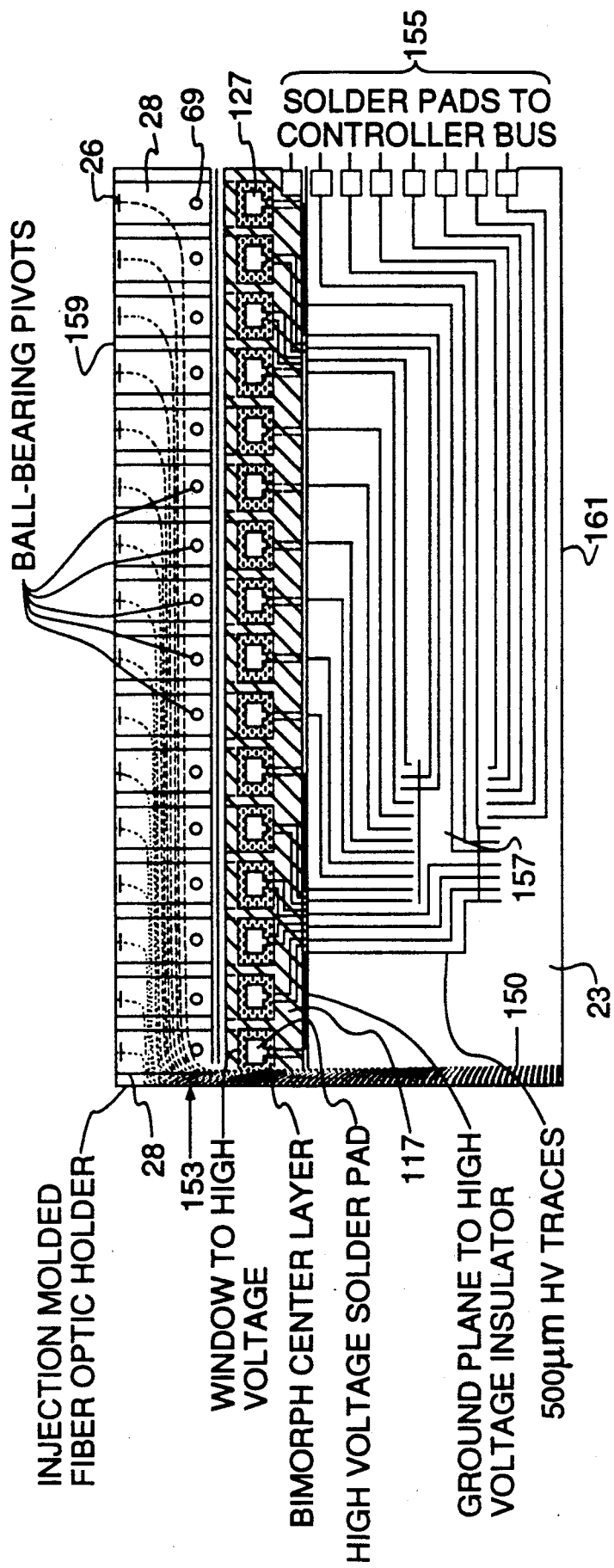
FIG. 12 is a top view of one embodiment of the shelf containing multiple light modulators according to the teachings of the invention.

Referring to FIG. 12, there is shown one possible embodiment for a shelf layout of sixteen adjacent bimorph electrical modulators. In this particular embodiment, the fiber optic input light guides 20 are bundled together at the left side of the board to form an input light bus 150. The individual input light guides then branch off to their individual bimorphs, as shown generally at 153. An edge connector 155 allows power, ground, and logic level signals to be input to the board to control the light intensity modulation of each bimorph. A 16-channel high voltage driver (not shown) is mounted on the board generally at 157. The incoming pixel data for each bimorph is coupled to the 16-channel high voltage driver by one of the conductive metallic traces etched on the surface of the shelf, which is typically a printed circuit board or other insulating-type substrate material. Phenolic printed circuit board is preferred, however, since techniques for forming conductive strips on such boards are well known. The high voltage signals from the high voltage driver to the bimorph center electrodes are then conducted to the bimorphs by metallic conductive traces on the printed circuit board substrate 23. The plan view of FIG. 12 is shown without the top stop in position so as to expose the details of the interconnections of the bimorphs to the edge connector and the high voltage driver. The metallic trace for the ground plane 117 is also not shown in FIG. 12. The high voltage connection in FIG. 12 is shown as a solder pad, as used in certain embodiments. This solder pad is typically a copper plate which is soldered to the metalized pattern for the high voltage electrode using the low temperature eutectic bismuth/indium solder. Prior to this step, a wire is bonded to this copper pad and to the particular high voltage trace conductor on the surface of the printed circuit board 23, which corresponds to the light intensity signal for that particular bimorph. In alternative embodiments, the connective epoxy method of forming the high voltage and ground plane connections, as shown in FIG. 11, may be used.

The preferred embodiment of the typical shelf layout uses the conductive epoxy electrical connection structure of FIG. 11 and also uses the lamination sequence shown in FIG. 2. This allows the input light guide 20 for each bimorph to pass through from the front edge 159 of the board straight back to the rear edge 161 of the board. This eliminates the need to bend all the fibers to bring them together at one side of the shelf as the light bus 150. Other than these differences, the layout of the shelf is substantially the same as shown in FIG. 12.

Figure 13:
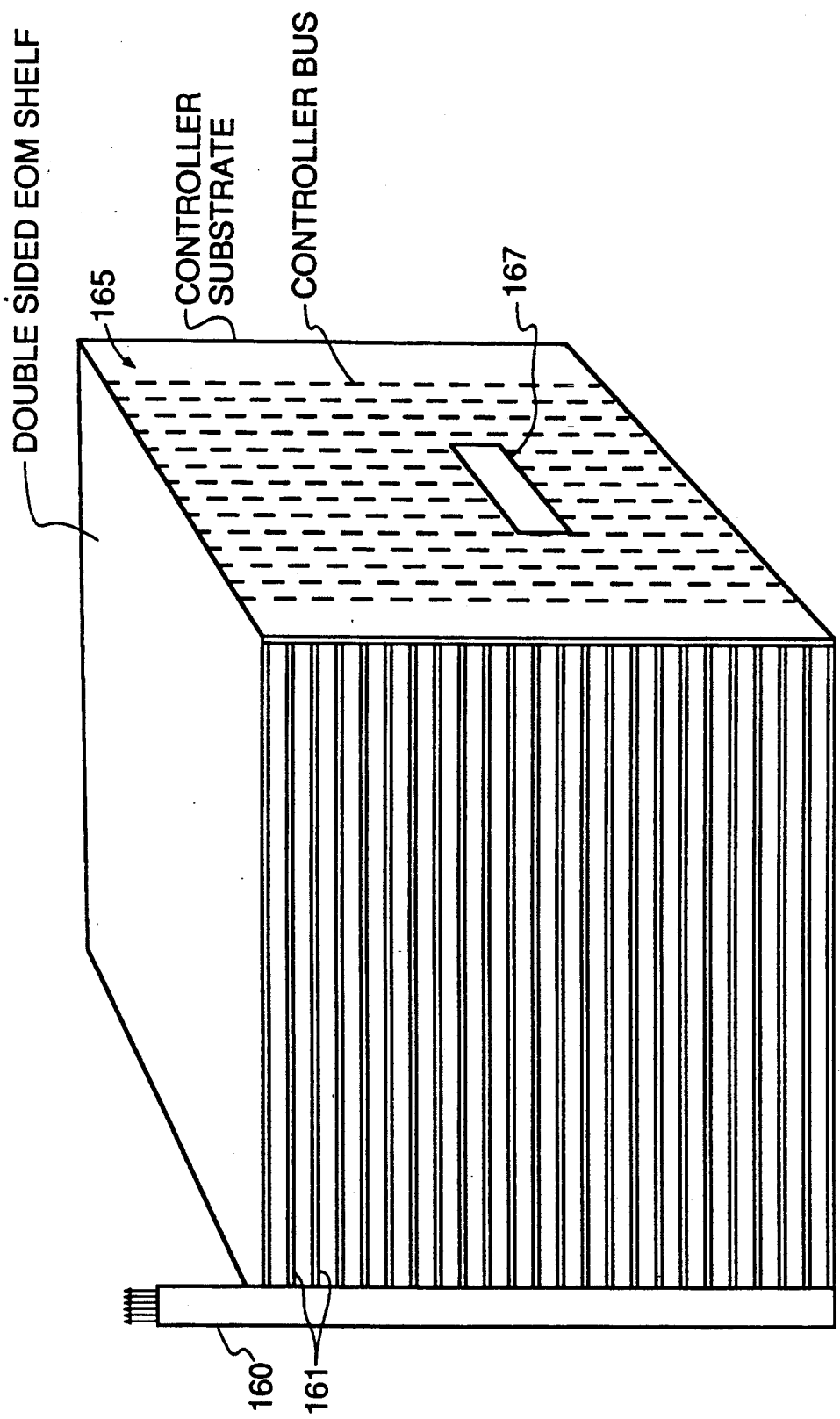
FIG. 13 is a perspective view of an embodiment of a module containing a plurality of the shelves shown in FIG. 12.

An electrooptic modulator module may be constructed using a plurality of the shelves as shown in FIG. 12. Such a module is shown in FIG. 13. In FIG. 13 a plurality of shelves, as shown in FIG. 12, are stacked vertically in a framework with sixteen shelves stacked vertically, each shelf containing sixteen bimorphs. The input light guides are coupled to a tricolor light bus 160, which contains three fiber optic light guides, each carrying feeder light of one of the three primary colors red, green, or blue. In color display applications, each pixel will be comprised of one red bimorph, one green bimorph, and one blue bimorph. The relative hue and intensity of each pixel then will be controlled by three signals which modulate the relative intensity of each of the three primary colors. The overall brightness level of that pixel can be controlled by modulating the light intensity of all three colors simultaneously by equal amounts. This is done by changing the duty cycle of all three primary colors for that pixel simultaneously to increase the on time or decrease the on time.

In the embodiment shown in FIG. 13, the tricolor light bus 160 is coupled to the fiber optic bundles of light guides that run down the left edges of the shelves constructed in accordance with the embodiment shown in FIG. 12. If shelves of the structure shown in FIG. 2 are used, the tricolor light bus 160 is coupled to the input light guides 20 as they emerge from the back edges 161 of the shelves. In some embodiments, a fiber optic edge connector will couple the tricolor light bus to the back edges 161 so as to couple light into the input light guides emerging from these back edges. The edge connectors 155 couple to a plurality of buses in a back plane surface 165. These power, ground, and logic signals in the back plane 165 emerge from the electrooptic modulator controller 167. The purpose of this controller 167 is to convert the brightness level and hue information for each pixel into a suitable analog or digital signal to control the application of high voltage to the corresponding bimorph which is modulating light for that pixel position in the display. The particular modulation scheme chosen depends upon the user's application. Therefore, the details of a particular modulation-type controller will not be specified in great detail. However, one suggested controller architecture is shown in FIG. 14.

Figure 14:
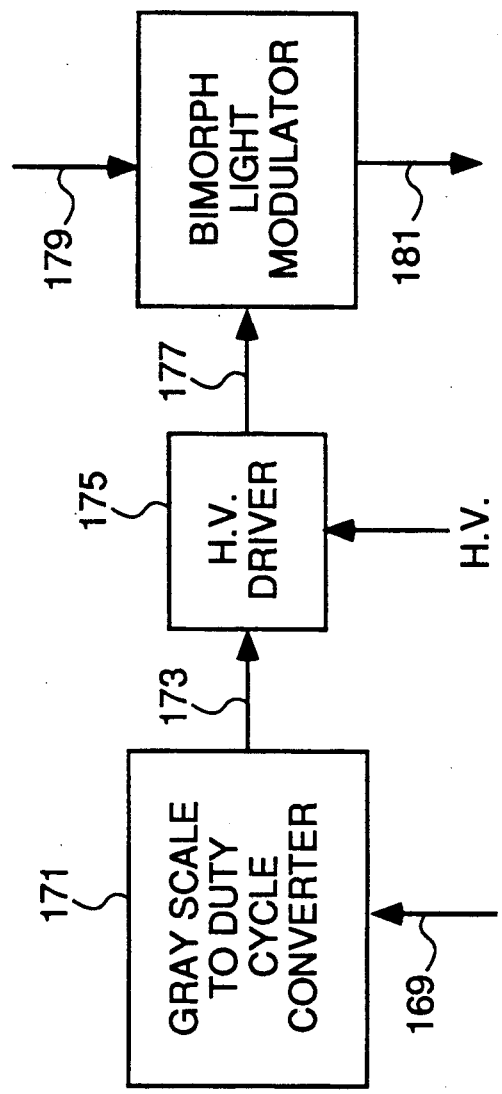
FIG. 14 is a block diagram of one type of electronic driver circuit which can be used in conjunction with the light modulator according to the teachings of the invention.

Referring to FIG. 14, there is shown one possible architecture for a controller for the type of bimorph light modulator disclosed herein. In this architecture, the desired light intensity for each pixel, or for each color component of each pixel, arrives on the line 169 as a digital or analog signal. In the preferred embodiment, the magnitude of this signal in terms of either its analog amplitude or its binary value will present the gray-scale value of desired intensity for that pixel. This gray-scale value is converted to a corresponding duty cycle by the converter circuitry 171. Because pulse-width modulation has been selected for this example of a controller architecture, the converter circuitry 171 must convert the magnitude of the incoming signal on line 169 to pulse widths having on times and off times which establish a duty cycle which will cause an average light flux to emerge from that pixel which will be perceived as the light intensity defined by the signal on the line 169. There are many ways of converting the gray-scale value to a duty cycle, and those skilled in the art will be able to devise suitable circuitry to accomplish this function.

The converter circuitry 171 outputs a duty cycle control signal on a line 173. This duty cycle control signal causes a high voltage driver circuit 175 to gate high voltage onto a line 177 during the on time of the duty cycle control signal on the line 173, and causes the high voltage driver 175 to block high voltage from being applied to the line 177 during the off time of the duty cycle control signal on the line 173. The line 177 represents the electrical connection to the center electrode of the corresponding bimorph. The bimorph then opens and closes the light path in the gap 24 in accordance with the duty cycle of the high voltage on the line 177. The input light to the bimorph in the input light guide 20 is represented by the light pathway 179 in FIG. 14. The pulses of output light in the output light guide 22 are represented by the line 181 in FIG. 14. Those skilled in the art will appreciate that different forms of modulation other than pulsewidth modulation may also be used to control the bimorph light modulator. Further, many different architectures are possible for the controller structure which implements the selected modulation scheme. All such controller structures and modulation schemes which can control the average light flux emerging from the output light guide 22 in accordance with an input electronic signal defining the desired pixel light intensity are intended to be included within the scope of the claims appended hereto.

An alternative embodiment of the invention is shown in FIGS. 15-31. The bimorph for use in this embodiment is shown as bimorph 200 in FIGS. 15 and 16. The bimorph 200 is thicker than the bimorph 28 of the above-discussed embodiments, with different functions and advantages discussed below.

The bimorph 200 is formed from two layers of conventional piezoelectric film, which are metalized on their upper and lower longitudinal surfaces. Thus, in FIG. 15 these are layers 210 and 220, which have metallic coatings on their upper and lower longitudinal surfaces as shown in that Figure, the coatings comprising, for example, 5 nm thick nickel covered by 30 nm aluminum. These metallic layers are shown as layers 230 and 240 (relative to the piezoelectric film 220) in FIG. 17.

Typically, the strips 210 and 220 will be formed from large sheets of piezoelectric film from which they may be simply cut to form the lengths and widths desired.

Figure 15:
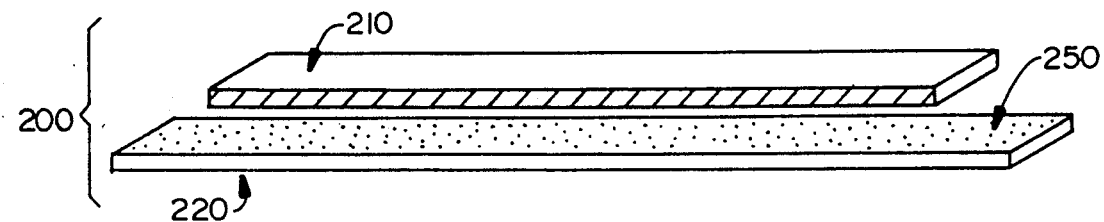
FIG. 15 is an exploded view of the construction of a bimorph according an alternative embodiment of the invention.

To construct the bimorph 200, a glue layer is disposed between piezoelectric films 210 and 220, such as glue layer 250 shown in mottled fashion in FIG. 15. The glue 250 may comprise an ultraviolet setting glue, an epoxy, a spray-on adhesive, or other suitable means of adhering the layers 210 and 220. Because the piezoelectric film layers 210 and 220 are relatively thick, the thickness of the glue layer 250 is not critical. Also, wrinkling, bubbling and the like are less likely to occur, and a quick-setting adhesive (such as five-minute epoxy) may be utilized. The glue 250 should be conductive, which electrically couples the opposing metalized faces of the upper and lower films 210 and 220.

Figure 16:
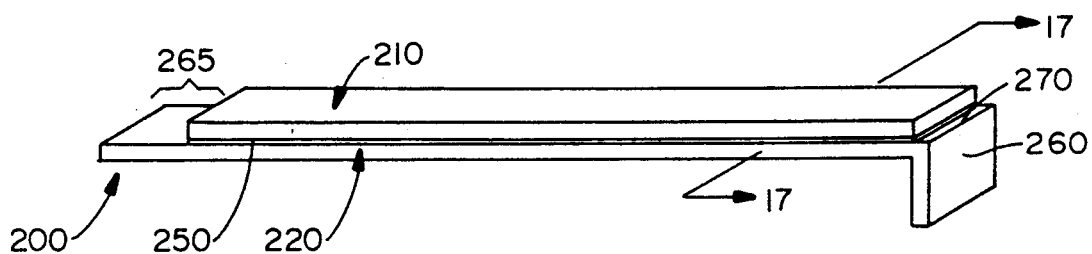
FIG. 16 shows the alternative embodiment of the bimorph of FIG. 15.
Figure 17:
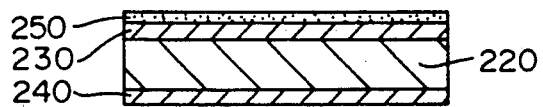
FIG. 17 is a cross-sectional view taken along line 17—17 of FIG. 16.

The lower layer 220 is longer than the upper layer 210 at one end by a distance determined by the desired height of the bimorph shutter 260, as shown on the right in FIG. 16, when the bimorph 200 is constructed. The layers 210 and 220 are adhered together, and then the excess length of layer 220 is folded over upon itself. With conventional piezoelectric polymer films available, if the excess length is folded by 180°, a shutter of 90° (such as shutter 260) will be formed when the film partially springs back to its original shape, as shown in FIG. 16.

The shutter 260 may be fixed firmly in position by thermal persuasion, i.e. the application of heat to the area of the bend 270, such as by bringing into contact with the bend 270 a hot piece of metal for a short time, or a warm piece of metal for a longer time. Other methods (such as slitting) may be utilized to assist in making the angle of the shutter 260 permanent.

As shown on the left in FIG. 16, the piezoelectric film 220 also has an overlap 265 relative to the end of the layer 210 opposite the end carrying the shutter 260. This will serve as a center electrode tap, as will be described below.

Figure 18:
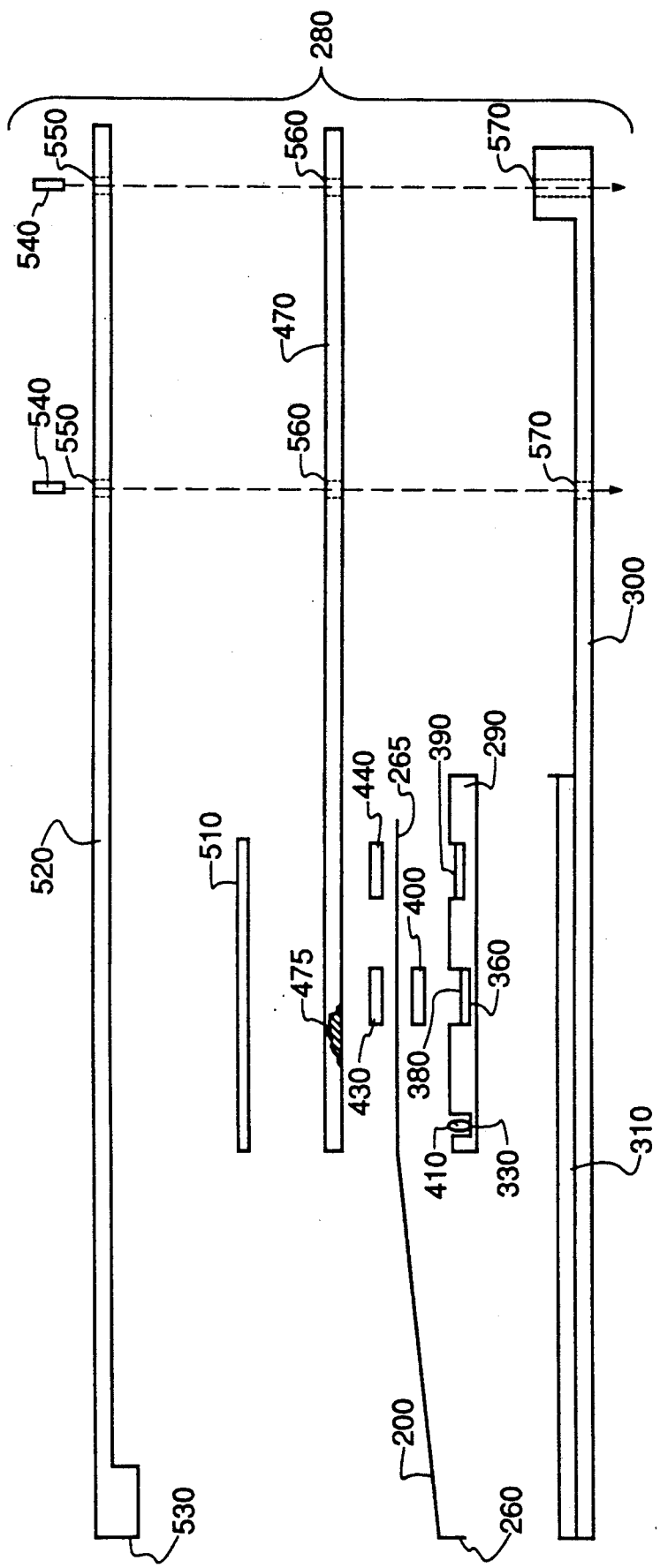
FIG. 18 is an exploded view of an alternative bimorph gate of the invention.
Figure 19:
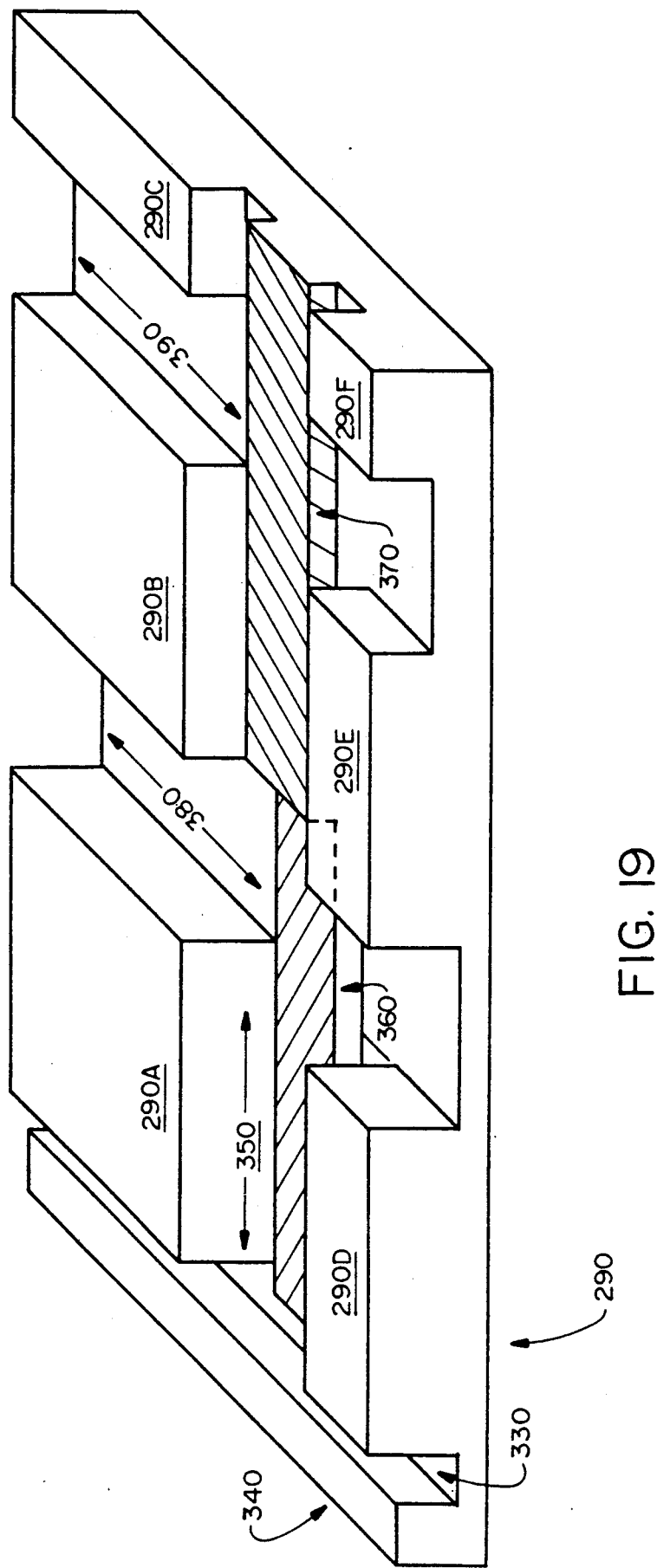
FIG. 19 is a perspective view of an assembly template used in an alternative embodiment of the invention.
Figure 20:
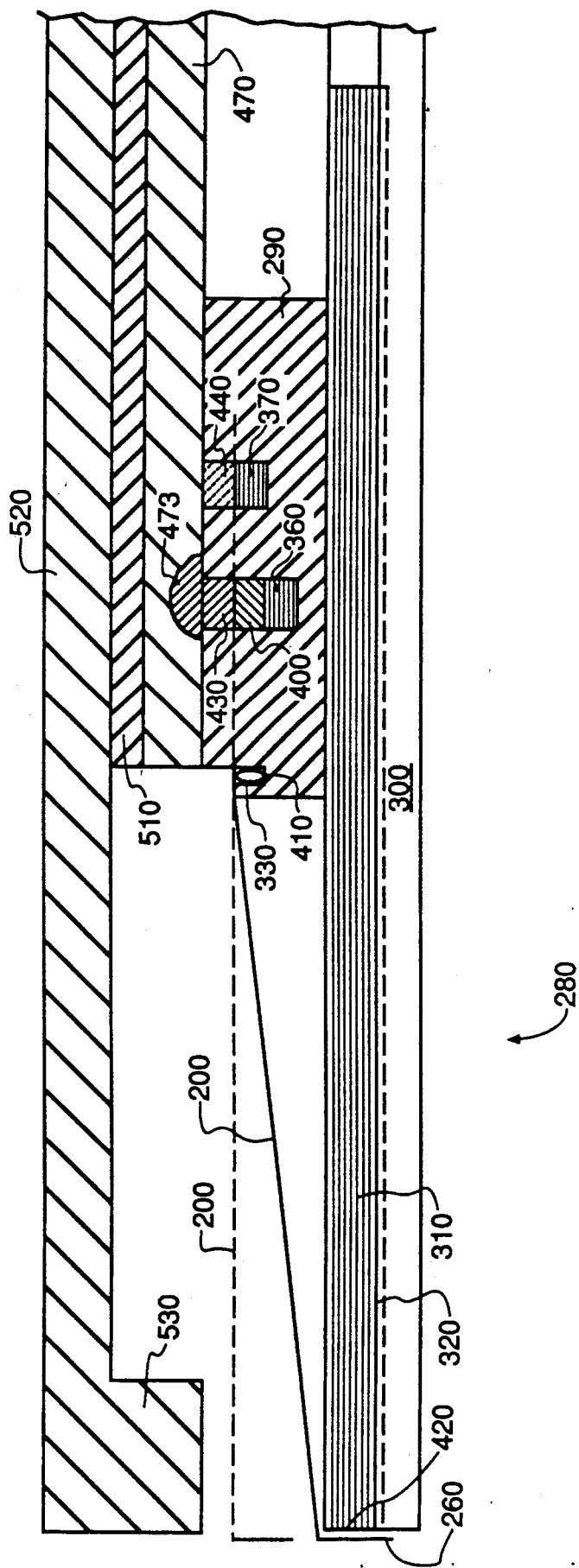
FIG. 20 is the bimorph gate of FIG. 18 after assembly.

Once the bimorph 200 is constructed as shown in FIG. 16, a bimorph gate 280, as shown in FIGS. 18 and 20, is constructed. In this embodiment of the invention, a gate template 290 is utilized, as shown in FIG. 19, which greatly assists in the construction of the gate 280 by acting as a substrate for various inserts, as will be understood from the following discussion.

A substrate 300, as shown in FIGS. 18 and 20, is provided, which may be any appropriate material, such as an injection molded plastic. The substrate may be insulating or noninsulating, according to the needs of the user. An optical fiber 310 is laid in a groove 320 (shown in dotted fashion in FIG. 20) in the substrate 300. Then the gate template 290 is placed atop the fiber 310.

As shown in FIG. 19, the template 290 includes a groove 330 adjacent a front edge 340 thereof, and a longitudinal groove 350 extending along the length of the template 290. Within the groove 350 is formed a first ridge 360 and a second, higher ridge 370, whose purposes will be described below. Also formed in the template 290 are transverse grooves 380 and 390. These grooves are defined by raised areas 290A, 290B, 290C, 290D, 290E, and 290F.

The template 290 is mounted on the substrate 300 by conventional means, such as by providing clips on the template 290 which match recesses in the substrate 300 (not separately shown). A strip of conductive material, such as a homogeneous conductive elastomer 400 as shown in FIGS. 18 and 20, is laid inside the transverse groove 380. It will be understood that, with a plurality of bimorph gates 280 positioned side-by-side in a gate array for use in an optical system, the elastomer strip 400 will lay across each of the ridges 360 of the plurality of gates.

A glue bead 410 is then laid in the groove 330, and the bimorph 200 is placed into position within the groove 350, with the shutter 260 positioned in front of a forward end 420 of the optical fiber 310.

Another homogeneous conductive elastomer strip 430 is then laid in the groove 380, on top of the bimorph 200. Thus, the conductive strips 400 and 430 contact, respectively, the lower metalized layer of the piezoelectric film 220 of the bimorph 200, and the upper metalized layer of the piezoelectric layer 210. Strip 400 thus comprises a bottom connector, and strip 430 comprises a top connector, for the bimorph 200.

Another conductive strip 440 is laid on top of the area 265 of the bimorph 200, which is configured to lie over the ridge 370 in the area of the groove 390. The strip 440 is preferably a longitudinal strip of a product known as Z-STRIP or "zebra strip," available from Tecknit, Inc., of Cramden, N.J. This is a product which is conductive in two dimensions, but not the third. In the configuration of the present invention, the strip 440 is laid in the groove 390 such that the conductive directions are horizontally to the left and right (viewed from the point of view of FIG. 20) and vertically, but not along the length of the strip 440 (i.e., into and out of the paper). This feature assists in avoiding short circuits between the center electrode formed by the area 265 of the bimorph 200 and the upper metalized layer of the piezoelectric film 200 of the bimorph 200.

In the preferred embodiment, the strips 400 and 430 are connected to ground, and the strip 440 acts as a high-voltage electrode. Alternatively, the center connection (i.e., the overlap area 265) may be grounded, and the bottom and top connectors 400 and 430 may be driven at $-200$ volts. The advantages of this arrangement are as follows. In the bimorph array as assembled, it is preferable to initially charge (or "pre-charge") all of the bimorphs simultaneously, and then immediately to provide signals to the bimorphs (by way of the connectors 400, 430 and 440) to discharge bimorphs which should be closed and leave charged those bimorph gates which should be opened. This happens quickly enough that the bimorphs which are discharged do not have time to physically open up. (The other bimorphs, however, do open up.) The pre-charge and immediate discharge procedure requires a quick shift in the reference (ground) voltage for the chip substrate, which may be detrimental to the chip. Specifically, it avoids the level shifting of the chip at 200 volts, which is used in one embodiment to make operational a diode circuit using an intrinsic diode in the VFET to simplify the driver circuit.

The driver circuit uses a protection diode intrinsic to each FET in the following way. The anode of the protection diode is connected to the FET source and the cathode of the diode is connected to the FET drain. When $-200$ volts is applied to the outside electrodes (i.e. at the bottom and the top of the bimorph), the diode is thereby forward biased, and the bimorph, acting as a capacitor, is pre-charged. Then the voltage is switched to 0 volts (ground), but the charge on the bimorph remains at 200 volts until a logic signal tells the FET itself to conduct (as the protection diode is now reverse-biased).

Earlier circuits, instead of applying $-200$ volts to the outer electrodes of the bimorph during the precharge, level shifted the reference voltage of the chip substrate. This required using opto-insulators which had narrow band width and complicated the circuit. Another advantage of the present configuration is that it avoids electrical stress on the driver chip resulting from sudden large voltage shifts.

Figure 23:
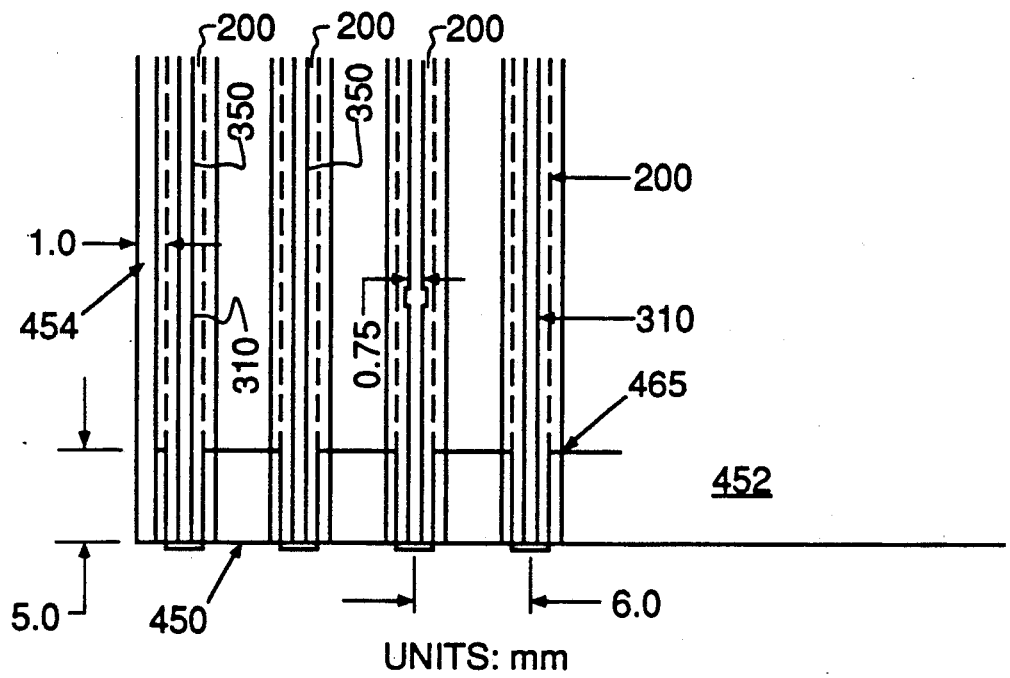
FIG. 23 is an enlarged view of the lower left corner of FIG. 22.
Figure 22:
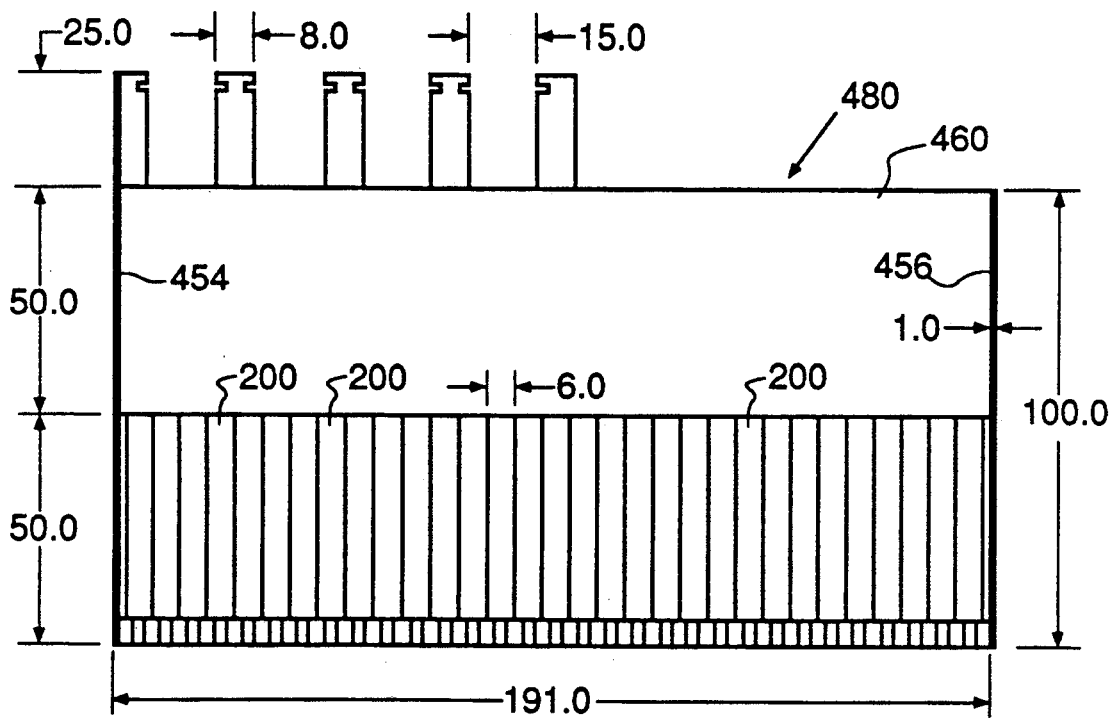
FIG. 22 is a top view of a bimorph gate array of the invention.

The bimorphs 200 are preferably placed in an array of, for instance, 32 bimorphs, as shown in FIG. 22. The array 450 of bimorphs may typically have the dimensions shown in FIG. 22 (expressed in mm). FIG. 23 is a top view of the lower left hand corner of the array shown in FIG. 22, and shows the preferred embodiment, wherein each bimorph 200 is somewhat narrower than the channel 350 in which it lies. This facilitates the construction of the bimorph 200.

FIGS. 24 and 25 show a front elevation of a multiple-bimorph assembly template 460, with fibers 310 in place. In this embodiment, the grooves 350 are preferably beveled at their sides (as best seen in FIG. 25), which greatly assists in aligning the bimorphs therein. The template 460 preferably has raised walls 454 and 456 for maintaining alignment of the bimorph gates 280.

Beveled areas 465 are provided at the front portion of the template 460, and act as mounting guides for the bimorphs.

Once the desired number of bimorphs has been placed in an array as shown in FIG. 22, a printed circuit board 470 is positioned atop the array of bimorphs, as shown in FIGS. 18 and 20. The circuit board 470 has a ground connection at each side (such as edge ground connection 475), corresponding to the left and right sides from the point of view of FIG. 22, each of which ground connections contacts the conductive strip 430, which in turn contacts the conductive strip 400. Thus, the strips 400 and 430 connect the grounds of the bimorphs 200 along the entire array 450, and are grounded at the edges of the circuit board 470.

Figure 21:
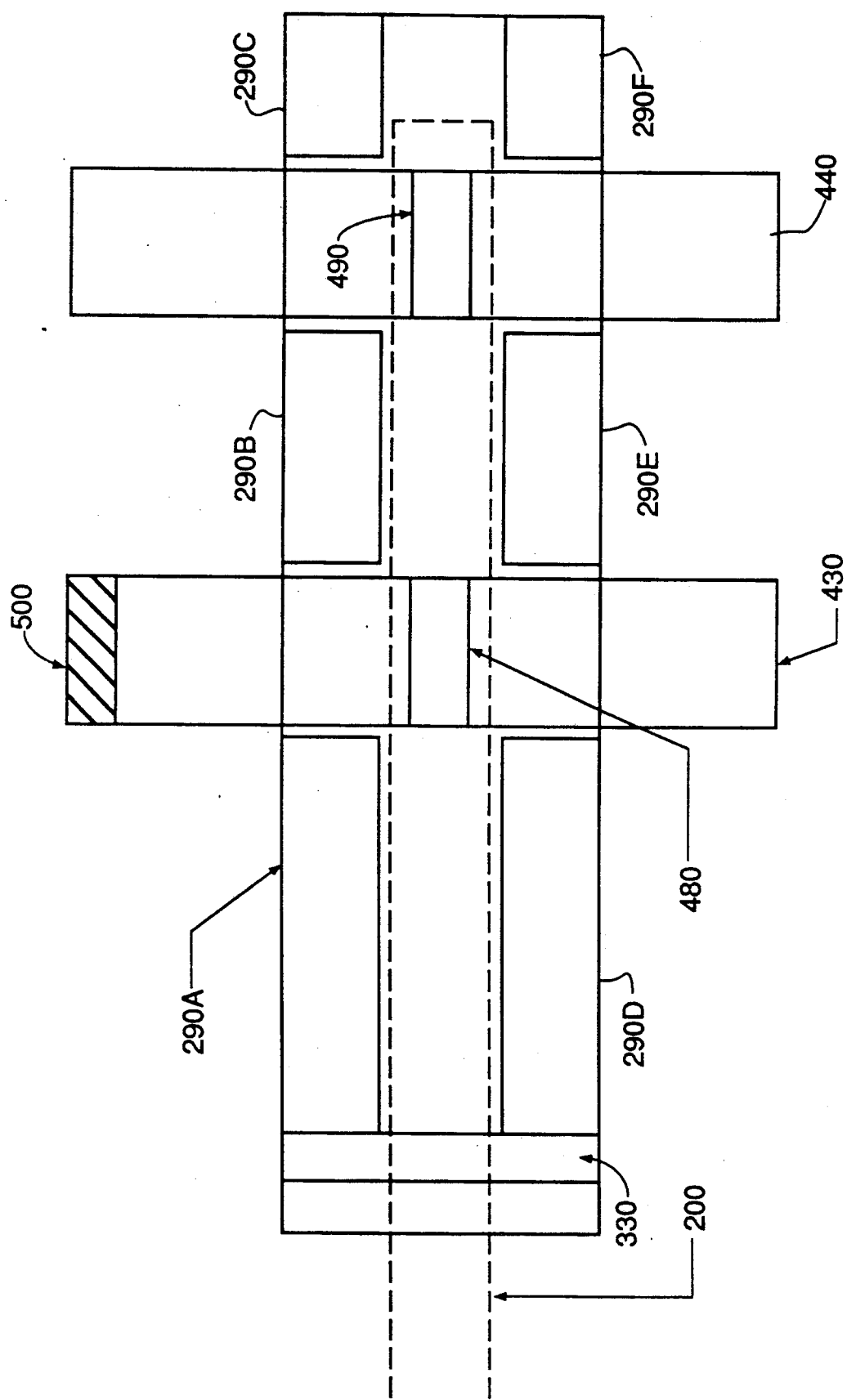
FIG. 21 is a top view of a bimorph gate of FIG. 20.

FIG. 21 shows a top view of area of a bimorph near the front edge 340 of the template 290, once the strips 400, 430 and 440 have been laid in place. An overlap area 480 is shown in FIG. 21, which is where the strip 430, the bimorph 200, the strip 400 and the ridge 360 are all vertically aligned. Similarly, overlap area 490 is where the strip 440, the bimorph 200 (in the center electrode region 265) and the ridge 370 are vertically aligned. It will be understood that, when the circuit board 470 is placed atop the bimorph array 450, pressure will be localized at these areas of overlap. This is a distinct advantage of the present embodiment, since much less force is necessary to compress the strips by the desired amount and to obtain good connections than if the strips 400, 430 and 440 had to make connection along their entire lengths. Preferably, the strips 400, 430 and 440 are compressed approximately 30%, which insures a good connection and also seals the connections from gas and moisture, thus improving their longevity.

The view of FIG. 21 is of the far left bimorph gate shown in FIG. 22, and thus, when the printed circuit board 470 is placed atop the array 450, the aforementioned ground connections (such as connection 475) on the edges of the circuit board 470 contact the area 500 shown in FIG. 21 to make the ground connection to the strips 400 and 430.

Once the circuit board 470 is in place, a rubber cushion 510 is placed on top of the circuit board 470, with dimensions generally corresponding to the dimensions of the array of bimorph gates, generally defined by the total area of the gate template 90. Then a top cover 520 including a front stop 530 is set in place, as shown in FIGS. 18 and 20. The stop 430 is similar to the top stop 41 shown in FIG. 2, and is similarly designed to prevent chatter and resonance in the bimorph 200 as it opens and closes. Thus, the bimorph 200 will extend substantially to the position shown in dotted fashion in FIG. 20, but not further.

Once the bimorph gate 280 is assembled as shown in FIGS. 8 and 20, a plurality of plastic rivets 540 are inserted through coaxially aligned holes 550, 560 and 570 in the top cover 520, the printed circuit board 470, and the substrate 300, respectively, as shown in FIG. 18. The bimorph gate 280 as a whole is compressed (such as in a vise), as mentioned above, such that the strips 400, 430 and 440 are compressed approximately 30%, and the rivets 540 are then inserted through the holes 550, 560 and 570, with ends of the rivets 540 extending above and below the gate 280. The rivets are then melted, either ultrasonically, thermally, or by some other conventional means, thus heat-staking the assembly together.

With the present embodiment, the heat-staking is especially useful because of the localization of the contact pressure for the electrode contacts in the overlap areas 480 and 490 as shown in FIG. 21. Thus, good individual contacts are insured, and individual connections do not have to be separately adjusted, such as by means of screws and bolts. Because of this, the reliability of the bimorph gate array is greatly increased, while the labor involved in constructing it is greatly decreased. In addition, there is a considerable cost saving in avoiding the use of the nuts and bolts.

The printed circuit board 470 includes one connection for each bimorph 200 for energizing the overlap area 265 (i.e., the high-voltage electrode) via the conductive Z-STRIP 440. It will be appreciated that the construction of the bimorph is considerably simplified by the increased thickness of the bimorphs 200, which greatly decreases the likelihood of bubbles or wrinkles forming in the bimorphs when they are constructed. This also makes the bimorphs considerably stronger, with less likelihood of damage occurring during construction of the bimorphs and of the gates. Another reason for making the bimorphs 200 thicker is that for larger optical fibers, greater deflection of the shutter 260 is desirable, and with thinner bimorphs, the stiffness of the bimorphs would not be great enough due to the increased length thereof. Thus, in order to achieve greater deflection while preventing the bimorphs from collapsing under their own weight, the thickness is increased. This leads to another advantage of the thicker bimorph, which is that it needs attachment only at one point (namely at the glue layer 250), and does not require the use of a separate fulcrum. Since the bimorph itself is stronger, the mounting is not so delicate, and the weight of the bimorph at its tip is sufficient to ensure adequate alignment with the fiber tip, without the need for a fulcrum.

Shown in FIG. 32 is a block diagram of a system utilizing the present invention. Once the bimorph gates have been assembled into an array, they may be utilized in the entire optical system 580, which may be a video display, a communication array or a point in a communications network, a printer, or other system or device where video or graphics information may be utilized or wherein a plurality of individual optical elements is needed. Thus, the exit optics shown in FIG. 32 may be a video display terminal for viewing, a portion of a communications network, a printer, or other device.

Typically, an array of optical systems or shelves 580 will be utilized together, such as in a 32-shelf array 590 as shown in FIG. 33. It is preferred that each shelf 580 include 32 bimorphs. In one embodiment, 16 of the fibers connected to the bimorph gates are connected into a first fiber bundle, and the other 16 are collected into a second bimorph bundle. This is shown conceptually in FIG. 34, where bundles 600 and 610 are shown. The optical fibers from bundles 600 and 610 are connected to the gates 280 (which are not shown in FIG. 34 to preserve clarity) in an alternating fashion. Thus, a fiber from bundle 600 is connected to the left-most gate, a fiber from bundle 610 is connected to the second gate, a fiber from bundle 600 is connected to the third gate, and so on. In this manner, each pair of gates on each shelf 580 includes one fiber from bundle 600 and one fiber from bundle 610. As will be explained below, these pairs of gates comprise half-pixels 620, designated by the circles in the lower portion of FIG. 34.

Two adjacent shelves 580 in the array 590—one on top of the other—form a matrix of pixels which is one pixel high and sixteen pixels wide. This is because each half-pixel of the upper shelf 580 in the pair of shelves includes two fibers from two different bundles, and the half-pixel of the lower shelf directly below it includes one fiber each from two other fiber bundles. Thus, in FIG. 35, an upper shelf 580U includes fibers 630 and 640, and a lower shelf, 580L includes fibers 650 and 660, with fibers 630, 640, 650 and 660 in the aggregate forming a pixel 670.

Figure 26:
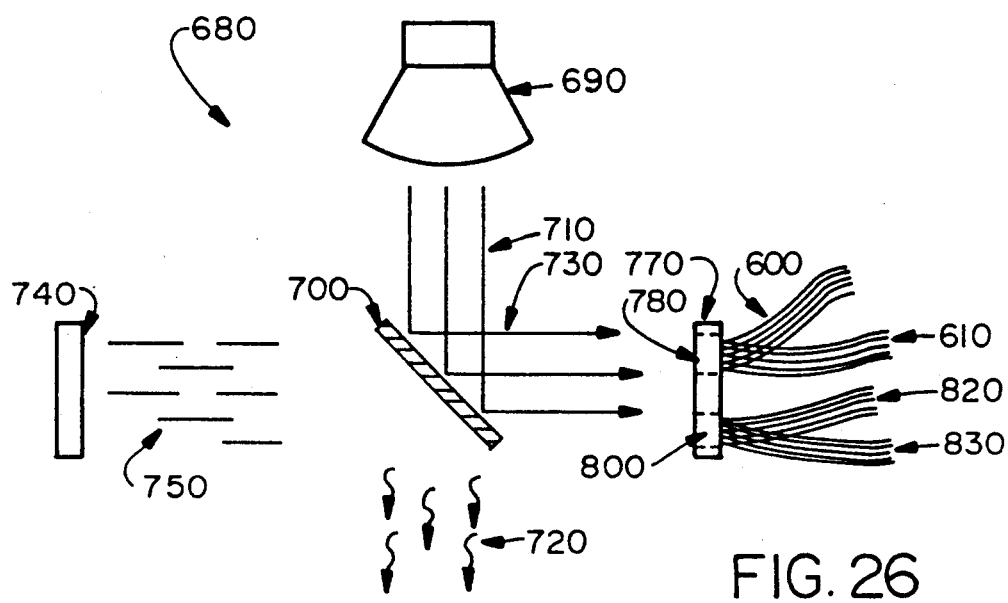
FIG. 26 is a diagram of the source optics for the invention.
Figure 29:
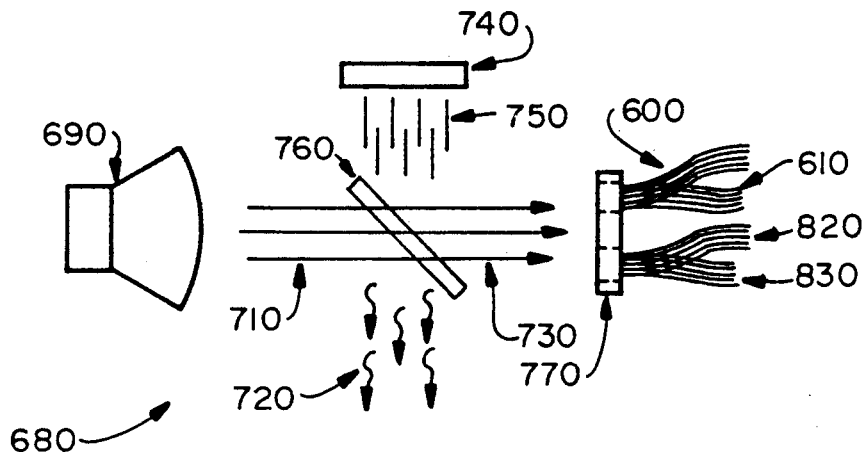
FIG. 29 shows an alternative embodiment for the source optics of the invention.

Inputs to the optical fibers of the shelves 580 are connected source optics 680, represented in FIG. 32 and shown in FIGS. 26 and 29. Referring to FIG. 26, a lamp 690 is provided, preferably providing white light. A mirror 700 (referred to as a "cold mirror") is interposed in the light 710 from lamp 690, and is designed to transmit infrared radiation 720, while reflecting the visible portions 730 of the light 710. A fan 740 creates a moving body of air 750 to cool the mirror 700 and the other portions of the source optics 680.

In an alternative embodiment, as shown in FIG. 29, a different mirror 760 is utilized, which reflects infrared radiation 720, but transmits the visible portion 730 of the white light 710.

Figures 27, 28:
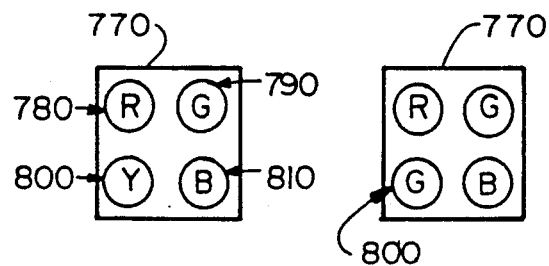
FIG. 27 shows one embodiment of a filter tray for the invention.
FIG. 28 shows another embodiment for the filter tray of the invention.

A filter tray 770 is mounted so as to intersect the visible portion 730 of the light, and includes several (preferably four) filter holders 780, 790, 800 and 810, as shown in FIG. 27. In one embodiment, the colors of these filters are, respectively, red, green, yellow, and blue, as designated by the letters R, G, Y and B in FIG. 27. Alternatively, the filter in filter holder 800 may be green, which would be typical for video display uses, wherein the green light source is often doubled up, because it contains most of the luminance, and this increases the effective resolution of the display. Many other filter combinations, utilizing other colors, are possible.

Connected to the filter holders 780, 790, 800 and 810 are fiber bundles which are coupled at their other ends to the gates contained on the shelves 580. Thus, fiber bundles 600 and 610 are connected, respectively, to filter holders 780 and 790, and additional fiber bundles 820 and 830 are coupled to the filter holders 800 and 810, respectively. As described above with respect to fiber bundles 600 and 610 relative to shelf 580 shown in FIG. 34, similarly fiber bundles 820 and 830 are connected in an alternating fashion to an array of bimorph gates on another shelf 580, forming an array of half-pixels. For instance, fiber 630 shown in FIG. 35 may be part of fiber bundle 600, fiber 640 being part of fiber bundle 610, and fibers 650 and 660 comprising part of fiber bundles 820 and 830, respectively. In this case, fiber 630 would carry red light, fiber 640 would carry green light, fiber 650 would carry yellow light, and fiber 660 would carry blue light, if the filters shown in FIG. 27 are utilized.

It will be appreciated that, if each shelf 580 includes 32 bimorph gates, and the array 590 shown in FIG. 33 includes 32 shelves 580, there are a total of 1,024 optical fibers utilized by the array 590. Since each pixel 670 shown in FIG. 35 comprises four optical fibers, there are 256 optical fibers for each filter color shown in FIG. 27 (or, alternatively, FIG. 28), and thus each optical fiber bundle 600, 610, 820 and 830 includes 256 optical fibers. The top shelf 580 in the array 590 shown in FIG. 33 will have 16 red-light optical fibers connected to it, and 16 green-light optical fibers. The second shelf 580 in the array 590 will have 16 yellow-light optical fibers connected to it, and 16 blue-light optical fibers. This alternating pattern continues to the bottom of the array 590.

Referring to FIG. 32, when the lamp 690 is energized, each of the optical fibers connected to the array 590 has light of the appropriate color provided to it, and thus each of the 1,024 bimorph gates has light provided to it. The pattern of opening and closing the gates by means of the printed circuit board 470 (shown in FIG. 18) determines the display appearing at the exit optics, such as at front face 840 of the array 590. The control hardware shown in FIG. 32 provides the necessary information for opening and closing the bimorph gates, and is operatively connected to the printed circuit board 470. Such hardware may include a microprocessor, memories, and other conventional hardware for driving information systems.

Figure 30:
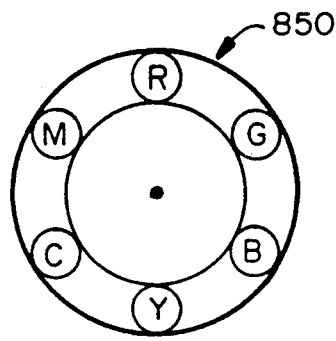
FIG. 30 shows an alternative embodiment for the filter tray of the invention.

An alternative to the filter tray 770 is shown as filter wheel or filter tray 850 in FIG. 30. The filter tray 850 may include several differently colored filters, such as red, green, blue, yellow, cyan and magenta, as represented therein by the initial letters of these colors.

Figure 31:
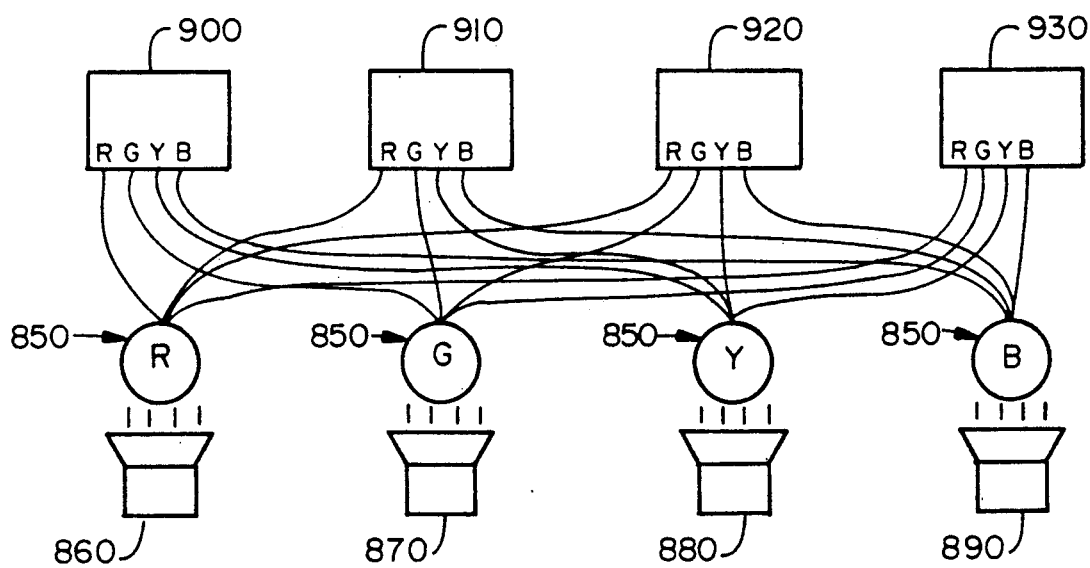
FIG. 31 shows an alternative embodiment of the invention utilizing the filter tray of FIG. 30.

In this embodiment, at least four different lamps would be utilized, with one fiber optic bundle connected to each lamp. Thus, four lamps 860, 870, 880 and 890 are utilized, as shown in FIG. 31. The filters contained within the filter trays 850 may be rotated so that a single filter is utilized, and the other filters are excluded. Thus, the filter trays 850 shown in FIG. 31 are "dialed" to red, green, yellow and blue, respectively, from left to right.

Represented in FIG. 31 are four modules 900, 910, 920 and 930. Each of these modules comprises two shelves 580, and as represented schematically in FIG. 31, each module is served by all four lamps 860, 870, 880 and 890. The red-light fibers (represented by the lines from the left-most filter tray 850 in FIG. 31) are connected to all four modules 900–930, as are the green-light, yellow-light and blue-light fibers. Thus, each module of two shelves is provided with light from different lamps, with a ratio of four lamps per four modules. In an array of 32 shelves, this would include 16 modules, and a total of 16 lamps in the embodiment. Other ratios are possible, such as one lamp for each color to supply all 16 modules, for a total of four lamps for 16 modules.

Other embodiments of lamps, filters and modules are possible. For instance, each of the modules 900–930 may alternatively be a single shelf. There may be a configuration wherein the four lamps 860–890 have the same filtration or no filtration (resulting in a monochrome display), or where the lamps 860 and 870 have one filtration, while lamps 880 and 890 have another filtration (resulting in a two-tone display).

Figure 36:
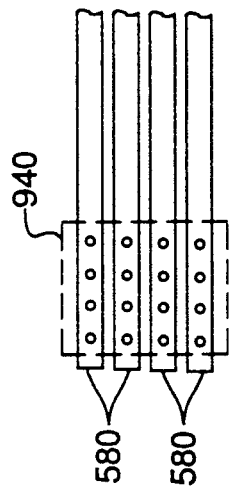
FIG. 36 is a partial elevation of four bimorph gate shelves of the invention.

FIG. 36 shows an alternative embodiment of the invention, wherein a "super pixel" is utilized. Rather than using four optical fibers per pixel, as in FIG. 35, an array of the first-order pixels 670 may be controlled by the control hardware to operate as a single super pixel 940, which in FIG. 36 comprises four individual first-order pixels, i.e. 16 optical fibers. It will be appreciated that in the embodiment of FIG. 35, each optical fiber may be "on" or "off" depending on whether its associated bimorph gate is open or closed. Thus, there is no provision for different intensities of the pixels, for a given pixel color combination. However, with the embodiment of FIG. 36, there will be four red-light fibers, and four fibers each for the colors blue, green and yellow. Thus, the intensity of the red light may be varied in five steps, including no red light, and from one to four red-light fibers exposed. The same is true for each of the other colors, so considerable variation in intensity may be achieved.

The super pixel line 40 of FIG. 36 is thus a $2 \times 2$ array of first-order pixels. Other arrays are possible; for instance, in a $6 \times 6$ superpixel, there would be 36 fibers for each color, and 37 variations in brightness for each color (including all of the pixels being off, and 1 to 36 pixels being energized). This will accommodate a large variety of desired video displays.

The alternative embodiments utilizing superpixels are highly advantageous for the following reasons. In order to generate a variety of intensities using a pulse-width modulation system, the reaction or "rise" time for an individual bimorph must be very quick. For instance, if 256 bimorphs must be driven at a rate of no less than 60 Hz (for video displays) each bimorph must react within a time of $1/256 \times 1/60 = 65$ microseconds, or 0.065 milliseconds. That is, at 1/60 of a second per frame, there must be 256 sub-periods for the entire scan. Given gate response time of, for example, about 8 milliseconds, the fastest the bimorph can respond to a refresh signal is approximately 125 Hz. Thus, intensity variations utilizing the bimorphs with such a response rate would be impossible at normal video frequencies. The superpixel construction, however, allows full video capability even with the slow rise times for the bimorphs, since the intensity variations which must be accommodated are no longer time-dependent, but rather are dependent only upon the number of fibers within a super pixel which are energized. Thus, signals with both color and brightness information may be provided in parallel to the bimorphs, with no loss of video display speed and no dependence upon bimorph rise time (so long as the rise time is at least as fast as 60 Hz). Furthermore, the intensity variations possible are dependent only upon the number of pixels used in a super pixel, and thus are limited only by the available sizes of optical fibers and the size requirements for the display or other exit optics.

An alternative embodiment of the invention is shown in FIGS. 37–41. In this embodiment, a bimorph gate assembly 1000 is shown in a sectional elevation. A substrate 1010 carries an optical fiber 1020 in a groove thereof. Raised portions serving as heat stakes 1020 and 1030 are provided on the substrate 1010 and may be unitary therewith.

Figure 37:
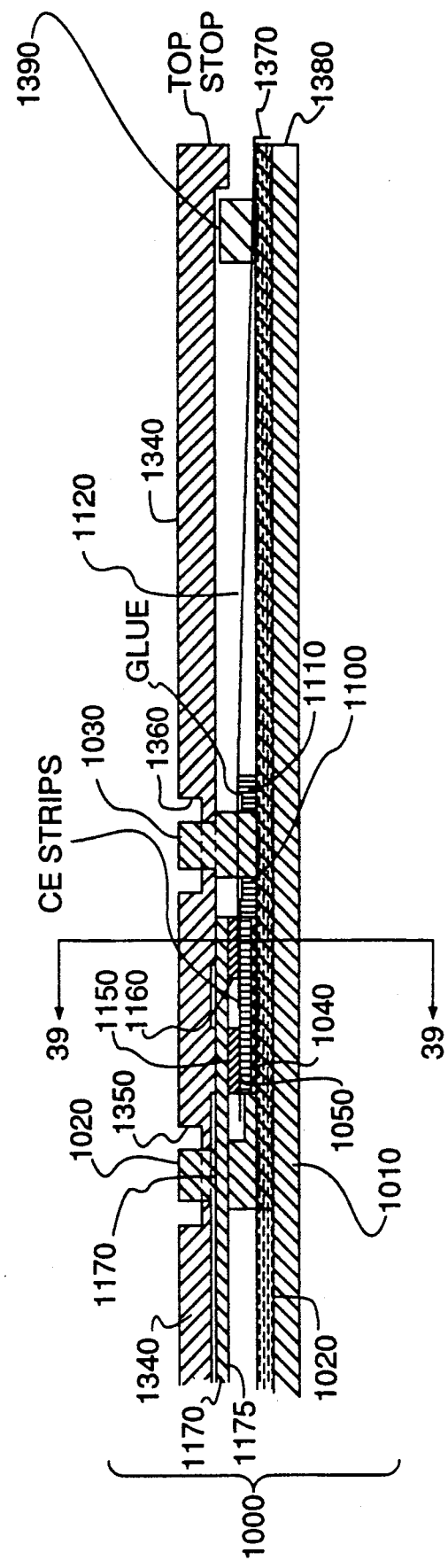
FIG. 37 is an elevation of an alternative embodiment of the invention.
Figure 39:
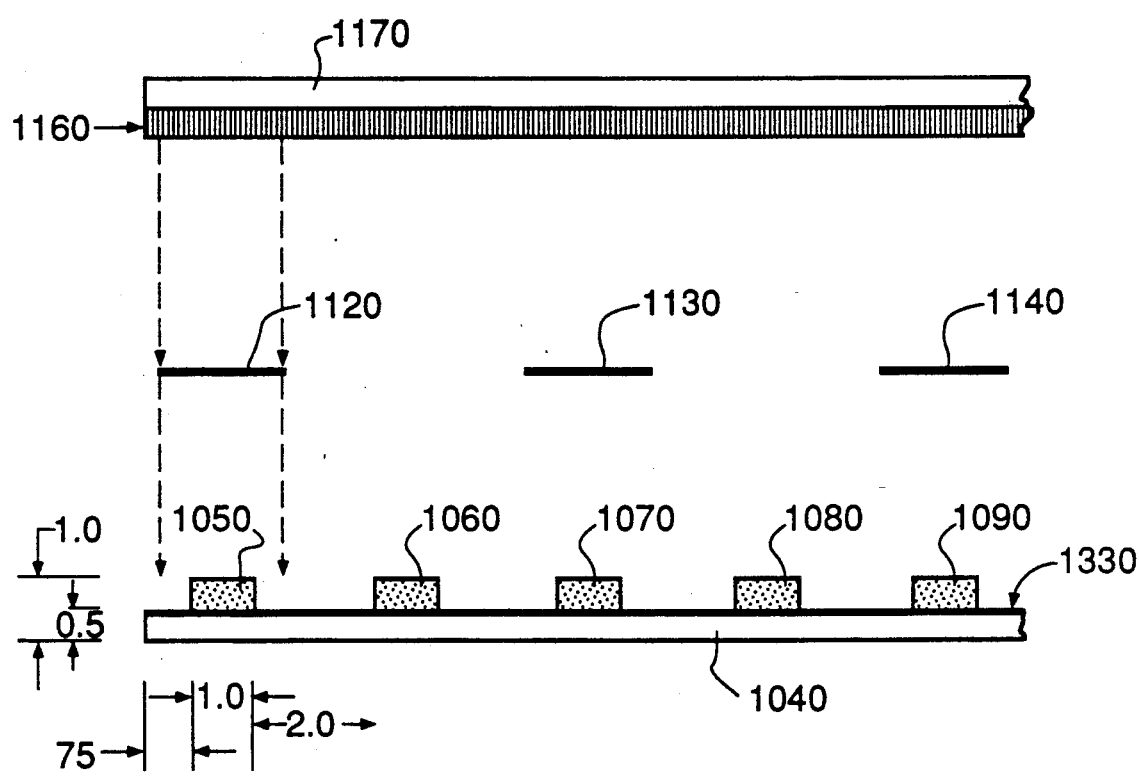
FIG. 39 is an exploded sectional view taken along the line 39—39 of FIG. 37.
Figure 41:
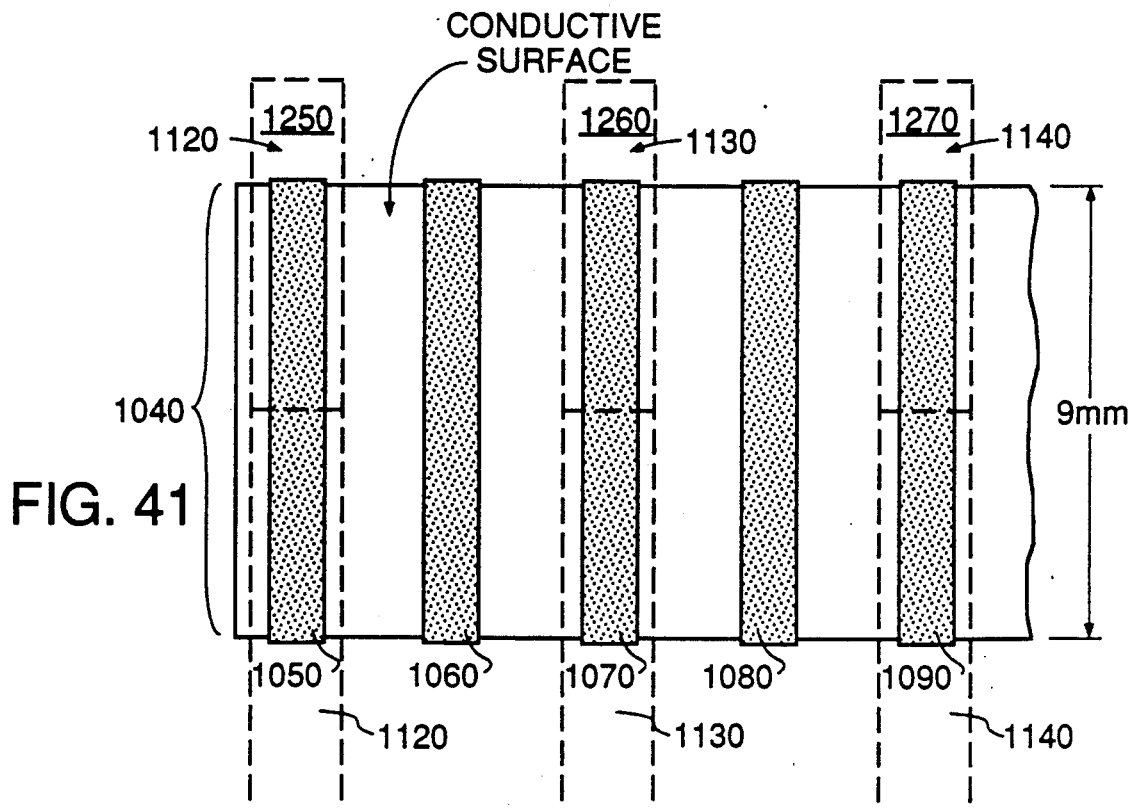
FIG. 41 is a top view of a portion of a bottom printed circuit board of the invention.

A lower printed circuit board 1040 is mounted on the substrate 1010 and conductive rubber strips 1050, 1060, 1070, 1080 and 1090 are mounted atop the circuit board 1040, as shown in FIGS. 37, 39 and 41, and described in detail below.

Mounting inserts 1100 and 1110 are positioned on either side of heat stake 1030, as shown in FIG. 37. A bimorph 1120 of the same design as bimorph 200 described above is positioned atop the strip 1050, and bimorphs 1130 and 1140 are similarly positioned atop the conductive strip 1070 and 1090, respectively, as shown in FIGS. 37, 39, and 41. The bimorph 1120 is preferably in contact with the mounting inserts 1100 and 1110, and is glued to a top surface of the insert 1110 to provide a pivot point.

Positioned across the tops of the bimorphs 1050, 1090 are zebra strips 1150 and 1160, which are conductive along the lengths of conductive traces on a bottom surface of an upper printed circuit board 1170, as shown in FIGS. 37-40. The zebra strips 1150 and 1160 are conductive in the vertical direction shown by the double arrow in FIG. 40 and are also conductive in the vertical direction from the point of view of FIG. 37, but are not conductive along their lengths, i.e., to the left and right from the point of view of FIG. 40. That is, the zebra strips are conductive along their widths and heights, but not along their lengths.

Figure 40:
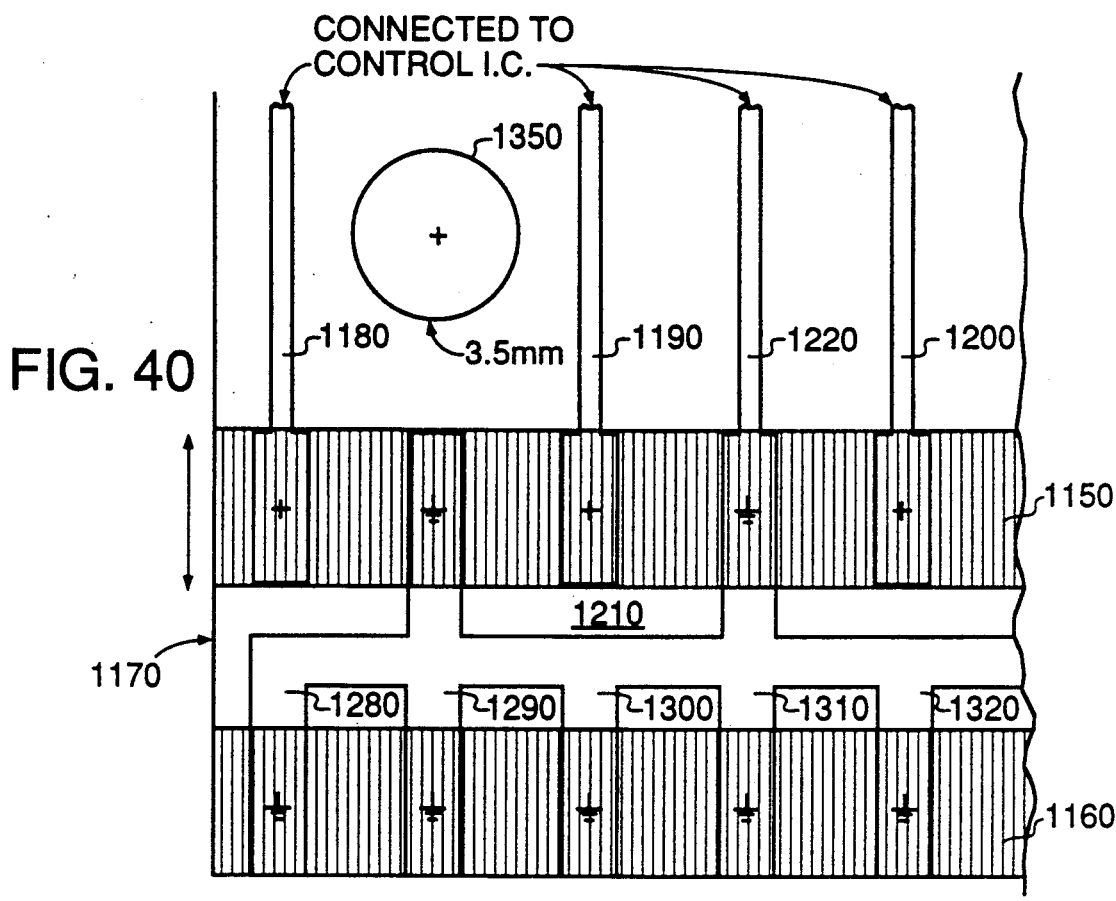
FIG. 40 is an "X-ray" view of a portion of a top printed circuit board of the invention.
Figure 42:
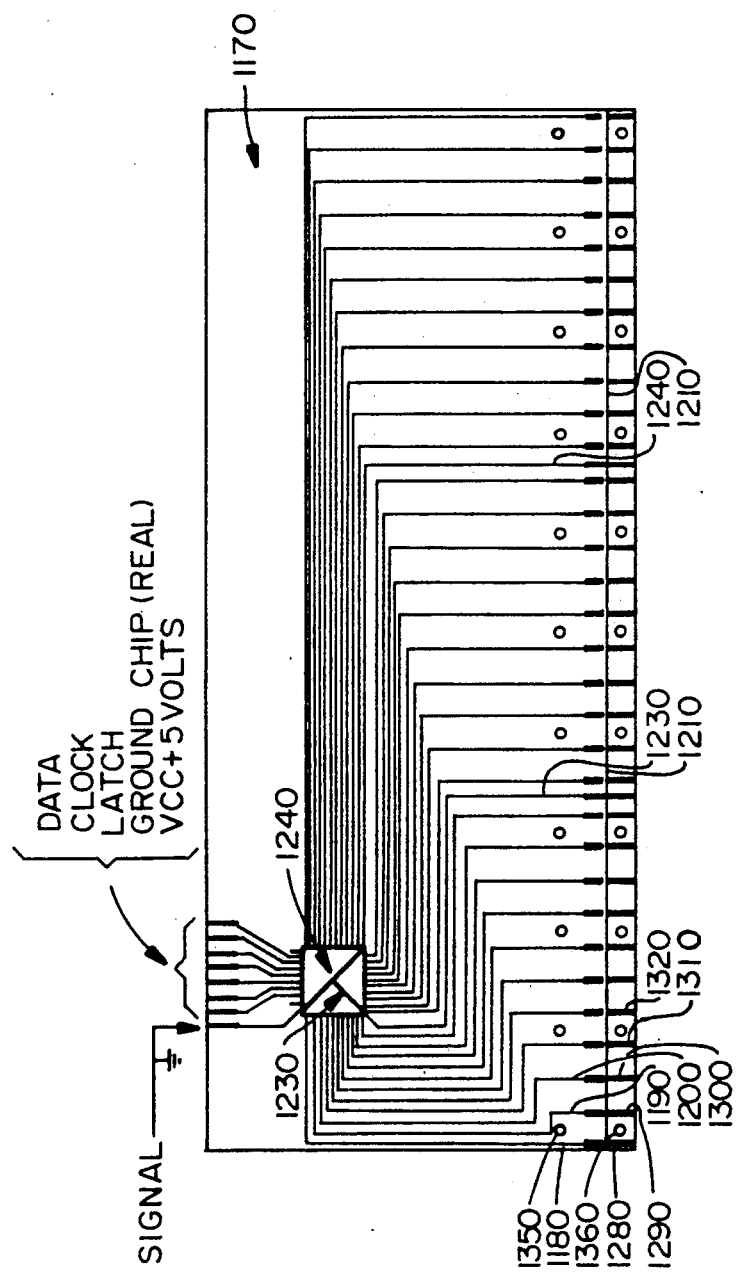
FIG. 42 is an "X-ray" view of an alternative top printed circuit board of the invention.

High voltage traces 1180, 1190 and 1200 are provided on the bottom surface 1175 of the upper printed circuit board 1170, as shown in FIG. 40, and a multiple-contact ground electrode 1210 is also provided on the bottom surface 1175. Connected to the ground electrode 1210 is a common trace 1220. Referring to FIG. 42, it will be seen that in the preferred embodiment 32 high voltage copper trace electrodes are utilized on the upper printed circuit board 1170. FIGS. 40 and 42 represent "X-ray" views of the circuit board 1170, i.e., looking down through the top of the printed circuit board with the copper traces appearing as though the circuit board were transparent. The ground electrode 1210 is shown in FIG. 42 to have two common traces 1230 and 1240, which are in different locations from the trace 1220 shown in FIG. 40. There may be one or many such common traces, at a variety of positions on the circuit board 1170, with FIGS. 40 and 42 showing two possible embodiments.

Figure 38:
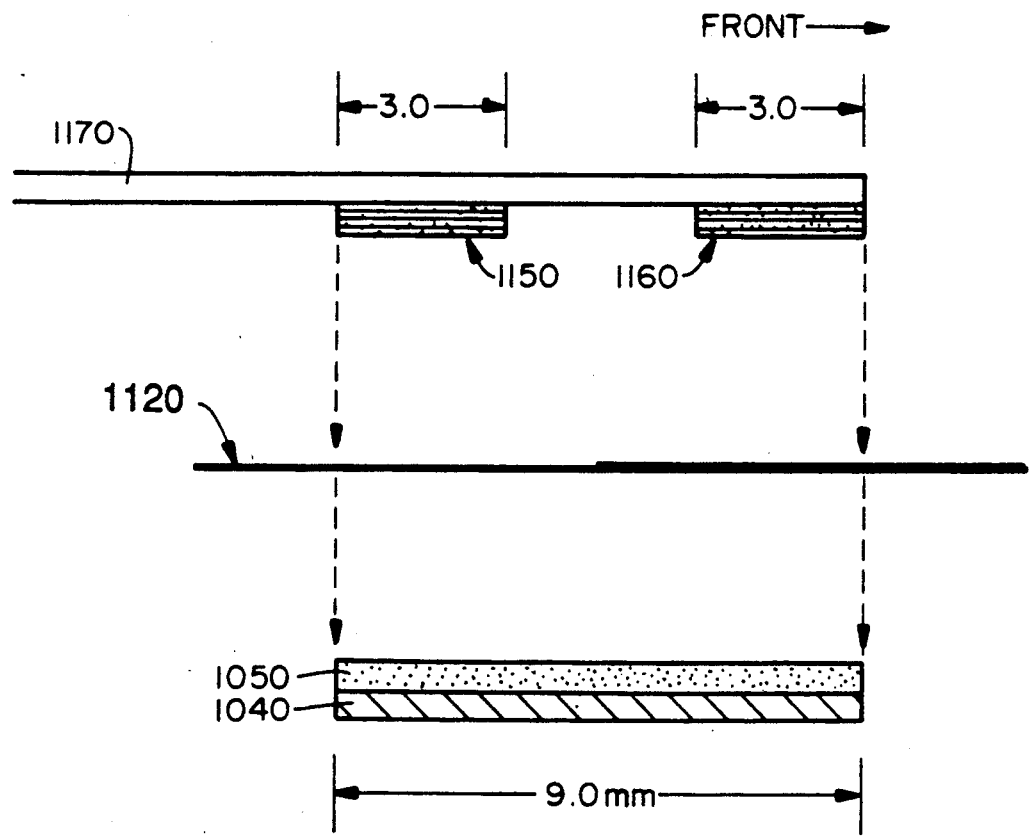
FIG. 38 is an enlarged exploded view of a portion of FIG. 37.

As shown in FIGS. 37 and 38, zebra strip 1150 contacts the high voltage electrode portion 1250 of the bimorph 1120, which corresponds to the overlap portion 265 of the bimorph 200 shown in FIG. 16. Zebra strip 1150 also contacts the high voltage electrode portions 1260 and 1270 of the bimorphs 1130 and 1140, respectively, which are shown in FIG. 41, and similarly contacts the high voltage electrode portions of the other 29 bimorphs which are utilized in connection with the high voltage copper traces of the circuit board 1170 shown in FIG. 42.

Zebra strip 1160 contacts the ground electrode 1210 at numerous ground traces 1280, 1290, 1300, 1310 and 1320, and additional ground traces as shown in FIGS. 40 and 42, with one ground trace corresponding to each bimorph 1120, 1130 and 1140, etc., and with one such ground trace corresponding to each high voltage electrode 1180, 1190, 1200, etc., such that each bimorph is electrically coupled both to a ground trace and to a high voltage trace of the upper printed circuit board 1170.

It will be understood that one or many ground traces such as ground traces 1280, 1320 may be utilized. If zebra strip 1160 is replaced by a homogeneous conductive strip, it is possible to utilized a single ground trace, such as ground trace 1280, and the conductive strip will electrically couple all of the bimorphs to ground. One conductive rubber strip or pad—such as strips 1050, 1070 and 1090—is also provided beneath of each of the bimorphs in the array of bimorphs (preferably numbering thirty-two) beneath the printed circuit board 1170. A continuous copper layer 1330 or other conductive material is provided on a top surface of the lower circuit board 1040, as shown in FIG. 39, such that the conductive rubber strips or pads 1050, 1070, 1090, etc. couple the lower sides of the bimorphs to a common ground. It will be appreciated that conductive strips 1060 and 1080 are redundant, in that they contact the zebra strips 1150 and 1160, further coupling them to ground with the common trace 1220, but do not directly contact any bimorphs. The copper layer 1330 may be connected to ground independently, or may be connected to ground through the conductive rubber pads or strips 1060 and 1080, etc. by coupling through the zebra strips 1150 and 1160 to the common trace 1220. One such conductive rubber strip will suffice; however, many such strips may be provided, allowing for redundancy and reliability of the ground connections. Similarly, ground traces 1290 and 1310 are redundant ground traces, and these may be omitted if the copper layer 1330 is independently grounded, or one to many such traces may be included.

A top or lid 1340 is attached to the bimorph gate assembly 1000 as shown in FIG. 37, and is "heat-staked"; that is, stakes or rivets 1020 or 1030 are ultrasonically, thermally, or otherwise heated to rivet the assembly 1000 together in a fixed fashion, while pressure is maintained on the top 1340 and on the substrate 1010 to ensure reliable electrical contacts which seal off gas, liquids and corrosive materials. The stakes 1020 or 1030 (and it will be appreciated that a large number of such stakes may be provided) protrude through holes 1350, 1360, and other such holes as shown in FIGS. 37, 40 and 42. Each hole such as 1350 and 1360 includes a first area of a smaller diameter for receiving the heat stakes, and a second area of larger diameter, as shown in FIG. 37, such that when the heat stakes are heated, they melt slightly into the areas of larger diameter to form a permanent assembly 1000.

When the assembly 1000 is completed, the shutters of the bimorphs, such as shutter 1370 of bimorph 1120 shown in FIG. 37, are positioned just in front of the forward edge 1380 of the substrate 1010, and just beneath the top stop of the lid 1340. A lid stop and mounting guide 1390 is preferably provided, and is preferably integral with the substrate 1010.

The structure shown in FIGS. 37-42 has the advantage that the contact points of the rubber strips, zebra strips, printed circuit boards and bimorphs are concentrated in very small areas, thus providing high reliability of these contacts and good sealing against corrosive materials. The conductive rubber strips such as strips 1050, 1070, 1090, etc. are preferably somewhat narrower than the bimorphs 1120, 1130, 1140, etc., in order to avoid accidental shorting between the edges of the bimorphs and the conductive rubber.

Figure 43:
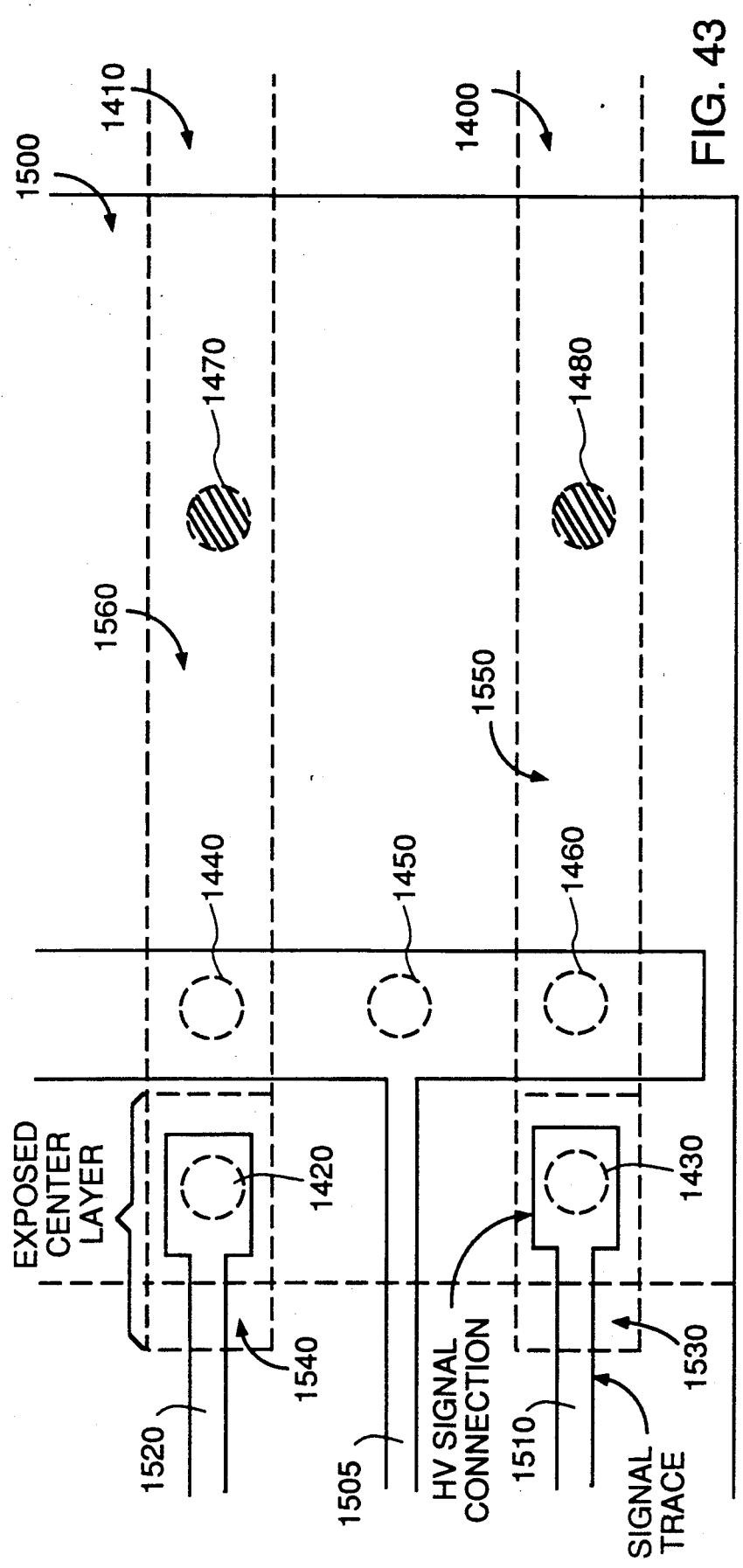
FIG. 43 is an "X-ray" view of a portion of another alternative top printed circuit board of the invention.
Figure 44:
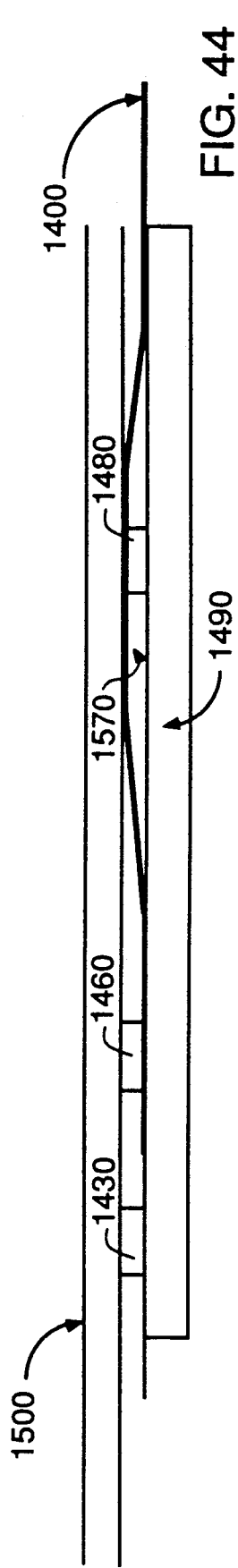
FIG. 44 is a side view of a portion of the embodiment of the invention shown in FIG. 43.
Figure 47:
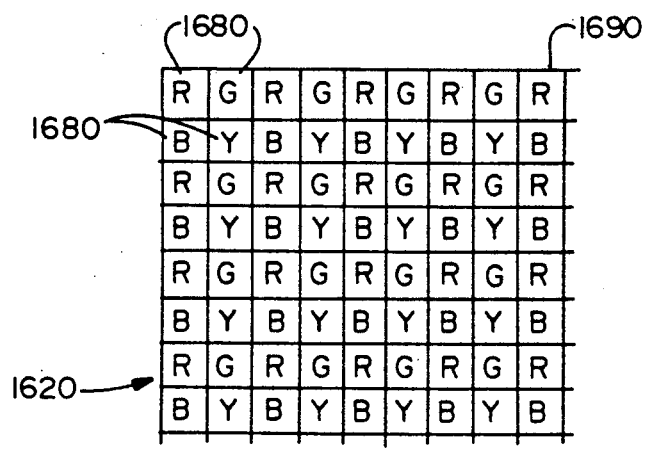
FIG. 47 shows a filter for use in connection with the embodiment of FIG. 45.

FIGS. 43 and 44 show another alternative embodiment of the invention, utilizing bimorphs 1400 and 1410 of the same design as bimorph 200 shown in FIG. 16. In this embodiment, the zebra strips and conductive rubber strips are replaced by conductive buttons, such as buttons 1420-1480. These conductive buttons are mounted on the lower printed circuit board 1490, which is of the same design as the lower printed circuit board 1040. Similarly, the upper printed circuit board 1500 is of essentially the same design as the upper printed circuit board 1170 shown in FIG. 40, except that the conductive traces may be of a different configuration to accommodate the conductive rubber buttons instead of zebra strips and homogeneous rubber strips. Overall, the embodiment of FIGS. 43-44 is essentially the same as the embodiment of FIG. 37, but for the substitution of the conductive buttons for the conductive strips of the latter.

As shown in FIG. 43, a single conductive rubber button is mounted on the bottom of each high voltage electrode such as electrodes 1510 and 1520, and contacts the high voltage electrode (of the exposed center layer) of each bimorph, such as electrodes 1530 and 1540 of the bimorphs 1400 and 1410, respectively.

Similarly, conductive rubber buttons 1440, 1460 and others are mounted on the bottom surface of the upper printed circuit board 1500 so as to contact both the top ground electrodes 1550, 1560, etc. of the bimorphs 1400, 1410, etc., respectively, and to contact the top of the lower circuit board 1490 (such as by means of the conductive rubber button 1450). Finally, lower common connector buttons 1470 and 1480 are mounted on top of the lower circuit board 1490 so as to contact the lower ground electrodes of the bimorphs, such as lower ground electrode 1570 of bimorph 1400, as shown in FIG. 44.

The embodiment of FIGS. 43 and 44 further confines the force which is applied to the bimorph assembly (such as bimorph assembly 1000) upon construction to a yet smaller surface area, thus increasing the pressure applied at each of the connections. This makes for a more reliable electrical connection at each conductive rubber button, and ensures good sealing characteristics. It will be appreciated that only a single common conductive button 1450 is necessary for contact between the ground electrode common trace 1505 of the upper printed circuit board 1500 and the top conductive surface of the lower printed circuit board 1490; however, many such buttons may be used for redundancy and reliability.

It will be noted that the connections with the bimorphs in the embodiments shown in FIGS. 15–42 have surface areas which are substantially equal to or (in the case of the button connections) less than the surface areas of the electrodes of the bimorphs. Thus, where conductive rubber pads or zebra strips are utilized, the pads or strips are laid transversely to the longitudinal directions of the bimorphs and to the electrodes on the printed circuit boards, which results, as discussed above, in confining the force of contact to small areas, thus ensuring reliable and fluid-tight contacts. Where the conductive buttons are utilized, it is likewise preferable that they have diameters which are equal to or less than the diameters of the bimorphs and the printed circuit board electrodes, and have areas which are substantially less than the areas of the bimorph electrodes and the printed circuit board electrodes.

The embodiment of FIG. 43 and 44 has the additional advantages that only a small amount of conductive material (such the conductive rubber buttons) is required, and costs are thus reduced while reliability is increased and assembly is greatly simplified.

In a preferred embodiment, an alternative configuration of filters, light sources and bimorph gate arrays may be utilized, as shown in FIGS. 45–48. Referring to FIG. 45, an optical source 1580 preferably provides white light to each of a plurality of bimorph arrays or modules 1590, 1600 and 1610. Of course, many more such modules may be used, and they are preferably arranged as described above relative to FIG. 33. A color filter array 1620 is positioned at the output end of the modules 1590–1610, and exit optics 1630 are provided which may be any of the devices mentioned above relative to optical system 580.

In this embodiment, all of the filtration is accomplished by the filter array 1620 at the output ends of the bimorphs, instead of at the input ends. The filter array 1620 includes a matrix of various colors, such as the matrix of red, green, blue and yellow filter windows 1680 (designated R, G, B and Y, respectively) shown in FIG. 47. Thus, the filter array 1620 is a filtration mask providing filtration in any pattern and using any number of colors desired.

The array 1620 may be photographically formed, in the following manner. A sheet of photographic film 1690 (for instance, a standard 16 cm. × 16 cm. positive transparency film) is exposed to the chosen colors by using masks 1640, 1650, 1660 and 1670 represented in FIG. 46. Mask 1640 includes exposed portions 1642, which in this embodiment are red in color, and opaque portions 1644. Likewise, mask 1650 includes green exposed portions 1652 and opaque portions 1654; mask 1660 includes blue exposed portions 1662 and opaque portions 1664; and mask 1670 includes yellow exposed portions 1672 and opaque portions 1674. It will be understood that, if the film 1690 is a negative film instead of a positive film, the colors of the exposed portions 1642, 1652, 1662 and 1672 are chosen appropriately (namely, the complementary colors are chosen) to produce the correct colors in the array 1620 upon development of the film 1690.

Each mask 1640–1670 is placed over the film 1690, one at a time, before the film 1690 is developed, and is exposed for a length of time chosen to produce the desired intensity of the filter windows 1680 upon development. The opaque areas of each mask prevent the areas of the film 1690 which underly them from being exposed. Thus, the film 1690 is exposed four times in this embodiment, once for each of the masks 1640–1670, such that after the fourth exposure, substantially the entire sheet of film 1690 has been exposed, with no two colors overlapping due to the patterns of the masks. The filter array 1620 is formed upon development of the exposed film.

The photographic masks 1640–1690 may take on any of a variety of colors and configurations, including configurations wherein the colors are designed to overlap. Such masks are easily generated by standard computer-controlled apparatus.

Figure 48:
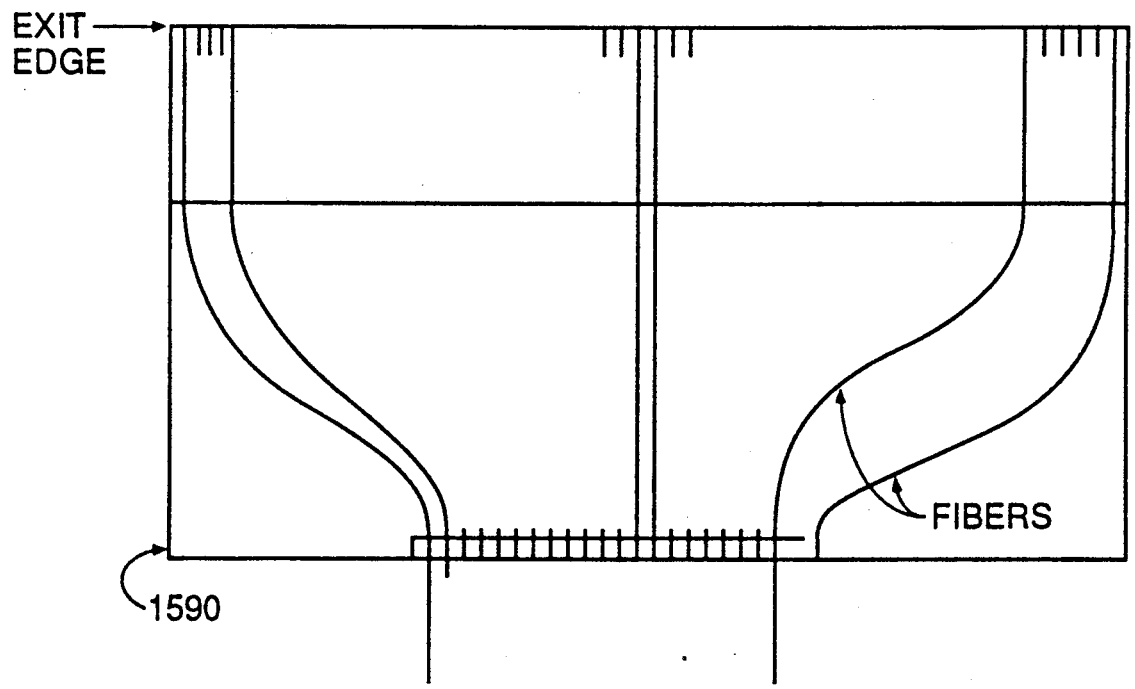
FIG. 48 shows a bimorph shelf for use in connection with embodiment of FIG. 45.

The embodiment of FIGS. 45–48 has the advantage that all of the bimorph shelves or modules 1590, 1600, 1610, etc. may be identical, such as the module 1590 shown in FIG. 48. Since the filtration is provided only at the exit optics of the modules, there is no need to differentiate either among lamps for the optical source 1580 (which need provide only white light) or among the modules themselves, which may have 32 fibers placed in the grooves of the shelves, all for receiving and transmitting the white light from the source 1580. The intensity of the light transmitted from each bimorph array is controlled in the manner described above.

Therefore, in this embodiment there is no need to utilize separate fiber bundles such as bundles 600, 610, 820 and 830 shown in FIGS. 26 and 29. A shelf array such as array 590 may then be constructed with the fibers all being interchangeable and undifferentiated. This results in a much simpler and less expensive manufacturing process. In addition, since all of the fibers may be bundled together, and a single light source may be used, a simpler, more uniform and more efficient optical coupling to the fibers results.

Although the invention has been described in terms of the preferred and alternative embodiments disclosed herein, those skilled in the art will appreciate many changes which could be made to these structures and methods without departing from the scope of the invention.

What is claimed is:

1. An apparatus for generating visual display information from input signals, comprising:
- an illumination source;
- a substrate;
- a plurality of first optical fibers mounted on said substrate, each said first optical fiber having a first input end and a first output end, with said first input ends coupled to said illumination source for transmitting light from said source to said first output ends;
- a plurality of bimorph gate means mounted on said substrate, for individually modulating the intensity of light from said illumination source which exits each of said plurality of first optical fibers by selective placement of a shutter in front of said first output ends with one said bimorph gate means adjacent each said first optical fiber, each said bimorph gate means including a bimorph having a shutter, wherein each said bimorph is translatable between a first position for causing said shutters to block said light at said first output ends and a second position for maintaining said shutter away from said first output ends for allowing said light to be transmitted from said first output ends;
- a plurality of second optical fibers, each said second optical fiber having a second input end and a second output end, wherein said second input ends are optically coupled to said first output ends, and wherein said shutters are interposed between said first output ends and said second input ends when said bimorph gate means are in said first portions; and
- means for translating said bimorph gate means between said first positions and said second positions in response to the input signals, such that said second optical fibers transmit the visual information to said second output ends, wherein a plurality of said second optical fibers carry information relating to a single visual pixel of the visual information, each said pixel having an intensity and/or color controlled by how many of said bimorph gate means are in said first position at said first input ends of said second optical fibers relating to said pixel.

2. The apparatus of claim 1, further comprising a plurality of optical fibers interposed between said illumination source and said first input ends for selectively transmitting light of different colors, such that each said pixel generates a portion of the visual information relating to at least one said color.

3. The apparatus of claim 1, wherein each said bimorph gate means gate includes a top stop for limiting the range of movement of said bimorph and to damp resonant vibrations of said bimorph when in close proximity with said top stop.

4. The apparatus of claim 1, wherein each said bimorph gate means includes a first electrode and a second electrode, and wherein each said translating means is coupled to one said bimorph so as to provide said first electrode with a first potential and said second electrode with a second potential, with said first and second potentials being relating to said input signals.

5. The apparatus of claim 4, wherein each said bimorph gate means comprises:
- a first piezoelectric film having a first surface and a second surface, said first and second surfaces being metalized; and
- a second piezoelectric film having a third surface and a fourth surface, said third and fourth surfaces being metalized, said first and second films being laminated together with said second surface and said third surface being electrically coupled, wherein said second film includes a portion extending beyond said first film when said films are laminated together, thus exposing said third surface, and wherein said translating means provides said first potential to said exposed third surface and provides said second potential to said first and fourth surfaces.

6. An apparatus for controlling intensity of light transmitted through an optical fiber in response to input signals relating to visual information, comprising:
- a substantially rigid template including first, second and third grooves, said second and third grooves being substantially parallel to one another with said first groove intersecting said second groove at a first intersection and further intersecting said second groove at a second intersection;
- a bimorph fixed within said first groove and having a first end protruding from said template, said bimorph having a first electrode, a second electrode, and a shutter attached to said first end, said bimorph being movable between a first position and a second position, wherein said shutter blocks the light when said bimorph is in said first position and passes the light when said bimorph is in said second position;
- a first conducting strip positioned within said second groove in electrical contact with said first electrode;
- a second conducting strip positioned within said third groove in electrical contact with said second electrode;
- a circuit board positioned on top of said first and second strips for providing a first potential to said first strip and a second potential to said second strip, with said first and second potentials relating to the input signals, for controlling the movement of said bimorph between said first position and said second position; and
- means for maintaining said template, said bimorph, said first and second conducting strips, said circuit board, and the optical fiber in a substantially fixed relationship.

7. The apparatus of claim 6, wherein said template further includes a first ridge at said first intersection and a second ridge at said second intersection, for cooperating with said circuit board to provide localized pressure to said first and second intersections, respectively, when said circuit board is fixed in place by said maintaining means.

8. The apparatus of claim 6, wherein first groove has a forward end including beveled edges for facilitating placement of said bimorph within said first groove and wherein said first and second conducting strips are elastomeric and wherein said means for maintaining compresses said first and second conducting strips approximately 30%.

9. An apparatus for controlling transmission of light, comprising:
- a substrate;
- transmitting means, carried by said substrate, for transmitting the light;
- at least one bimorph having a first piezoelectric layer and a second piezoelectric layer in a laminate structure, forming first, second and third electrodes, where said first electrode is formed on an outside surface of said first layer, said second electrode is formed at a lamination junction between said first and second layers, and said third electrode is formed on an outside surface of said second layer, said bimorph having a shutter at a forward end thereof for blocking light emitted from said transmitting means when said bimorph is not activated;

first, second and third energizing means for energizing said first, second and third electrodes, respectively;

first, second and third means for providing signals to said first, second and third energizing means, respectively, for activating said bimorph;

means for maintaining said energizing means in contact with said electrode; and wherein said first energizing means comprises a first printed circuit board having at least one first ground trace and first connecting means for electrically connecting said ground trace to said first electrode.

10. The apparatus of claim 9, wherein said second energizing means comprises a second printed circuit board having at least one high voltage trace connected to a high voltage source, with one said high voltage trace for providing signals for activating each said bimorph, and further comprises second connecting means for electrically connecting said high voltage trace to said second electrode.

11. The apparatus of claim 10, wherein said third energizing means comprises at least one second ground trace disposed on said second printed circuit board and third connecting means for electrically connecting said second ground trace to said third electrode.

12. The apparatus of claim 11, wherein each of said first, second and third connecting means comprise first, second and third resilient electrical connectors, respectively, for contacting a first area of each of said first, second and third electrodes, respectively, where each said first area is less than a total area of each of said first, second and third electrodes.

13. The apparatus of claim 12, wherein each of said first, second and third connecting means is maintained in tight contact with each of said first, second and third electrodes, respectively, such that a fluid-tight seal is formed at each said contact.

14. The apparatus of claim 12, wherein each said first connector comprises a portion of a substantially homogeneous conductive strip having a longitudinal direction extending transversely to a longitudinal direction of each said first electrode of each said bimorph.

15. The apparatus of claim 12, wherein each said second connector comprises a portion of a strip which is nonconductive in a longitudinal direction thereof, but is conductive in directions substantially orthogonal to said second connector longitudinal direction.

16. The apparatus of claim 12, wherein each said third connector comprises a portion of a substantially homogeneous conductive strip having a longitudinal direction extending transversely to a longitudinal direction of each said third electrode of each said bimorph.

17. The apparatus of claim 12, wherein each said third connector comprises a portion of a strip which is nonconductive in a longitudinal direction thereof, but is conductive in directions substantially orthogonal to said third connector longitudinal direction.

18. The apparatus of claim 12, wherein:
each said first connector comprises a first conductive button carried by said first printed circuit board;
each said second connector comprises a second conductive button carried by said second printed circuit board; and
each said third connector comprises a third conductive button carried by said second printed circuit board.

19. The apparatus of claim 18, wherein each of said first, second and third conductive buttons has a diameter which is substantially equal to a diameter of said first, second and third electrodes, respectively.

20. The apparatus of claim 18, wherein each of said first, second and third conductive buttons has a diameter which is less than a diameter of said first, second and third electrodes, respectively.

21. The apparatus of claim 18, wherein each of said first, second and third conductive buttons has a surface area which is less than a surface area of each of said first, second and third electrodes, respectively.

22. The apparatus of claim 12, wherein said first, second and third connecting means and said bimorph are mounted between said first and second printed circuit boards, and wherein said apparatus further comprises means for maintaining said first and second printed circuit boards in a fixed relationship for maintaining electrical contact between each of said first, second and third connecting means and each of said first, second and third electrodes, respectively.

23. The apparatus of claim 22, wherein said maintaining means comprises:
holes in said second printed circuit board, each said hole having a first diameter and a second diameter which is larger than said first diameter;
a rivet aligned with each said hole and carried by said substrate, wherein said rivet is adapted for binding said first and second printed circuitboards together by an enlarged end thereof which is larger in diameter than said first hole diameter and is smaller in diameter than said second hole diameter.

24. An apparatus for generating visual display information from input signals, comprising an illumination source and at least one bimorph shelf, wherein each said bimorph shelf comprises:
a substrate;
a plurality of optical fibers mounted on said substrate, each said optical fiber having an input end and an output end, with said input ends coupled to said illumination source for transmitting light from said source to said output ends; and
a plurality of bimorph gates mounted on said substrate, with one said bimorph gate adjacent each said optical fiber, each said bimorph gate including a bimorph having a shutter, wherein each said bimorph is translatable between a first position for causing said shutters to block said light at said output ends and a second position for maintaining said shutter away from said output ends for allowing said light to be transmitted from said output ends;
wherein said apparatus further comprises means for translating said bimorphs between said first positions and said second positions in response to the input signals, and optical display means coupled to said output ends for displaying visual information carried by said optical fibers, wherein said shutters are positioned between said output ends and said display means when said shutters are in said first position.

25. The apparatus of claim 24, wherein a plurality of said optical fibers carry information relating to a single visual pixel of the visual information, each said pixel having an intensity controlled by how many of said bimorphs are in said first position at said input ends of said optical fibers relating to said pixel.

26. The apparatus of claim 25, wherein said apparatus comprises a plurality of said bimorph shelves in an array, and each said pixel is formed by said output ends of optical fibers carried by at least two said bimorph shelves which are adjacent one another in said array.

27. The apparatus of claim 24, wherein each said gate includes a top stop for limiting the range of movement of said bimorph and to damp resonant vibrations of said bimorph when in close proximity with said top stop.

28. The apparatus of claim 27, wherein each said bimorph includes a first electrode and a second electrode, and wherein each said translating means is coupled to one said bimorph so as to provide said first electrode with a first potential and said second electrode with a second potential, with said first and second potentials being relating to said input signals.

29. The apparatus of claim 28, wherein each said bimorph comprises:
- a first piezoelectric film having a first surface and a second surface, said first and second surfaces being metalized; and
- a second piezoelectric film having a third surface and a fourth surface, said third and fourth surfaces being metalized, said first and second films being laminated together with said second surface and said third surface being electrically coupled, wherein said second film includes a portion extending beyond said first film when said films are laminated together, thus exposing said third surface, and wherein said translating means provides said first potential to said exposed third surface and provides said second potential to said first and fourth surfaces.

30. The apparatus of claim 24, further comprising at least one optical filter for transmitting light of at least one color, such that each said fiber transmits a portion of the visual information relating to at least one said color.

31. The apparatus of claim 30, wherein said optical filter is interposed between said illumination source and said input ends.

32. The apparatus of claim 30, wherein said optical fiber is interposed between said output ends and said display means.

33. The apparatus of claim 32, wherein said optical fibers are configured to form a first array, and said optical filter comprises a second array of filter windows, wherein said second array conforms to said first array such that each of said optical fiber output ends is optically coupled to one said filter window.

34. The apparatus of claim 33, wherein a first portion of said filter windows of said second array are of a first color and a second portion of said filter windows of said second array are of a second color.

35. The apparatus of claim 34, wherein said first and second portions of said filter windows are positioned in said second array so as to form a third array comprising pixels, each said pixel including one filter window from each of said first and second portions.

36. The apparatus of claim 34, wherein a third port of said filter windows are of a third color and said first, second and third portions of said filter windows are positioned in said second array so as to form a third array comprising pixels, each said pixel including one filter window from each of said first, second and third portions.

37. The apparatus of claim 36, wherein a fourth portion of said filter windows are of a fourth color and said third array includes said fourth portion of said filter windows, such that each said pixel includes one filter window from each of said first, second, third and fourth portions.

* * * * *